US009082079B1

(12) United States Patent
Coenen

(10) Patent No.: US 9,082,079 B1
(45) Date of Patent: Jul. 14, 2015

(54) PROPORTIONAL-INTEGRAL-DERIVATIVE CONTROLLER EFFECTING EXPANSION KERNELS COMPRISING A PLURALITY OF SPIKING NEURONS ASSOCIATED WITH A PLURALITY OF RECEPTIVE FIELDS

(71) Applicant: BRAIN Corporation, San Diego, CA (US)

(72) Inventor: Olivier Coenen, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 246 days.

(21) Appl. No.: 13/656,987

(22) Filed: Oct. 22, 2012

(51) Int. Cl.
| G06F 15/18 | (2006.01) |
| G06N 3/02 | (2006.01) |
| G06J 1/00 | (2006.01) |
| G06N 3/06 | (2006.01) |
| G06N 3/08 | (2006.01) |

(52) U.S. Cl.
CPC ......................................... *G06N 3/08* (2013.01)

(58) Field of Classification Search
USPC .......................................................... 706/23
See application file for complete search history.

(56) References Cited

U.S. PATENT DOCUMENTS

| 5,063,603 A | 11/1991 | Burt |
| 5,092,343 A | 3/1992 | Spitzer |
| 5,245,672 A | 9/1993 | Wilson |
| 5,355,435 A | 10/1994 | DeYong |
| 5,388,186 A | 2/1995 | Bose |
| 5,408,588 A | 4/1995 | Ulug |
| 5,467,428 A | 11/1995 | Ulug |
| 5,638,359 A | 6/1997 | Peltola |
| 5,673,367 A | 9/1997 | Buckley |
| 5,875,108 A | 2/1999 | Hoffberg |
| 6,009,418 A | 12/1999 | Cooper |
| 6,014,653 A | 1/2000 | Thaler |

(Continued)

FOREIGN PATENT DOCUMENTS

| CN | 102226740 A | 10/2011 |
| EP | 1089436 A2 | 4/2001 |

(Continued)

OTHER PUBLICATIONS

PCT International Search Report for International Application PCT/US2013/060352 dated Jan. 16, 2014.

(Continued)

*Primary Examiner* — Jeffrey A Gaffin
*Assistant Examiner* — Nathan Brown, Jr.
(74) *Attorney, Agent, or Firm* — Pillsbury Winthrop Shaw Pittman LLP

(57) ABSTRACT

Adaptive proportional-integral-derivative controller apparatus of a plant may be implemented. The controller may comprise an encoder block utilizing basis function kernel expansion technique to encode an arbitrary combination of inputs into spike output. The basis function kernel may comprise one or more operators configured to manipulate basis components. The controller may comprise spiking neuron network operable according to reinforcement learning process. The network may receive the encoder output via a plurality of plastic connections. The process may be configured to adaptively modify connection weights in order to maximize process performance, associated with a target outcome. Features of the input may be identified and used for enabling the controlled plant to achieve the target outcome.

21 Claims, 27 Drawing Sheets

(56) References Cited

U.S. PATENT DOCUMENTS

| | | |
|---|---|---|
| 6,363,369 B1 | 3/2002 | Liaw |
| 6,458,157 B1 | 10/2002 | Suaning |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,601,049 B1 | 7/2003 | Cooper |
| 6,643,627 B2 | 11/2003 | Liaw |
| 7,395,251 B2 | 7/2008 | Linsker |
| 7,426,501 B2 | 9/2008 | Nugent |
| 7,672,920 B2 | 3/2010 | Ito |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 2002/0038294 A1 | 3/2002 | Matsugu |
| 2003/0050903 A1 | 3/2003 | Liaw |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325768 A1 | 12/2013 | Sinyavskiy |
| 2013/0325773 A1 | 12/2013 | Sinyavskiy |
| 2013/0325774 A1 | 12/2013 | Sinyavsikiy |
| 2013/0325775 A1 | 12/2013 | Sinyavskiy |
| 2013/0325776 A1 | 12/2013 | Ponulak |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0193066 A1 | 7/2014 | Richert |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 A2 | 7/2008 |
| WO | 2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs,cwi , n11- sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., 'Accelerated Simulation of Spiking Neural Networks Using GPUs. [online],2010 [retrieved on Jun. 15, 2013], Retrieved from the Internet: URL:http://ieeexplore.ieee.org/xpls/abs_all.jsp?ammber=5596678&tag=1.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.

Gewaltig et al., 'NEST (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, 'Polychronization: Computation with Spikes', Neural Computation, 25, 2006, 18, 245-282.

Izhikevich, 'Simple Model of Spiking Neurons', IEEE Transactions on Neural Networks, vol. 14, No. 6, Nov. 2003, pp. 1569-1572.

Izhikevich et al., 'Relating STDP to BCM', Neural Computation (2003) 15, 1511-1523.

Karbowski et al., 'Multispikes and Synchronization in a Large Neural Network with Temporal Delays', Neural Computation 12, 1573-1606 (2000).

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP?Courses/SPR/Reference/Khotanzad.pdf>.

Laurent, 'The Neural Network Query Language (NNQL) Reference' [retrieved on Nov. 12, 2013]. Retrieved from the Internet: <URL'https://code.google.com/p/nnql/issues/detail?id=1>.

Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1.

Nichols, A Re configurable Computing Architecture for Implementing Artificial Neural Networks on FPGA, Master's Thesis, The University of Guelph, 2003, pp. 1-235.

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

(56) References Cited

OTHER PUBLICATIONS

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Schemmel et al., 'Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Simulink.RTM. model [online], [Retrieved on Dec. 10, 2013] Retrieved from <URL: http://www.mathworks.com/ products/ simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
PCT International Search Report for PCT/US2013/052136 dated Nov. 30, 2013.
Froemke et al., 'Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Seung, H. "Learning in spiking neural networks by reinforcement of stochastic synaptic transmission." Neuron vol. 40 No. 6 (2003): pp. 1063-1073.
Weber, C. et al. 'Robot docking with neural vision and reinforcement.' Knowledge-Based Systems vol. 17 No. 2 (2004): pp. 165-172.
Baras, D. et al. "Reinforcement learning, spike-time-dependent plasticity, and the BCM rule." Neural Computation vol. 19 No. 8 (2007): pp. 2245-2279.
de Queiroz, M. et al. "Reinforcement learning of a simple control task using the spike response model." Neurocomputing vol. 70 No. 1 (2006): pp. 14-20.
PCT International Search Report and Written Opinion for International Application No. PCT/US2013/044124 dated Sep. 12, 2013.
Bennett (1999), The early history of the synapse: from Plato to Sherrington. Brain Res. Bull., 50(2): 95-118.
Haykin, (1999), Neural Networks: A Comprehensive Foundation (Second Edition), Prentice-Hall.
"In search of the artificial retina" [online], Vision Systems Design, Apr. 1, 2007.
Kenji, (2000), Reinforcement Learning in Continuous Time and Space, Neural Computation, 12:1, 219-245.
Klute et al., (2002). Artificial Muscles: Actuators for Biorobotic Systems. The International Journal 0./ Robotics Research 21 :295-309.
Lendek et al., (2006) State Estimation under Uncertainty: A Survey. Technical report 06-004, Delft Center for Systems and Control Delft University of Technology.
Legenstein et al., (2008), A learning theory for reward-modulated spike timing-dependent plasticity with application to biofeedback. PLoS Computational Biology, 4(10): 1-27.
Nikolic et al., (2011) High-sensitivity silicon retina for robotics and prosthetics.
Ponulak, (2005), ReSuMe—New supervised learning method for Spiking Neural Networks. Technical Report, Institute of Control and Information Engineering, Poznan University of Technology.
Ponulak et al., (2010) Supervised Learning in Spiking Neural Networks with ReSuMe: Sequence Learning, Classification and Spike-Shifting. Neural Comp., 22(2): 467-510.

Sutton et al., (1998), Reinforcement Learning, an Introduction. MIT Press.
Schreiber et al., (2003), A new correlation-based measure of spike timing reliability. Neurocomputing, 52-54, 925-931.
Sutton, (1988). Learning to predict by the methods of temporal differences. machine Learning 3(1), 9-44.
Stein, (1967). Some models of neural variability. Biophys. J., 7: 37-68.
Werbos, (1992), or Prokhorov D.V and Wunsch D.C. (1997) Adaptive Critic Designs, IEEE Trans Neural Networks, vol. 8, No. 5, pp. 997-1007.
White et al., (Eds.) (1992) Handbook of Intelligent Control: Neural, Fuzzy and Adaptive Approaches. Van Nostrand Reinhold, New York.
Widrow et al., (1960) Adaptive Switching Circuits. IRE WESCON Convention Record 4: 96-104.
Ponulak (2006) Supervised Learning in Spiking Neural Networks with ReSuMe Method. Doctoral Dissertation Poznan, Poland.
Florian (2007) Reinforcement Learning Through Modulation of Spike-Timing-Dependent Synaptic Plasticity, Neural Computation 19, 1468-1502 Massachusetts Institute of Technology.
Morrison, (2008)Phenomenological models of synaptic plasticity based on spike timing, Received: Jan. 16, 2008 / Accepted: Apr. 9, 2008 The Author(s).
Bouganis et al., (2010) "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.
Xie et al., (2004) "Learning in neural networks by reinforcement of irregular spiking", Physical Review E, vol. 69, letter 041909, pp. 1-10.
Floreano et al., (2008) Floreano et al. Neuroevolution: From Architectures to learning Evol. Intel. Jan. 2008 1:47-62 (retrieved online on Apr. 24, 2013 from http://infoscience.epfl.ch/record/112676/files/ FloreanoDuerrMattiussi2008pdf).
D'Cruz (1998) Reinforcement Learning in Intelligent Control: A Biologically-Inspired Approach to the Re/earning Problem Brendan May 1998.
Aleksandrov (1968), Stochastic optimization, Engineering Cybernetics, 5, 11-16.
Amari (1998), Why natural gradient?, Acoustics, Speech and Signal Processing, (pp. 1213-1216). Seattle, WA, USA.
Bartlett et al., (2000) "A Biologically Plausible and Locally Optimal Learning Algorithm for Spiking Neurons" Retrieved from http://arp. anu.edu.au/ftp/papers/jon/brains.pdf.gz.
Baxter et al. (2000.). Direct gradient-based reinforcement learning. In Proceedings of the International Symposium on Circuits.
Bohte et al., "A Computational Theory of Spike-Timing Dependent Plasticity: Achieving Robust Neural Responses via Conditional Entropy Minimization" 2004.
Bohte, (2000). SpikeProp: backpropagation for networks of spiking neurons. In Proceedings of ESANN'2000, (pp. 419-424).
Booij (2005, 6). A Gradient Descent Rule for Spiking Neurons Emitting Multiple Spikes. Information Processing Letters n. 6, v.95 , 552--558.
Breiman et al., "Random Forests" 33pgs, Jan. 2001.
Capel, "Random Forests and Ferns" LPAC, Jan. 11, 2012, 40 pgs.
El-Laithy (2011), A reinforcement learning framework for spiking networks with dynamic synapses, Comput Intell Neurosci.
Fletcher (1987), Practical methods of optimization, New York, NY: Wiley-Interscience.
Florian (2005), A reinforcement learning algorithm for spiking neural networks SYNASC'05 Proceedings of the Seventh International Symposium on Symbolic and Numeric Algorithms for Scientific Computing.
Fremaux et al., "Functional Requirements for Reward-Modulated Spike-Timing-Dependent Plasticity", The Journal of Neuroscience, Oct. 6, 2010, 30(40):13326-13337.
Fu (2005) Stochastic Gradient Estimation, Technical Research Report.
Fu (2008), What You Should Know About Simulation and Derivatives Naval Research Logistics, vol. 55, No. 8 , 723-736.
Fyfe et al., (2007), Reinforcement Learning Reward Functions for Unsupervised Learning, ISNN '07 Proceedings of the 4th interna-

(56) References Cited

OTHER PUBLICATIONS tional symposium on Neural Networks: Advances in Neural Networks.
Gerstner (2002), Spiking neuron models: single neurons, populations,.plasticity, Cambridge, U.K.: Cambridge University Press.
Glynn (1995), Likelihood ratio gradient estimation for regenerative stochastic recursions, Advances in Applied Probability, 27, 4, 1019-1053.
Ho, "Random Decision Forests" Int'l Conf. Document Analysis and Recognition, 1995, 5 pgs.
Izhikevich (2007), Solving the distal reward problem through linkage of STDP and dopamine signaling, Cerebral Cortex, vol. 17, pp. 2443-2452.
Kalal et al. "Online learning of robust object detectors during unstable tracking" published on 3rd On-line Learning for Computer Vision Workshop 2009, Kyoto, Japan, IEEE CS.
Kiefer (1952), Stochastic Estimation of the Maximum of a Regression Function, Annals of Mathematical Statistics 23, #3, 462-466.
Klampfl (2009), Spiking neurons can learn to solve information bottleneck problems and extract independent components, Neural Computation, 21(4), pp. 911-959.
Kleijnen et al., Optimization and sensitivity analysis of computer simulation models by the score function method Invited Review European Journal of Operational Research, Mar. 1995.
LaRochelle et al., (2009), Exploring Strategies for Training Deep Neural Networks, J. of Machine Learning Research, v. 10, pp. 1-40.
Ojala et al., "Performance Evaluation of Texture Measures with Classification Based on Kullback Discrimination of Distributions" 1994 IEEE, pp. 582-585.
Ozuysal et al., "Fast Keypoint Recognition in Ten Lines of Code" CVPR 2007.
Ozuysal et al., "Fast Keypoint Recognition Using Random Ferns" IEEE Transactions on Pattern Analysis and Machine Intelligence, vol. 32, No. 3, Mar. 2010, pp. 448-461.
Pfister (2003), Optimal Hebbian Learning: A Probabilistic Point of View, In ICANN Proceedings. Springer, pp. 92-98.
Pfister (2006), Optimal Spike-Timing Dependent Plasticity for Precise Action Potential Firing in Supervised Learning, Neural computation ISSN 0899-7667, 18(6).
Reiman et al. (1989). Sensitivity analysis for simulations via likelihood ratios. Oper Res 37, 830-844.
Robbins (1951), A Stochastic Approximation Method, Annals of Mathematical Statistics 22, #3, 400-407.
Rosenstein et al., (2002), Supervised learning combined with an actor-critic architecture, Technical Report 02-41, Department of Computer Science, University of Massachusetts, Amherst.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, Nature 323 (6088), pp. 533-536.
Rumelhart (1986), Learning internal representations by error propagation, Parallel distributed processing, vol. 1 (pp. 318-362), Cambridge, MA: MIT Press.
Sinyavskiy, et al. "Generalized Stochastic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent.Plasticity: Synaptic Memory and Weight Distribution, Neural Computation, 19(3).
Toyoizumi et al., (2005), Generalized Bienenstock-Cooper-Munro rule for spiking neurons that maximizes information transmission, Proc. Natl. Acad. Sci. USA, 102, (pp. 5239-5244).
Vasilaki et al., "Spike-Based Reinforcement Learning in Continuous State and Action Space: When Policy Gradient Methods Fail" PLoS, vol. 5, Issue 12, Dec. 2009.
Vasilaki, et al., "Learning flexible sensori-motor mappings in a complex network" Biol Cybern (2009) 100:147-158.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Weber et al., (2009), Goal-Directed Feature Learning, In: Proc, International Joint Conference on Neural Networks, 3319-3326.
Williams (1992), Simple Statistical Gradient-Following Algorithms for Connectionist Reinforcement Learning, Machine Learning 8, 229-256.
Yi (2009), Stochastic search using the natural gradient, ICML '09 Proceedings of the 26th Annual International Conference on Machine Learning. New York, NY, USA.
Sherrington , (1897); The Central Nervous System. A Textbook of Physiology, 7th ed., part III, Ed. by Foster M. Macmillian and Co. Ltd., London, p. 929.
Hagras, Hani et al., "Evolving Spiking Neural Network Controllers for Autonomous Robots", IEEE 2004.
Masakazu et al, "Convolutional Spiking Neural Network Model for Robust Face Detection", 2002 Proceedings of the 9th International Conference on Neural Information Processing (ICONIP'02), vol. 2.
Jesper Tegner, et al., 2002 "An adaptive spike-timing-dependent plasticity rule" Elsevier Science B.V.

PROPORTIONAL-INTEGRAL-DERIVATIVE CONTROLLER EFFECTING EXPANSION KERNELS COMPRISING A PLURALITY OF SPIKING NEURONS ASSOCIATED WITH A PLURALITY OF RECEPTIVE FIELDS

CROSS-REFERENCE TO RELATED APPLICATIONS

This application is related to a co-owned and co-pending U.S. patent application Ser. No. 13/487,533, entitled "STOCHASTIC SPIKING NETWORK LEARNING APPARATUS AND METHODS" filed Jun. 4, 2012, U.S. patent application Ser. No. 13/487,499, entitled "STOCHASTIC APPARATUS AND METHODS FOR IMPLEMENTING GENERALIZED LEARNING RULES", filed Jun. 4, 2012, U.S. patent application Ser. No. 13/487,621, entitled "IMPROVED LEARNING STOCHASTIC SPIKING NETWORK APPARATUS AND METHODS", filed Jun. 4, 2012, U.S. patent application Ser. No. 13/487,533, entitled "DYNAMICALLY RECONFIGURABLE STOCHASTIC SPIKING NETWORK APPARATUS AND METHODS", filed Jun. 4, 2012, and U.S. patent application Ser. No. 13/489,280 entitled "STOCHASTIC SPIKING NETWORK APPARATUS AND METHOD", filed Jun. 5, 2012, U.S. patent application Ser. No. 13/560,902, entitled, "APPARATUS AND METHODS FOR STATE-DEPENDENT LEARNING IN SPIKING NEURON NETWORKS", filed Jul. 27, 2012, U.S. patent application Ser. No. 13/560,891, entitled, "APPARATUS AND METHODS FOR EFFICIENT UPDATES SPIKING NEURON NETWORKS", filed Jul. 27, 2012, U.S. patent application Ser. No. 13/588,774, entitled "APPARATUS AND METHODS FOR IMPLEMENTING EVENT-BASED UPDATES IN SPIKING NEURON NETWORK", filed Jun. 17, 2012, U.S. patent application Ser. No. 13/554,980, entitled "APPARATUS AND METHODS FOR REINFORCEMENT LEARNING IN LARGE POPULATIONS OF ARTIFICIAL SPIKING NEURONS", filed Jul. 20, 2012, U.S. patent application Ser. No. 13/313,826, entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, U.S. patent application Ser. 13/238,932, ADAPTIVE CRITIC APPARATUS AND METHODS, filed Sep. 21, 2011, U.S. patent application Ser. No. 13/489,280 entitled "STOCHASTIC SPIKING NETWORK APPARATUS AND METHOD", filed Jun. 5, 2012, U.S. patent application Ser. No. 13/623,842, entitled "SPIKING NEURON NETWORK ADAPTIVE CONTROL APPARATUS AND METHODS", filed Sep. 20, 2012, U.S. patent application Ser. No. 13/623,801 entitled "MODULATED STOCHASTICITY SPIKING NEURON NETWORK CONTROLLER APPARATUS AND METHODS", filed Sep. 20, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to robotic control using spiking neuron networks.

2. Description of Related Art

Robotic control systems, such as the system 100 shown in FIG. 1, may comprise a controller apparatus 120 configured to control a plant 110. The plant 110 may include, for example, a robotic arm. The controller 120 may receive an input signal 102, and may generate a control signal 108. The plant 110 may provide feedback signal 106 to the adaptive controller 120.

Artificial neuron networks (ANN) may be used to implement controller 120 logic. Spiking neuron networks (SNN) may represent a special class of ANN, where neurons communicate by sequences of spikes. These networks may typically employ a pulse-coded mechanism, which may encode information using timing of the pulses. Such pulses (also referred to as "spikes" or 'impulses') may be short-lasting (typically on the order of 1-2 ms) discrete temporal events. Several exemplary embodiments of such encoding are described in a commonly owned and co-pending U.S. patent application Ser. No. 13/152,084 filed Jun. 2, 2011 and entitled APPARATUS AND METHODS FOR PULSE-CODE INVARIANT OBJECT RECOGNITION", and U.S. patent application Ser. No. 13/152,119 filed Jun. 2, 2011 and entitled "SENSORY INPUT PROCESSING APPARATUS AND METHODS", each being incorporated herein by reference in its entirety.

As shown in FIG. 1, the controller may receive one or more physical inputs (102, 106) that may individually comprise continuous (e.g., analog) and/or discrete (e.g., digital) signals describing various variables. Examples of such various variables may include one or more of temperature, voltage, current, orientation, position, plant state, and other signals. The inputs 102, 106 may generally be referred to as sensory data and are encoded into spikes by an analog-to-spike converter, which inputs to the SNN of the controller 120. Different strategies may be used to encode sensory data, including, for example, modeling the transformation of sensory receptors in the central nervous system (e.g. the tactile mechanoreceptor of the skin), which may take a (physical) variable (e.g., skin deformation) and transform it into trains of spikes. Such sensory response models may be cumbersome to construct, particularly when converting inputs of varying dynamical range and/or different nature. Furthermore, sensor upgrade and/or replacement may necessitate changes of the sensor model and, hence, controller logic (e.g., software, firmware and or hardware).

The controller may receive a non-spiking reinforcement signal. The controller may be configured to generate a non-spiking (e.g., continuous analog and/or discrete digitized) control signal 108. In order to generate a control signal, the controller (e.g., the controller 120 of FIG. 1) may combine multiple encoded sensory streams.

Existing control systems may need to treat inputs differently depending on their origin, and may thus be able to treat only labeled inputs, e.g. an input is for velocity, another acceleration from particular labeled modalities (e.g. tactile, vision, auditory). If the inputs are inadvertently mixed, the system may not function properly (e.g. if the acceleration signal is connected to the controller velocity input, or the tactile signal is connected to the controller visual input). Another possibility is for the sensors signals to change due to sensor degradations, external conditions, or other reasons, the controller, expecting particular pre-defined signals may not be able to deal with such changes.

SUMMARY

One aspect of the disclosure relates to a proportional-integral-derivative controller apparatus. The apparatus may comprise one or more processors configured to execute computer program modules. The computer program modules may be executable to effectuate an encoder block comprising an expansion kernel. The expansion kernel may comprise a plurality of spiking neurons. Individual ones of the plurality of spiking neurons may be associated with a plurality of receptive fields. The encoder block may be configured to encode an input into a spiking output using the expansion kernel. The plurality of receptive fields may comprise an integrating operator, a differentiating operator, and a proportional operator. The integrating operator may be associated with an integrating gain. The integrating operator may be configured to produce a first output based on a time integral of the input. The differentiating operator may be associated with a differentiating gain. The differentiating operator may be configured to produce a second output based on a time derivative of the input. The proportional operator may be associated with a proportional gain. The proportional operator may be configured to produce a third output. The third output may be proportional to the input. The spiking output may comprise a weighted sum of the first output, the second output, and the third output.

In some implementations, individual ones of the plurality of receptive fields may be characterized by an input range associated with the input signal. Individual ones of the plurality of spiking neurons may be configured to generate one or more spikes based on a portion of the input signal having values that match corresponding ones of the plurality of receptive fields.

In some implementations, the computer program modules may be executable to effectuate a spiking neuron network configured to (1) receive the spiking output from the plurality of spiking neurons via one or more connections and (2) generate an output using a reinforcement learning process based on an external signal.

In some implementations, individual ones of the plurality of spiking neurons may be configured to generate a portion of the spiking output using a reinforcement learning process based on an external signal. The reinforcement learning process may be configured to attain a target output.

In some implementations, the reinforcement learning process may be characterized by a plasticity mechanism modulated by the external signal.

In some implementations, the learning process may be characterized by a current output. The input signal may be configured based on a difference between the target output and the current output.

In some implementations, the input signal may comprise a continuous signal. The expansion kernel may comprise continuous-to-spiking expansion kernel.

In some implementations, at least one of the plurality of receptive fields may be characterized by a band pass filter response configured to provide a signal into a respective neuron of the plurality of neurons. The signal may be based on a portion of the input signal occurring within a band pass range of the band pass filter.

In some implementation, a first portion of the neurons may be configured to generate one or more integral outputs based on an integral of the input signal. Individual ones of the one or more integral outputs may be characterized by a first integral gain of a plurality of integral gains. A second portion of the neurons may be configured to generate one or more derivative outputs based on a derivative of the input signal. Individual ones of the one or more derivative outputs may be characterized by a first derivative gain of a plurality of derivative gains. A third portion of the neurons may be configured to generate one or more proportional outputs that are proportional to the input signal. Individual ones of the one or more proportional outputs may be characterized by a first proportional gain of a plurality of proportional gains. The plurality of proportional gains, the plurality of integral gains, and the plurality of derivative gains may cooperate to effectuate a plurality of proportional-integral-derivative controllers. Individual ones of the plurality of proportional-integral-derivative controllers may be configured to generate controller output based on the input. One or more of the first integral gain, the first derivative gain, or proportional gain may be configured based on the input signal having values that match corresponding ones of the plurality of receptive fields.

Another aspect of the disclosure relates to a non-transitory computer-readable storage medium having instructions embodied thereon. The instructions may be executable by one or more processors to perform a method of encoding a continuous input into a spike output. The method may comprise: generating a plurality of controller blocks, individual ones of the plurality of controller blocks being characterized by a respective set of gains; coupling an output of individual ones of the plurality of controller blocks with one or more spiking neurons via a plurality of connections; and operating the one or more spiking neurons using a reinforcement learning process configured to adjust efficacy of a portion of individual ones of the plurality of connections so as to improve a performance measure of the learning process. The performance measure may be based on a distance between a current spike output and a target spike output so that improving the performance measure reduces the distance.

In some implementations, individual ones of the respective sets of gains may comprise a proportional gain, an integral gain, and a derivative gain. The output of individual ones of the plurality of controller blocks may be based on a combination of: the input weighted by the proportional gain; a derivative of the input weighted by the derivative gain; and a time integral of the input weighted by the integral gain.

In some implementations, adjusting the efficacy may include selecting a portion of the plurality of controller blocks capable of generating the target outcome.

Yet another aspect of the disclosure relates to a hierarchical computerized system configured to encode a continuous input signal into a spike timing output. The system may comprise one or more processors configured to execute computer program modules. The computer program modules may be executable to effectuate: a first continuous expansion kernel block comprising a first plurality of basis components, individual ones of the first plurality of basis components being characterized by a first sensitivity range and configured to generate a first output signal based on a portion of the continuous input signal occurring within the first sensitivity range; a first transformation block comprising a first plurality of operators configured to generate a second output based on the first output; and a encoder block comprising a spiking neuron network configured to generate a spiking signal based on the second output.

In some implementations, the computer program modules may be further executable to effectuate: a second continuous expansion kernel block comprising a second plurality of basis components, individual ones of the second plurality of basis components being characterized by a second sensitivity range and configured to generate a third output signal based on a portion of the second output signal occurring within the second sensitivity range; and a second transformation block comprising a second plurality of operators configured to generate a fourth output based on the third output. The first transformation block and the second continuous expansion kernel block may share a common interface configured to communicate the second output from the first transformation block to the second continuous expansion kernel block. The encoder block may be configured to interface to the second transformation block and to receive the fourth output. The first output may comprise a continuous signal and the second output may comprise a continuous signal.

In some implementations, the fourth output may comprise a continuous signal. One or more neurons of the spiking neuron network may be configured to receive the fourth output from individual ones of the second plurality of operators via one or more connections. The spiking neuron network may be further configured to generate the spiking signal using a reinforcement learning process and based on an external signal. Individual ones of the one or more connections may be characterized by a connection efficacy. The spiking neuron network may be configured in accordance with a plasticity mechanism configured to adjust the connection efficacy in accordance with the external signal.

In some implementations, the adjustment may comprise one or both of connection potentiation or connection depression. The connection potentiation may comprise substantially increasing the connection efficacy. The connection depression may comprise substantially reducing the connection efficacy.

In some implementations, increasing the connection efficacy may be characterized by a first time-dependent function having a time window associated therewith. The one or more spikes may be characterized by a pre-synaptic time. The external signal may comprise a reinforcement signal. The reinforcement signal may comprise one or more spikes characterized by a reinforcement spike time. The time window may be selected based on one or both of the pre-synaptic time or the reinforcement spike time. Integration of the time-dependent function over the time window may generate a positive value.

In some implementations, the reinforcement learning process may be configured to produce a target outcome. The external signal may comprise a reinforcement indication configured based on whether a current outcome associated with the control signal is within a predetermined range from the target outcome.

In some implementations, the reinforcement learning process may be characterized by a performance measure. A current value of the performance measure may be based on the adjustment of the connection efficacy being capable of causing a transition of the process from a prior state to a current state. The reinforcement may be positive when the current state is closer to the target outcome than the prior state. The reinforcement may be negative when the current state is farther away from the desired outcome than the prior state.

In some implementations, the continuous input may include one or more of an analog signal, a polyadic signal with arity greater than 2, an n-bit long discrete signal with n-bits greater than 2, or a real-valued signal.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
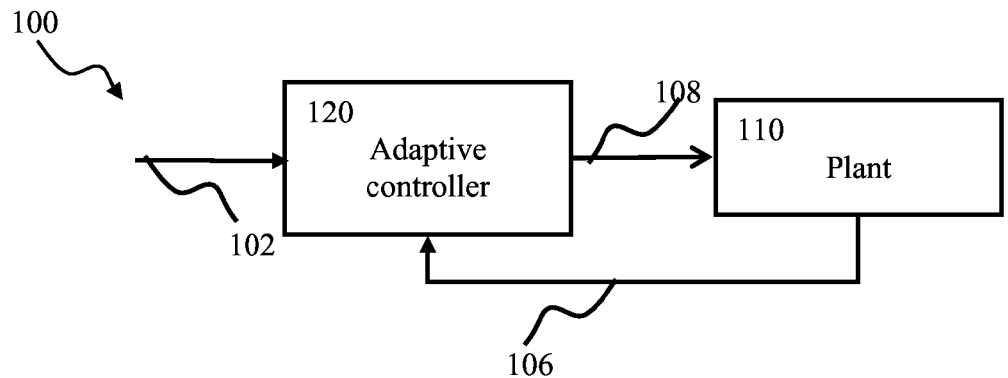
FIG. 1 is a block diagram illustrating a controller system according to the prior art.

All Figures disclosed herein are © Copyright 2012 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

The present disclosure provides, among other things, a computerized apparatus and methods for facilitating adaptive controller implementation using spiking neuron networks.

The controller may comprise an encoder block, configured to encode one or more continuous 'real-world' analog/and or digital signals into spikes using the "kernel expansion" (KE) technique. The KE encoding may be effectuated using one or more spiking neurons (encoder neurons) characterized by their respective receptive fields. The encoder neuron may be configured to generate spiking output that is based on a component of input signal present in their receptive field. The receptive fields of several encoder neurons may form a basis component set that may be used to decompose an arbitrary input signal {X} into a set of spiking output components {S}. Various types of receptive fields (basis functions) may be utilized with the disclosure such as a combination of Gaussian, sigmoid, and linear functions, one or higher dimensional functions, overlapping and/or non-overlapping, constant and or varying gain, and/or other functions.

The spiking output S may be coupled to a learning block of the network via one or more connections. Parameters (e.g., connection plasticity, weights, and/or other parameters) may be adjusted in accordance with a reinforcement learning process. The controller may receive a reinforcement signal. The reinforcement signal may be initiated internally or externally. Internally, the reinforcement signal may be derived from internal neuron state(s) and/or variables (e.g. activity and/or energy levels), parameters (e.g. weights), and/or other signals (e.g. motivational signal, motor commands). Externally, the reinforcement signal may be derived from a single or multiple sensors. In some implementations, such sensors may comprise generic sensors (e.g., vision sensors, proximity sensors). In one or more implementations, such sensors may comprise specialized sensors, such as, for example, sensors configured to detect feedback from a user and/or the environment (e.g. boundary beacon, force sensors).

Some parameters, (e.g., connection plasticity, weights, and/or other parameters) may be adjusted based on the reinforcement signal so as to maximize a measure of controller performance. In some implementation, the controller performance measure may comprise a squared error between current position and a target position. In one or more implementations, the performance measure may be based on a minimum distance to a boundary, cumulative energy use, and/or other metrics.

Most common spiking neuron models may use the timing of spikes, rather than the specific shape of spikes, in order to encode neural information. A spike "train" may be described as follows:

$$S(t) = \sum_f \delta(t - t^f),  \quad\text{(Eqn. 1)}$$

where f=1, 2, ... is the spike designator and δ(.) is the Dirac function with δ(t)=0 for t≠0 and $$\int_{-\infty}^{\infty} \delta(t)dt = 1. \quad\text{(Eqn. 2)}$$

Figure 2:
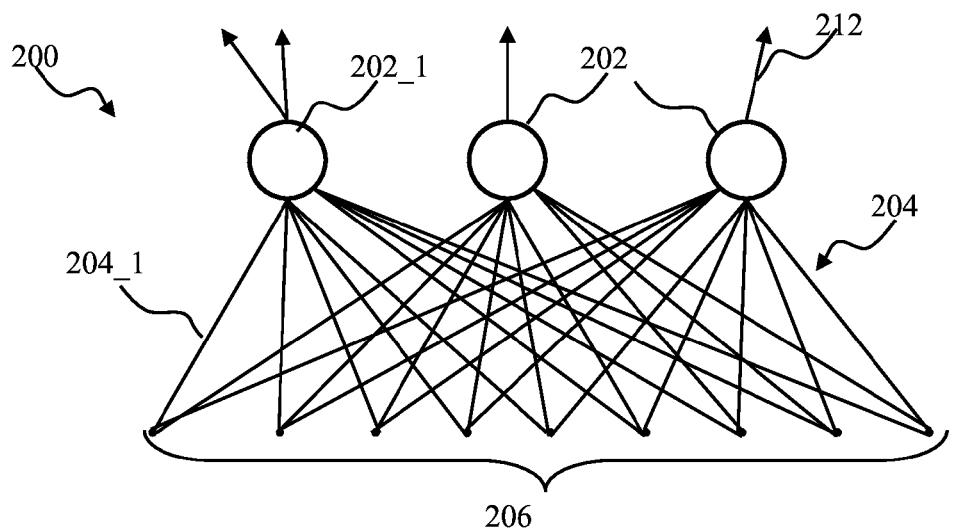
FIG. 2 is a block diagram depicting artificial spiking neural network according to some implementations.

One implementations of an artificial spiking neural network is shown in FIG. 2. The network 200 may comprise a plurality of units (or nodes) 202, which may correspond to neurons in a biological neural network. A given unit 102 may receive input via connections 204, which may be referred to as communications channels or synaptic connections. A given unit 202 may further be connected to other units via connections 212, which may be referred to as communications channels or synaptic connections. The units (e.g., the units 206 in FIG. 2) providing inputs to a given unit via, for example, connections 204, may be referred to as the pre-synaptic units. The unit receiving the inputs (e.g., the units 202 in FIG. 2) may be referred to as the post-synaptic unit. The post-synaptic unit of one unit layer (e.g. the units 202 in FIG. 2) may act as the pre-synaptic unit for the subsequent upper layer of units (not shown).

Individual ones of the connections (204, 212 in FIG. 2) may be assigned, inter alia, a connection efficacy. A connection efficacy may refer to a magnitude and/or probability of influence of pre-synaptic spike to firing of post-synaptic neuron. A connection efficacy may comprise one or more parameters. An exemplary parameter of connection efficacy may include a synaptic weight, by which one or more state variables of post synaptic unit are changed. During operation of the pulse-code network (e.g., the network 200), synaptic weights may be adjusted using what may be referred to as the spike-timing dependent plasticity (STDP) in order to implement, among other things, network learning.

Figure 3:
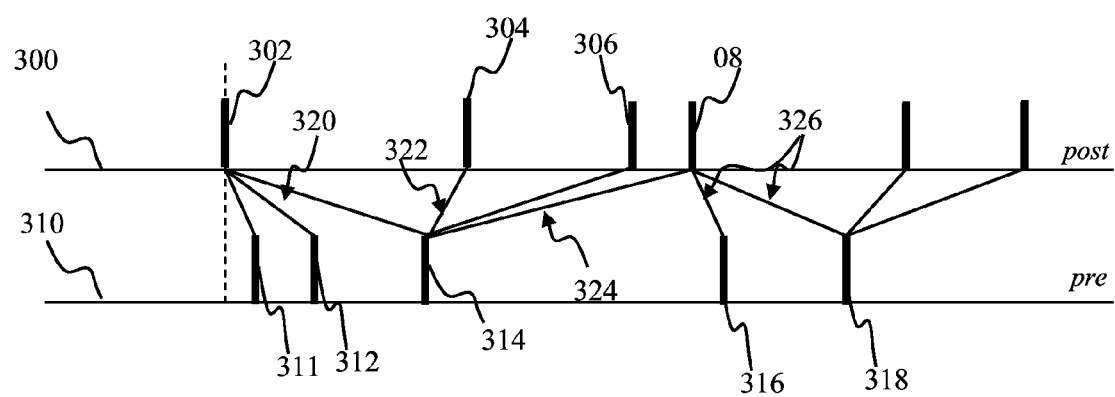
FIG. 3 is a graphical illustration depicting spike timing in the spiking network of FIG. 1, according to some implementations.
Figure 3A:
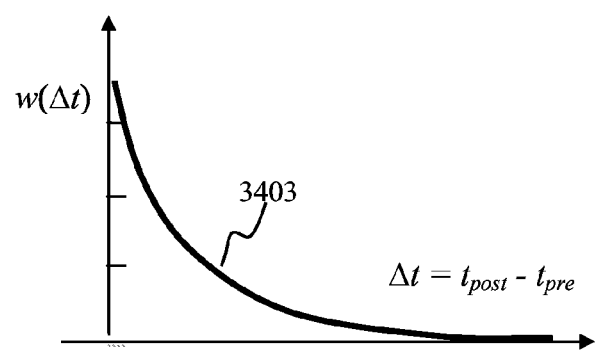
FIG. 3A is a plot depicting spike time dependent plasticity spike timing in the spiking network of FIG. 1, according to some implementations.

One such adaptation mechanism is illustrated with respect to FIGS. 3-3A. Traces 300, 310 in FIG. 3 depict pre-synaptic input spike train (delivered for example via connection 304_1 in FIG. 3) and post synaptic output spike train (generated, for example, by the neuron 302_1 in FIG. 3), respectively.

Properties of the connections 204 (e.g., weights w) may be adjusted based on relative timing between the pre-synaptic input (e.g., the pulses 302, 304, 306, 308 in FIG. 3) and post-synaptic output pulses (e.g., the pulses 314, 316, 318 in FIG. 3). One exemplary STDP weight adaptation rule is illustrated in FIG. 3A, where rule 330 depicts synaptic weight change Δw as a function of time difference between the time of post-synaptic output generation and arrival of pre-synaptic input $\Delta t = t_{post} - t_{pre}$. In some implementations, synaptic connections (e.g., the connections 304 in FIG. 3) delivering pre-synaptic input prior to the generation of post-synaptic response may be potentiated (as indicated by Δw>0 associated with the curve 330 in FIG. 3A). Synaptic connections (e.g., the connections 304 in FIG. 3) delivering pre-synaptic input subsequent to the generation of post-synaptic response may be depressed. By way of illustration, when the post-synaptic pulse 308 in FIG. 3 is generated: (i) connection associated with the pre-synaptic input 314 may precede the output pulse (indicated by the line denoted 324 in FIG. 3) and may be potentiated (Δw>0 in FIG. 3A and the weight is increased); and (ii) connections associated with the pre-synaptic input 316, 318 that follow may be depressed.

Generalized dynamics equations for spiking neurons models may be expressed as a superposition of input, interaction between the input current and the neuronal state variables, and neuron reset after the spike as follows:

$$\frac{d\vec{q}}{dt} = V(\vec{q}) + \sum_{t^{out}} R(\vec{q})\delta(t - t^{out}) + G(\vec{q})I(t), \quad \text{(Eqn. 3)}$$

the neuron may spike whenever a state variable reaches a threshold θ; the neuron reset may occur immediately after the spikes at the spike times $t=t^{out}$,
where:
- $\vec{q}$ is a vector of internal state variables (e.g., comprising membrane voltage);
- I(t) is an external input into the neuron;
- $V(\vec{q})$ is the function that defines evolution of the state variables;
- $G(\vec{q})$ describes the interaction between the external input and the state variables (for example, to model postsynaptic potentials); and
- $R(\vec{q})$ is the reset function, which resets the state variables immediately after the output spikes at times $t=t^{out}$.

For example, for the leaky integrate-and-fire (IF) model the state vector and the state model may be expressed as:

$$\vec{q}(t) \equiv u(t); \quad V(\vec{q}) = -\frac{u(t)}{\tau_m}; \quad \text{(Eqn. 4)}$$
$$R(\vec{q}) = u_{res} - u(t); \quad G(\vec{q}) = 1/C,$$

where u(t) is the membrane voltage; $T_m = RC$ is the membrane time constant with R and C the resistance and capacitance of the membrane, respectively (not to be confused with the reset function $R(\vec{q})$); and $u_{res}$ is the value to which the voltage is set immediately after an output spike (reset value). Accordingly, Eqn. 4 may become:

$$\tau_m \frac{du}{dt} = -u(t) + \sum_{t^{out}} (u_{res} - u(t))\delta(t - t^{out}) + RI(t) \quad \text{(Eqn. 5)}$$

with the reset of the delta function occurring whenever $u(t^{out})=θ$, which defines $t^{out}$.

The Izhikevich (IZ) neuron model may be expressed as:

$$\frac{dv}{dt} = 0.04v^2 + 5v + 140 - u + \sum_{t^{out}}(c-v)\delta(t - t^{out}) + I, \quad \text{(Eqn. 6)}$$

and $$\frac{du}{dt} = a(bv - u) + d\sum_{t^{out}}\delta(t - t^{out}),$$

the spike may occur whenever v exceeds the threshold $v(t^{out})=θ=30$, and both v and u are reset, immediately after the spikes. Thus:

$$\vec{q}(t) \equiv \begin{pmatrix} v(t) \\ u(t) \end{pmatrix}; \quad V(\vec{q}) = \begin{pmatrix} 0.04v^2 + 5v(t) + 140 - u(t) \\ a(bv(t) - u(t)) \end{pmatrix}; \quad \text{(Eqn. 7)}$$
$$R(\vec{q}) = \begin{pmatrix} c - v(t) \\ d \end{pmatrix}; \quad G(\vec{q}) = \begin{pmatrix} 1 \\ 0 \end{pmatrix}$$

and a, b, c, d are parameters of the simple neuron model.

An arrival of a pre-synaptic spike (illustrated by the spike train 310 in FIG. 3) via a connection (e.g., the connection 204 in FIG. 2) may provide an input signal I(t) into the post-synaptic neuron (e.g., the neuron 202 in FIG. 2). This input signal may correspond to the synaptic electric current flowing into the biological neuron, and, as a first approximation, may be modeled using an exponential function as follows:

$$I(t) = \int_0^\infty S(t-s)\exp(-s/\tau_s)ds, \quad \text{(Eqn. 8)}$$

where $\tau_s$ is the synaptic time constant and S(t) denotes here a pre-synaptic spike train.

Detailed descriptions of the various implementation of apparatus and methods of the disclosure are now provided. Although certain aspects of the disclosure may be best understood in the context of autonomous robotic devices, the disclosure is not so limited. Implementations of the disclosure may also be used for implementing a variety of learning applications wherever a performance function may be defined, such as, for example, optimizing internet traffic routing, visual, auditory or tactile recognition, assisted air-traffic controller, robust airplane controller, adaptive electronic assistant or other applications for mobile or other devices, adaptive toys for humans or animals.

Implementations of the disclosure may be, for example, deployed in a hardware and/or software implementation of a neuromorphic computer system. In some implementations, a robotic system may include a processor embodied in an application specific integrated circuit, which can be adapted or configured for use in an embedded application (e.g., a prosthetic device).

Figure 4:
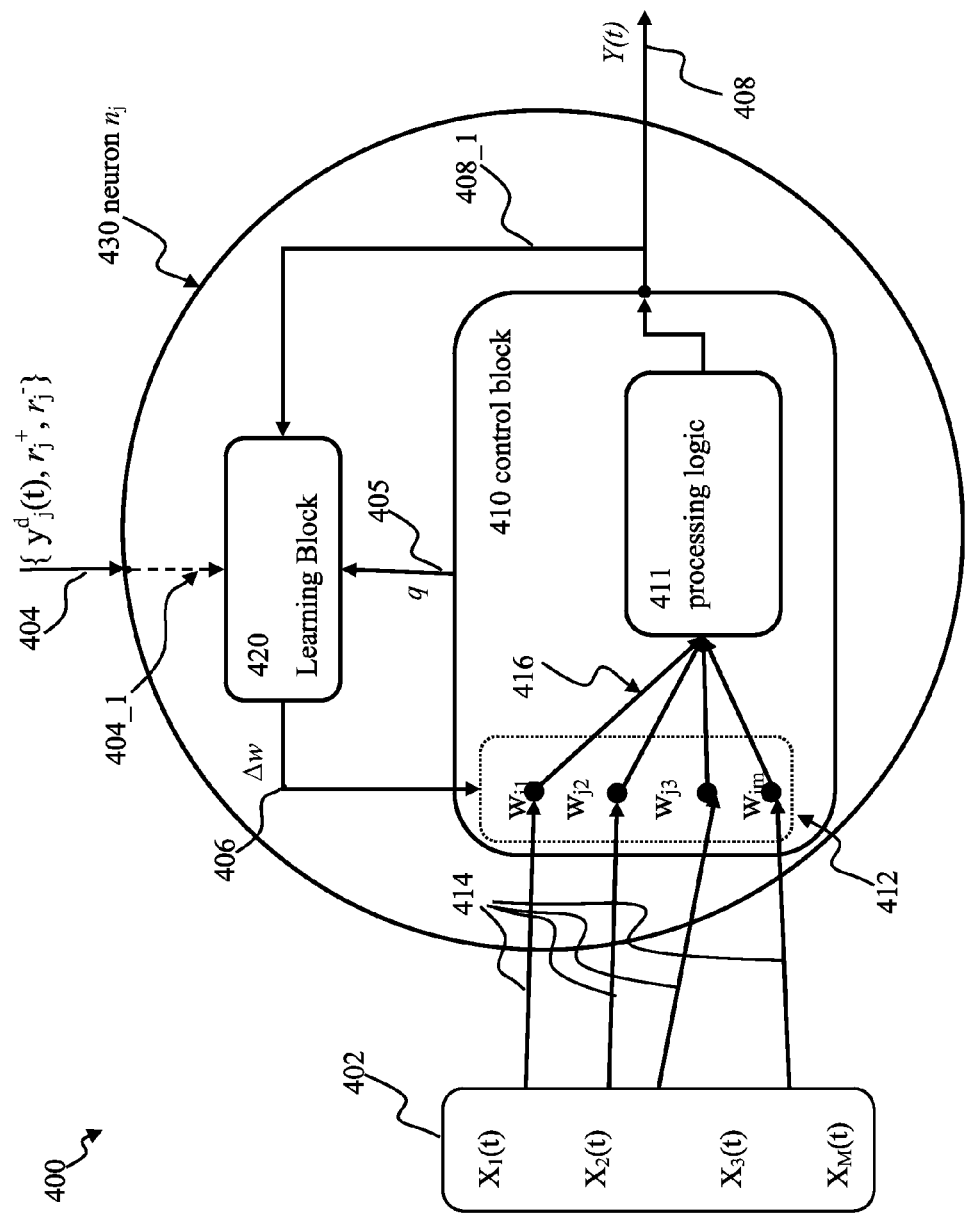
FIG. 4 is a block diagram illustrating spiking neural network configured to effectuate multiple learning rules, in accordance with some implementations.

Referring now to FIG. 4, some implementations of spiking network apparatus for effectuating the learning framework of the disclosure is shown and described in detail. The network 400 may comprise at least one stochastic spiking neuron 430, operable according to, for example, a Spike Response Process (SRP), and configured to receive M-dimensional input spiking stream X(t) 402 via M-input connections 414. In some implementations, the M-dimensional spike stream may correspond to M-input synaptic connections into the neurons 430. As shown in FIG. 4, individual input connections may be characterized by a connection parameter 412 $w_{ij}$ that may be configured to be adjusted during learning. In one or more implementations, the connection parameter may comprise connection efficacy (e.g., weight). In some implementations, the parameter 412 may comprise synaptic delay. In some implementations, the parameter 412 may comprise probabilities of synaptic transmission. In some implementations, the adjusted parameters may comprise parameters in the processing logic 411.

The following signal notation may be used in describing operation of the network 400, below:

$$y(t) = \sum_k \delta(t - t_k^{out})$$

the output spike pattern, corresponding to the output signal 408 produced by the control block 410, where $t_k$ denotes the times of the output spikes generated by the neuron; and $y^d(t) = \Sigma_{t_k^d} \delta(t - t_k^d)$ denotes the teaching spike pattern, corresponding to the desired (or reference) signal that may be part of external signal 404 of FIG. 4, where $t_k^d$ denotes the times when the spikes of the reference signal are received by the neuron.

In some implementations, the neuron 430 may be configured to receive positive and negative reinforcement signals via the connection 404. The parameters $r^+$, $r^-$ in of FIG. 4 denotes the reinforcement signal spike stream, which may be expressed as:

$$r^+(t) = \Sigma_i \delta(t - t_i^+), r^-(t) = \Sigma_i \delta(t - t_i^-),$$ (Eqn. 9)

where $t_i^+$, $t_i^-$ denote the spike times associated, for example, with positive and negative reinforcement, respectively.

The neuron 430 may be configured to implement the control block 410. In some implementations, control block 410 may be configured to control a robotic arm. The learning process of the neuron 430 may be parameterized by the learning parameters w. In some implementations, the parameters may comprise weights of connection 414 providing inputs into the neuron 430. The neuron may implement learning comprising adaptation (e.g., changes) of the connection weights.

The control block 410 may receive an input signal (x, or X), and may generate an output signal (y or Y). The output signal y may include motor control commands configured to move a robotic arm along a desired trajectory. The control block 410 may be characterized by a system model comprising system internal state variables q. The internal state variable q may include a membrane voltage of the neuron, conductance of the membrane, and/or other variables. The control block 410 may be characterized by learning parameters, which may comprise weights $w_{ji}$ of the connections, firing threshold, resting potential of the neuron, and/or other parameters. In one or more implementations, the learning parameters may comprise probabilities of signal transmission between the units (e.g., neurons) of the network.

The input signal x(t) may comprise data used for solving a particular control task. In one or more implementations, such as those involving a robotic arm or autonomous robot, the signal x(t) may comprise a stream of raw sensor data (e.g., proximity, inertial, terrain imaging, and/or other raw sensor data) and/or preprocessed data (e.g., velocity, extracted from accelerometers, distance to obstacle, positions, and/or other preprocessed data). In some implementations, such as those involving object recognition, the signal x(t) may comprise an array of pixel values (e.g., RGB, CMYK, HSV, HSL, grayscale, and/or other pixel values) in the input image, and/or preprocessed data (e.g., levels of activations of Gabor filters for face recognition, contours, and/or other preprocessed data). In one or more implementations, the input signal x(t) may comprise desired motion trajectory, for example, in order to predict future state of the robot or motor commands on the basis of current state and desired motion. In some implementations, the input signal x(t) may comprise a multi-dimensional input, comprising two or more input streams from individual sensor channels (e.g., velocity, acceleration, and/or other sensor channels).

The control block 410 of FIG. 4 may comprise a stochastic dynamic system. In some implementations, the stochastic system may be characterized by an analytical input-output (x→y) probabilistic relationship having a conditional probability distribution associated therewith:

$$P = p(y|x, w).$$ (Eqn. 10)

In Eqn. 10, parameter w may denote various system parameters including connection efficacy, firing threshold, resting potential of the neuron, and/or other parameters. The analytical relationship of Eqn. 10 may be selected such that the gradient of $\ln[p(y|x,w)]$ with respect to the system parameter w exists and can be calculated. The neuronal network shown in FIG. 4 may be configured to estimate rules for changing the system parameters (e.g., learning rules) so that the performance function F(x,y,q,r) may be optimized for the current set of inputs and outputs and system dynamics, where the reference signal r may comprise desired output $y^d$, positive $r^+$, and/or negative $r^-$ reinforcement signal, and/or other reference signals. In some implementations, the control performance function may be configured to reflect the properties of inputs and outputs (x,y,q). The values F(x,y,q,r)=F(x,y,q) may be calculated directly by the learning block 420 without relying on signal r when providing solutions of unsupervised learning tasks.

In some implementations, the value of the function F may be calculated based on a difference between the output y of the control block 410 and a reference signal $r = y^d$ characterizing the desired control block output. This configuration may provide solutions for supervised learning tasks, as described in detail below.

In some implementations, the value of the performance function F may be determined based on the external signal r. This configuration may provide solutions for reinforcement learning tasks, where r represents reward and/or punishment.

The learning block 420 may comprise learning framework according to the implementation described in co-pending and co-owned owned U.S. patent application Ser. No. 13/487,533 entitled "STOCHASTIC SPIKING NETWORK APPARATUS AND METHODS", incorporated supra, which may enable generalized learning methods without relying on calculations of the performance function F derivative in order to solve unsupervised, supervised and/or reinforcement learning tasks. The learning block 420 may receive the input x and output y signals (denoted by the arrow 402_1, 408_1, respectively, in FIG. 4), as well as the state information q 405. In some implementations, such as those involving supervised and reinforcement learning, external supervisory signal r may be provided to the block 420 as indicated by the arrow 404 in FIG. 4. The supervisory signal may comprise, in some implementations, the desired motion trajectory, and/or reward and punishment signals from the external environment.

In one or more implementations, the learning block 420 may optimize performance of the control system (e.g., the network 400 of FIG. 4) that is characterized by optimization of the average value of the performance function F(x,y,q,r) as described in detail below.

Optimization of performance of the control system (e.g., the network 430 of FIG. 4) may, in some implementations, be achieved via maximization/minimization of the average of the performance function, as described in detail for example, in a co-owned and co-pending U.S. patent application Ser. No. 13/487,499, entitled "STOCHASTIC APPARATUS AND METHODS FOR IMPLEMENTING GENERALIZED LEARNING RULES, incorporated supra.

In one or more implementations, instantaneous probability density of the neuron producing a response may be determined using neuron membrane voltage u(t) for continuous time chosen as an exponential stochastic threshold:

$$\lambda = \lambda_0 e^{(u(t)-u_{th})/\kappa}, \quad \text{(Eqn. 11)}$$

where:
u(t) is the membrane voltage of the neuron;
$u_{th}$ is the voltage threshold for generating a spike;
κ is the stochasticity parameter; and
$\lambda_D$ is the average firing rate of the neuron.

For discrete time steps, an approximation for the probability $\Lambda(u(t))\epsilon(0,1]$ of firing in the current time step may be given by:

$$\Lambda(u(t)) = 1 - e^{-\lambda(u(t))\Delta t}, \quad \text{(Eqn. 12)}$$

where Δt is time step length.

Figure 5:
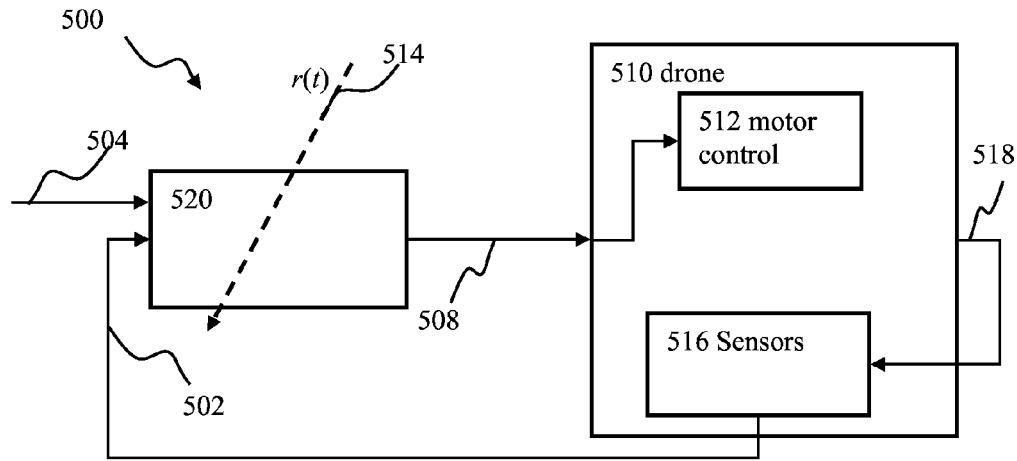
FIG. 5 is a block diagram illustrating exemplary unmanned vehicle adaptive controller system in accordance with some implementations.

FIG. 5 illustrates one exemplary adaptive control system useful to the disclosure. The system 500 shown in FIG. 5 may comprise an adaptive controller apparatus 520, a plant 510, and/or other components. The plant 510 may comprise an unmanned robotic vehicle, drone, and/or other plants.

In some implementations, the controller 520 may receive an input signal 502, and may generate an output signal 508. In one or more implementations, the plant 510 may provide feedback signal 504 to the adaptive controller 520. In some implementations, the feedback signal may comprise e.g., control plane position, motor speed and/or current, remaining battery level, and/or other parameters. Within the framework of adaptive control, the controller input signal 502 and the feedback 504 may be referred to as the sensory input, as they describe inputs to the control process.

In some implementations, the input signal 502 may comprise data x(t) used for solving a particular control task. In one or more implementations, such as those involving a robotic arm or autonomous robot, the signal x(t) may comprise a stream of sensor data, generated, for example, by the sensor block 516 in FIG. 5. In some implementations, the sensor data may comprise raw sensor stream such as, for example, proximity, inertial, terrain imaging, and/or other data. In one or more implementations, the sensor data may comprise preprocessed data, such as velocity, extracted from accelerometers, distance to obstacle, positions, and/or other preprocessed data. In some implementations, such as those involving object recognition, the signal x(t) may comprise an array of pixel values (e.g., RGB, CMYK, HSV, HSL, grayscale, and/or other pixel values) in the input image, or preprocessed data (e.g., levels of activations of Gabor filters for face recognition, contours, optic flow and/or other preprocessed data). In one or more implementations, the input signal x(t) may comprise desired motion trajectory, for example, in order to predict future state of the robot on the basis of current state and desired motion.

In one or more implementations, the controller may receive a supervisory input (e.g., the signal 514 in FIG. 5) that may comprise a desired signal and/or positive and/or negative reinforcement signals and/or other reinforcement and/or reward signals. In some implementations, the reinforcement signal may be provided by an external agent. In one or more implementations, the external agent may comprise a human and/or computerized operator communicating supervisory signal via, for example, remote commands when the drone approaches the target and/or an area of danger (an obstacle) and/or by a programing the controller to perform certain safety checks (e.g., speed less than 5 m/s). In other implementations, the reinforcement signal may comprise a sensor input from the environment (e.g., a perimeter beacon alarm) and/or robot sensor (e.g., a proximity alarm).

Whereas the reinforcement signal may provide an input into the controller (e.g., the adaptive controller 520 of FIG. 5), the reinforcement signal 514 may be distinguished from the sensory inputs (e.g., the inputs 502, 504 in FIG. 5) based on their origin and/or their role in the controller. Whereas, the sensory inputs may encode any physical or other quantities, which may be detected and/or quantified by the sensors, the reinforcement signal may not be restricted to sensory inputs and may comprise many other quantities, such as internal state variables, q, or output states, y, or other signals, e.g. motivational and task definition signals. In one or more implementations, the reinforcement signal may be based on the performance of the controller (e.g., as determined using the Eqn. 14-Eqn. 17, described below). The reinforcement signal may be utilized by the controller in order to directly affect learning. In the case of unsupervised learning, learning may take place without the reinforcement signal. In some implementations, the controller may use the reinforcement signal through the performance function in order to modify the learning parameters (e.g., the F(t) term in the Eqn. 19). In one or more implementations, the sensory inputs may be utilized by the adaptive controller to update the control process through the eligibility trace to modify the adaptive parameters (e.g., the eligibility trace e(t) term in the Eqn. 19)

In one or more implementations, the controller 520 may comprise sensory encoding block (e.g., the block 624 described with respect to FIG. 6A below) and a spiking network controller block (e.g., the block 634 described with respect to FIG. 6A below). In some implementations, the encoder block may be configured to encode analog and/or analog and spiking inputs into spiking outputs.

The controller may generate an output signal 508 configured to manipulate the plant (e.g., a drone 510). In some implementations, the output 508 may include motor control commands. Exemplary motor control commands may be configured to activate one or more actuators, change control plant angle, and/or effectuate one or more other actions. In some implementations, the motor control block of the drone 510 may control one parameters of the sensor block (e.g., to maintain orientation of a camera in response to drone movement, and/or maintain drone position) as depicted by the arrow 518 in FIG. 5.

In one or more implementations, the input x(t), may be used to determine one or more measures of the performance of the plant controller operation. In some implementations, the performance function F may be a function of the input x(t), supervisory signal r(t), and/or the internal state variables q(t), and/or the output y(t). In one or more implementations, the performance function may be dependent on time and expressed in the following general form:

$$F=F(x(t),y(t),q(t),r(t),t). \quad \text{(Eqn. 13)}$$

In one or more implementations, M multiple performance measures $P_l(x,y,q,r,t)$, l=1 ... M, may be utilized in order to, for example, implement more than one learning rule simultaneously, and potentially in parallel, and/or to different sections of the preprocessing pathways. In one or more implementations, some of the multiple performance measures may be associated with sensory processing areas. In some implementations some of the multiple performance measures may correspond to areas providing state information and/or other type of information to the controllers. In some implementations multiple performance measures may be used by the controller in order to implement different constraints of a single and/or multiple tasks. In one or more implementations, the task constrains may comprise minimizing energy while following particular trajectories with an end effector, and/or to implement different tasks at different times.

In one or more implementations, one or multiple and different performance measures may be applied to some sensory processing neurons, whereas one or multiple and different measures may be used in the different neurons of the controller.

In one or more implementations, the performance F may be determined as a weighted linear combination of individual performance measures corresponding to individual learning tasks (e.g., supervised, reinforcement, unsupervised, and/or other learning tasks), as described for example, in U.S. patent application Ser. No. 13/487,499, entitled "STOCHASTIC APPARATUS AND METHODS FOR IMPLEMENTING GENERALIZED LEARNING RULES, incorporated supra.

The measure F may be determined, for example, based on a time average of an error measure e, that may be expressed as:

$$E=<e(x(t),y(t)>_t \quad \text{(Eqn. 14)}$$

The controller 520 may be configured to generate the output 508 so as to optimize the performance measure. Optimizing the performance measure may minimize the error of Eqn. 14. In one or more implementations, the performance optimization may comprise maximizing the performance function F.

In one or more implementations, the input 502 x(t) may comprise a desired trajectory, $y^d(t)$ for the plant (e.g., a desired route for a garbage collecting robot). Accordingly, the performance function of Eqn. 13 may be expressed as:

$$F(t)=-E(x_i(t)-y^d(t))^2 \quad \text{(Eqn. 15)}$$

where the variable $x_i(t)$ of the multidimensional input x(t) may be used to characterize the actual plant trajectory.

In some implementations, the learning parameters θ(t) of the dynamic control process that governs the input to output transformations by the controller 520 may be adapted (e.g., changed) in accordance with the performance measure F. In one or more implementations, the parameters θ(t) may form a subset of the state parameters q(t) of the control process. In some implementations, the learning parameters θ(t) may vary slower, compared to the variability time scale of the input, neuron membrane voltage, and/or other state parameters.

In some implementations, the controller may be configured to calculate the baseline of the performance function values (e.g., as a running average) and subtract it from the instantaneous value of the performance function in order to increase learning speed of learning. The learning process may be operated in accordance with a difference between the current value $F(t)^{cur}$ of the performance function and its time average <F>:

$$F(t)=F(t)^{cur}-<F>. \quad \text{(Eqn. 16)}$$

In some implementations, the time average of the performance function may comprise an interval average, where learning occurs over a predetermined interval. A current value of the performance function may be determined at individual steps within the interval and may be averaged over all steps. In some implementations, the time average of the performance function may comprise a running average, where the current value of the performance function may be low-pass filtered according to:

$$\frac{dF(t)}{dt} = -\tau F(t) + F(t)^{cur}, \quad \text{(Eqn. 17)}$$

thereby producing a running average output.

An average and/or a running average may provide methodology for determining predictive qualities of a quantity. The learning process may comprise a difference between the current value $F(t)^{cur}$ of the performance function and its predicted value $\tilde{F}(t)$:

$$F(t)=F(t)^{cur}-\tilde{F}(t). \quad \text{(Eqn. 18)}$$

In one or more implementations, the input 502 and/or the output 508 may be multidimensional. In some implementations, the multidimensional input may comprise multiple channels corresponding, for example, to a particular sensory input such as visual or audio. In one or more implementations, the multichannel input may comprise multiple frequency channels for audio, and/or multiple pixels from an imaging camera, and/or distributed tactile sensors from an artificial skin, and/or distributed proprioceptive sensors on one and/or multiple actuators) In some implementations, the input and/or the output may multiple mixed channels, for example, analog and/or spiking signals, as described in U.S. patent application Ser. No. 13/313,826, entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, incorporated herein by reference in its entirety.

Reinforcement learning in spiking neural networks may be represented using the following general equation described, for example, in co-pending and co-owned U.S. patent application Ser. No. 13/489,280 entitled "STOCHASTIC SPIKING NETWORK APPARATUS AND METHOD", filed Jun. 5, 2012, incorporated supra:

$$\frac{d\theta_i(t)}{dt} = \eta F(t) e_i(t), \quad \text{(Eqn. 19)}$$

where:
- $\theta_i(t)$ is an adaptation (learning) parameter of a synaptic connection between the pre-synaptic neuron i and the post-synaptic neuron j;
- $\eta$ is a parameter referred to as the learning rate, $\eta$ can be a constant parameter or it can be a function of some other system parameters;
- $F(t)$ is a performance function; and
- $e_i(t)$ is eligibility trace, configured to characterize the relations between pre-synaptic and post-synaptic activity.

An exemplary eligibility trace may comprise a temporary record of the occurrence of an event, such as visiting of a state or the taking of an action, or a receipt of pre-synaptic input. The trace may mark the parameters associated with the event as eligible for undergoing learning changes. Examples of the parameters associated with the event may include one or more of the synaptic connection; pre- and/or post-synaptic neuron IDs; and/or other parameters. In some implementations, when a reward signal occurs, only eligible states or actions may be 'assigned credit' or 'blamed' for the error. Thus, the eligibility traces may aid in bridging the gap between the events and the training information.

In some implementations, the adaptive controller 520 of FIG. 5 may comprise spiking neuron network (e.g., the network 400 of FIG. 4). In some implementations, the controller network 400 may be configured to implement the control block 410 and the learning block 420, as illustrated in FIG. 4.

The controller network 400 may comprise the learning block (e.g., the block 420 of FIG. 4), which may implement learning according to the framework described in detail in U.S. patent application Ser. No. 13/487,499, entitled "STOCHASTIC APPARATUS AND METHODS FOR IMPLEMENTING GENERALIZED LEARNING RULES", filed Jun. 4, 2012. Such implementations may enable generalized learning without relying on calculations of the performance function F derivative in order to solve, for example, reinforcement and/or other learning tasks.

In one or more implementations, the controller 520 may optimize performance of the control system (e.g., the system 500 of FIG. 5) that is characterized by minimization of the average value of the performance function $F(x,y,r)$. The above-referenced application describes, in one or more implementations, minimizing the average performance $\langle F \rangle_{x,y,r}$ using, for example, gradient descend algorithms where $$\frac{\partial}{\partial w_i} \langle F(x, y, r) \rangle_{x,y,r} = \left\langle \left\langle F(x, y, r) \frac{\partial}{\partial w_i} \ln(p(y \mid x, w)) \right\rangle_{x,y} \right\rangle_r, \quad \text{(Eqn. 20)}$$

where:

$$\ln(p(y|x,w)) = h(y|x,w) \quad \text{(Eqn. 21)}$$

is the per-stimulus entropy of the system response (or 'surprisal'). The probability of the external signal $p(r|x,y)$ may be characteristic of the external environment and may not change due to adaptation. That property may allow omission of averaging over external signals r in subsequent consideration of learning rules.

Several exemplary implementations of parameter adjustment learning algorithms applicable with spiking control signals are described below. In some implementations, the learning algorithms may comprise a multiplicative online learning rule, where control parameter changes are determined as follows:

$$\Delta w_{ji} = \eta F(x,y,q,r) \partial_{w_{ji}} h_p(y|x,q), \quad \text{(Eqn. 22)}$$

where F is the performance function (cost) and $\partial_{w_{ji}} h_p(y|x) \equiv g_{ji}$ is the score function described above, and $\eta$ is the learning rate configured to determine speed of learning adaptation. The learning method implementation may be advantageous in applications where the performance function $F(t)$ may depend on the current values of the inputs x, outputs y, state variables q, and/or signal r. In some implementations, the control process of the block 520 of FIG. 5 may comprise a stochastic dynamic system. In one or more implementations, the stochastic system may be characterized by an analytical input-output ($x \rightarrow y$) stochastic relationship having a conditional probability distribution (e.g., described by Eqn. 10) associated therewith. In some implementations, the reinforcement learning process of the controller 520 of FIG. 5 may be based on the sensor input 504, 502 and the reinforcement signal 514 (e.g., obstacle collision signal from robot bumpers, distance from robotic arm endpoint to the target position). The reinforcement signal r(t) may inform the adaptive controller that the previous behavior led to "desired" or "undesired" results, corresponding to positive and negative reinforcements, respectively. While the plant (e.g., the drone 510 in FIG. 5) must be controllable (e.g., via the motor commands 508 in FIG. 5) and the control system may be required to have access to appropriate sensory information (e.g., the data 502 in FIG. 5), the detailed knowledge of motor actuator dynamics or of structure and significance of sensory signals may not be required to be known by the controller apparatus 520.

The SNN of the controller 520 may be characterized by a control process comprising the control process internal state variables q. Internal state variables q may comprise a membrane voltage of the neuron, conductance of the membrane, learning parameters, and/or other variables.

The SNN of the control process of the controller 520 may be characterized by learning parameters $\theta(t)$, which may comprise weights w of synaptic connections, firing threshold, resting potential of the neuron, and/or other parameters. In one or more implementations, the parameters $\theta(t)$ may comprise probabilities of signal transmission between the units (e.g., neurons) of the network.

As illustrated in FIG. 4, the learning block 420 of the controller may have access to the system's inputs and outputs, and/or system internal state q. In some implementations, the learning block may be provided with additional inputs 404 (e.g., reinforcement signals) that are related to the current task of the control block.

The learning block may estimate changes of one or more learning parameters $\theta(t)$, (e.g., connection weights w in FIG. 4) in order to minimize the performance function F. The learning block may provide parameter adjustment information $\Delta w$ to the control block 410, for example, as indicated by the arrow 406 in FIG. 4. In some implementations, the learning block may be configured to modify the learning parameters w of the controller block. In one or more implementations (not shown), the learning block may be configured to communicate parameters w (as depicted by the arrow 406 in FIG. 4) for further use by the controller block 410, or to another entity (not shown).

It will be appreciated by those skilled in the arts that the reinforcement learning configuration of the generalized learning controller apparatus 520 of FIG. 5 is used to illustrate exemplary implementations of the disclosure and myriad other configurations may be used with the generalized learning framework described herein.

The learning block (e.g., the block 4202 of FIG. 4) may receive multidimensional sensory input signals x(t) and internal state variables, q(t). A multidimensional sensor input signal x(t) may include the input 502 from the environment and/or the input 504 from the plant and/or the input 508 from the control signal. In one or more implementations, the input {x(t), r(t), q(t)} may be combined by the controller process in order to produce one or multidimensional output signal 508 to, for example, control the plant (e.g., the plant 510).

The adaptive controller may receive, for example, multidimensional feedback signals from the plant, which, in some implementations, may comprise a subset of the sensor inputs.

In some implementations, a score function $$g_i \equiv \frac{\partial h(y|x)}{\partial w_i}$$

may be utilized in order to determine changes for individual spiking neuron parameters. If spiking patterns are viewed on finite interval length T as an input x and output y of the neuron, then the score function may take the following form:

$$g_i = \frac{\partial h(y_T|x_T)}{\partial w_i} = -\sum_{t_l \in y_T} \frac{1}{\lambda(t_l)} \frac{\partial \lambda(t_l)}{\partial w_i} + \int_T \frac{\partial \lambda(s)}{\partial w_i} ds, \quad \text{(Eqn. 23)}$$

where time moments $t_l$ belong to neuron's output pattern $y_T$ (neuron generates spike at these time moments). If an output of the neuron at individual time moments may be considered (e.g., whether there is an output spike or not), then an instantaneous value of the score function may be calculated using a time derivative of the interval score function:

$$g_i = \frac{\partial h_{\Delta t}}{\partial w_i} = \frac{\partial \lambda}{\partial w_i}\left(1 - \sum_l \frac{1-\Lambda(t)}{\Lambda(t)}\delta_d(t-t_l)\right), \quad \text{(Eqn. 24)}$$

where $t_l$ is the time of output spike, and $\delta_d(t)$ is the Kronecker delta.

In one or more implementations, the score function values for the stochastic Integrate-and-Fire neuron discrete time may be determined as follows:

$$g_i = \quad \text{(Eqn. 25)}$$
$$\frac{\partial h_{\Delta t}(y(t)|x)}{\partial w_i} = \kappa\lambda(t)\sum_{t_j^i \in x^i} \alpha(t-t_j^i)\left(1 - \sum_{t^{out} \in y} \frac{\delta_d(t-t^{out})}{\Lambda(t)}\right)\Delta t,$$

where:
$t^{out}$ denotes the output spike time instances,
α denotes the alpha-function, and
$\delta_d(t)$ is the Kronecker delta.
State variables q (e.g., probability of firing λ(t)) associated with the control model may be provided to the learning block 420 via the pathway 405. The learning block 420 of the neuron 430 may receive the output spike train y(t) via the pathway 408_1.

In order to determine the score function, a derivative $$\frac{\partial \lambda(t)}{\partial w_i}$$

of the instantaneous probability density with respect to a learning parameter $w_i$ of the i-th neuron may be utilized. Without loss of generality, two cases of learning are considered below: input weights learning (synaptic plasticity) and stochastic threshold tuning (intrinsic plasticity). In one or more implementations, a derivative of other parameters of the neuron model (e.g., membrane, synaptic dynamic, and/or other constants) may be utilized.

The neuron may receive n input spiking channels. External current to the neuron $I^{ext}$ in the neuron's dynamic equation may be modeled as a sum of filtered and weighted input spikes from all input channels:

$$I^{ext} = \sum_i^n \sum_{t_j^i \in x^i} w_i \varepsilon(t - t_j^i) \quad \text{(Eqn. 26)}$$

where: i is the index of the input channel; $x^j$ is the stream of input spikes on the i-th channel; $t_j^i$ is the times of input spikes in the i-th channel; $w_i$ is the weight of the i-th channel; and $\epsilon(t)$ is a generic function that models post-synaptic currents from input spikes. In some implementations, the post-synaptic current function may be configured as: $\epsilon(t)=\delta(t)$, and/or $\epsilon(t)=e^{-t/t_s}H(t)$ where $\delta(t)$ is a delta function, H(t) is a Heaviside function, and $t_s$ is a synaptic time constant for an input spike at time t=0.

A derivative of instantaneous probability density with respect to the i-th channel's weight may be taken using the chain rule:

$$\frac{\partial \lambda}{\partial w_i} = \sum_j \left(\frac{\partial \lambda_i}{\partial q_j} \cdot \nabla w_i q_j\right) \quad \text{(Eqn. 27)}$$

where $$\frac{\partial \lambda}{\partial \vec{q}}$$

is a vector of derivatives of instantaneous probability density with respect to the state variable; and $$S_i(t) = \nabla_{w_i} \vec{q} \quad \text{(Eqn. 28)}$$

is the gradient of the neuron internal state with respect to the $i^{th}$ weight (also referred to as the i-th state eligibility trace). In order to determine the state eligibility trace of Eqn. 28 for generalized neuronal model, such as, for example, described by Eqn. 4 and Eqn. 7, derivative with respect to the learning weight W may be determined as:

$$\frac{\partial}{\partial w_i}\left(\frac{d\vec{q}}{dt}\right) = \quad \text{(Eqn. 29)}$$

$$\frac{\partial}{\partial w_i}(V(\vec{q})) + \frac{\partial}{\partial w_i}\left(\sum_{t^{out}} R(\vec{q})\delta(t-t^{out})\right) + \frac{\partial}{\partial w_i}(G(\vec{q})I^{ext})$$

The order in which the derivatives in the left side of the equation Eqn. 29 are taken may be changed, and then the chain rule may be used to obtain the following expressions (arguments of evolution functions are omitted):

$$\frac{dS_i(t)}{dt} = (J_V(\vec{q}) + J_G(\vec{q})\cdot I^{ext})\cdot S_i + \quad \text{(Eqn. 30)}$$

$$\sum_{t^{out}} J_R(\vec{q})\cdot S_i \cdot \delta(t-t^{out}) + G(\vec{q})\sum_{t^i_j \in x^j} \varepsilon(t-t^i_j),$$

where $J_F$, $J_R$, $J_G$ are Jacobian matrices of the respective evolution functions V,R,G.

As an example, evaluating Jacobean matrices for the IF neuron may produce:

$$J_V = -C; J_R = -1; G(\vec{q}) = 1; J_G = 0, \quad \text{(Eqn. 31)}$$

Accordingly, Eqn. 30 for the i-th state eligibility trace may take the following form:

$$\frac{d}{dt}u_{w_i} = -Cu_{w_i} - \sum_{t^{out}} u_{w_i}\cdot\delta(t-t^{out}) + \sum_{t^i_j \in x^i} \varepsilon(t-t^i_j) \quad \text{(Eqn. 32)}$$

where $u_{w_i}$ denotes derivative of the state variable (e.g., voltage) with respect to the i-th weight.

A solution of Eqn. 32 may represent the post-synaptic potential for the i-th unit and may be determined as a sum of all received input spikes at the unit (e.g., a neuron), where the unit is reset to zero after each output spike:

$$u_{w_i} = \sum_{t^i_j \in x^i} \int_{-\infty}^{t} e^{-(t-\tau)C}\varepsilon(\tau-t^i_j) = \sum_{t^i_j \in x^i} \alpha(t-t^i_j) \quad \text{(Eqn. 33)}$$

where $\alpha(t)$ is the post-synaptic potential (PSP) from the $j^{th}$ input spike.

Applying the framework of Eqn. 30-Eqn. 33 to a previously described neuronal (hereinafter IZ neuron), the Jacobian matrices of the respective evolution functions F,R,G may be expressed as:

$$J_V = \begin{pmatrix} 0.08v(t)+5 & -1 \\ ab & a \end{pmatrix}; \quad \text{(Eqn. 34)}$$

$$J_R = \begin{pmatrix} -1 & 0 \\ 0 & 0 \end{pmatrix};$$

$$G(\vec{q})\begin{pmatrix} 1 \\ 0 \end{pmatrix};$$

$$J_G = \begin{pmatrix} 0 \\ 0 \end{pmatrix}.$$

The IZ neuronal model may further be characterized using two first-order nonlinear differential equations describing time evolution of synaptic weights associated with each input interface (e.g., pre-synaptic connection) of a neuron, in the following form:

$$\frac{d}{dt}v_{w_i} = \quad \text{(Eqn. 35)}$$

$$(0.08v+5)v_{w_i} - u_{w_i} - \sum_{t^{out}} u_{w_i}\cdot\delta(t-t^{out}) + \sum_{t^i_j \in x^i} \varepsilon(t-t^i_j)$$

$$\frac{d}{dt}u_{w_i} = abv_{w_i} - au_{w_i}.$$

When using the exponential stochastic threshold configured as:

$$\lambda = \lambda_0 e^{\kappa(v(t)-\theta)}, \quad \text{(Eqn. 36)}$$

then the derivative of the instantaneous probability for IZ neuronal neuron may be expressed as:

$$\frac{\partial \lambda}{\partial w_i} = v_{w_i}\kappa\lambda(t). \quad \text{(Eqn. 37)}$$

Using the exponential stochastic threshold Eqn. 11, the expression for the derivative of instantaneous probability $$\frac{\partial \lambda(t)}{\partial w}$$

for IZ neuron may be written as:

$$\frac{\partial \lambda}{\partial w_i} = \frac{\partial \lambda}{\partial u}\frac{\partial u}{\partial w_i} = \kappa\lambda(t)\sum_{t^i_j \in x^i}\alpha(t-t^i_j). \quad \text{(Eqn. 38)}$$

Combining Eqn. 38 with Eqn. 24 we obtain score function values for the stochastic Integrate-and-Fire neuron in continuous time-space as:

$$g_i = \frac{\partial h(y(t)\mid x)}{\partial w_i} = \kappa\sum_{t^i_j \in x^i}\alpha(t-t^i_j)\left(\lambda(t) - \sum_{t^{out}\in y}\delta(t-t^{out})\right) \quad \text{(Eqn. 39)}$$

and in discrete time:

$$g_i = \quad \text{(Eqn. 40)}$$

$$\frac{\partial h_{\Delta t}(y(t)\mid x)}{\partial w_i} = \kappa\lambda(t)\sum_{t^i_j \in x^i}\alpha(t-t^i_j)\left(1 - \sum_{t^{out}\in y}\frac{\delta_d(t-t^{out})}{\Lambda(t)}\right)\Delta t.$$

In one or more implementations, the input interfaces (e.g., the connections 414 of the network 400 of FIG. 4) may be operated according a linear dynamic process that may be expressed as:

$$\frac{d\vec{S}_i(t)}{dt} + A(q, t, t^{out})\vec{S}_i(t) = \quad \text{(Eqn. 41)}$$

$$\vec{k}_i \sum_j \delta(t - t_j^{in}) + \sum_{t^{out}} Rs(t)\delta(t - t^{out}),$$

and $$\frac{de_i(t)}{dt} + \frac{e_i(t)}{\tau} = Q(t)S_i(t). \quad \text{(Eqn. 42)}$$

where:

A(t) is a stable matrix, dependent on the state q of the neuron, output spike time $t^{out}$, and/or time;

$\Sigma_j \delta(t-t_j^{in})$ is the term describing the input spike train;

$\vec{k}_i$ is vector coefficient characterizing individual synapses and effect of the presynaptic spikes on it; and Rs(t) describes resetting the synapse state vector $\vec{S}_i$ after the output spikes at $t^{out}$.

It will be appreciated by those skilled in the arts that neural network dynamics represented by Eqn. 41 and Eqn. 42 may comprise some implementations and the framework of the innovation is not so limited and may be utilized with any network synaptic dynamics that may be described using linear and stable process so that superposition principle may be used.

The controller 520 may determine changes of the learning parameters $\Delta w_i$ according to a predetermined learning algorithm, based on the performance function F and the gradient g.

In some implementations, the control parameter adjustment $\Delta w$ may be determined using an accumulation of the score function gradient and the performance function values, and applying the changes at a predetermined time instance (corresponding to, e.g., the end of the learning epoch):

$$\Delta \vec{w}(t) = \frac{\gamma}{N^2} \cdot \sum_{i=0}^{N-1} F(t - i\Delta t) \cdot \sum_{i=0}^{N-1} \vec{g}(t - i\Delta t), \quad \text{(Eqn. 43)}$$

where: T is a finite interval over which the summation occurs; N is the number of steps; and $\Delta t$ is the time step determined as T/N.

The summation interval T in Eqn. 43 may be configured based on the specific requirements of the control application. By way of illustration, in a control application where a robotic arm is configured to reaching for an object, the interval may correspond to a time from the start position of the arm to the reaching point and, in some implementations, may be about 1s-50s. In a speech recognition application, the time interval T may match the time required to pronounce the word being recognized (typically less than 1 s-2 s). In some implementations of spiking neuronal networks, $\Delta t$ may be configured in range between 1 ms and 20 ms, corresponding to 50 steps (N=50) in one second interval.

The method of Eqn. 43 may be computationally expensive and may not provide timely updates. Hence, it may be referred to as the non-local in time due to the summation over the interval T. However, it may lead to unbiased estimation of the gradient of the performance function.

In some implementations, the control parameter adjustment $\Delta w_i$ may be determined by calculating the traces of the score function $e_i(t)$ for individual parameters $w_i$. In some implementations, the traces may be computed using a convolution with an exponential kernel $\beta$ as follows:

$$\vec{e}(t+\Delta t) = \beta \vec{e}(t) + \vec{g}(t), \quad \text{(Eqn. 44)}$$

where $\beta$ is the decay coefficient. In some implementations, the traces may be determined using differential equations:

$$\frac{d}{dt}\vec{e}(t) = -\tau \vec{e}(t) + \vec{g}(t). \quad \text{(Eqn. 45)}$$

The control parameter w may then be adjusted according to Eqn. 19. The method of Eqn. 44-Eqn. 45 may be appropriate when a performance function depends on current and past values of the inputs and outputs and may be referred to as the OLPOMDP algorithm. While it may be local in time and computationally simple, it may lead to biased estimate of the performance function. By way of illustration, the methodology described by Eqn. 44-Eqn. 45 may be used, in some implementations, in a rescue robotic device configured to locate resources (e.g., survivors, or unexploded ordinance) in a building. The input x may correspond to the robot current position in the building. The reward r (e.g., the successful location events) may depend on the history of inputs and on the history of actions taken by the agent (e.g., left/right turns, up/down movement, and/or other actions).

In some implementations, the control parameter adjustment $\Delta w$ determined using methodologies of the Eqns. 16, 17, 19 may be further modified using, in one variant, gradient with momentum according to:

$$\Delta \vec{w}(t) \leftarrow \mu \Delta \vec{w}(t-\Delta t) + \Delta \vec{w}(t), \quad \text{(Eqn. 46)}$$

where $\mu$ is the momentum coefficient. In some implementations, the sign of gradient may be used to perform learning adjustments as follows:

$$\Delta w_i(t) \Rightarrow \frac{\Delta w_i(t)}{|\Delta w_i(t)|}. \quad \text{(Eqn. 47)}$$

In some implementations, gradient descend methodology may be used for learning coefficient adaptation.

In some implementations, the gradient signal g, determined by the learning process may be subsequently modified according to another gradient algorithm, as described in detail below. In some implementations, these modifications may comprise determining natural gradient, as follows:

$$\Delta \vec{w} = \langle \vec{g} \cdot \vec{g}^T \rangle_{x,y}^{-1} \cdot \langle \vec{g} \cdot F \rangle_{x,y}, \quad \text{(Eqn. 48)}$$

where $(\vec{g}\vec{g}^T)_{x,y}$ is the Fisher information metric matrix. Applying the following transformation to Eqn. 21:

$$\langle \vec{g}(\vec{g}^T \Delta \vec{w} - F) \rangle_{x,y} = 0, . \quad \text{(Eqn. 49)}$$

The natural gradient from linear regression task may be obtained as follows:

$$G\Delta \vec{w} = \vec{F}, \quad \text{(Eqn. 50)}$$

where $G=[\vec{g_0}^T, \ldots, \vec{g_n}^T]$ is a matrix comprising n samples of the score function g, $\vec{F}^T=[F_0, \ldots, F_n]$ is the a vector of performance function samples, and n is a number of samples that should be equal or greater of the number of the parameters $w_i$. While the methodology of Eqn. 48-Eqn. 50 may be computationally expensive, it may help dealing with 'plateau'-like landscapes of the performance function.

In some implementations, a plasticity mechanism may comprise adjusting one or more intrinsic parameters (e.g., ($\lambda_o$, $\kappa$, $u_{th}$), in Eqn. 11). The intrinsic plasticity may comprise modifying a probabilistic parameter $K \equiv 1/\kappa$ which may be expressed as the inverse of the stochastic parameter $\kappa$ and/or other parameters.

In some implementations, learning based solely on intrinsic plasticity mechanism may be more efficient and effective than learning based on synaptic connection plasticity (e.g. weight plasticity). When the number of parameters per neuron is smaller compared to number of synaptic connection parameters, an intrinsic plasticity based learning may converge faster compared to the synaptic connection plasticity.

In some implementations, intrinsic plasticity based learning may be combined with synaptic plasticity learning. In one or more implementations, such plasticity combination may increase learning rate. Convergence to a solution may be attainable with fewer parameter changes since changes of one or more intrinsic parameters (e.g. the stochastic parameter in FIG. 17) may more effectively modify the response of the neuron compared to, for example, the same number of changes in one and/or different synaptic connectivity parameters (e.g. weights).

In some implementations, combining intrinsic plasticity and synaptic plasticity may improve the probability of converging to a solution due to an increased exploration of the space of possible responses of the neuron.

In some implementations, combining intrinsic plasticity and synaptic plasticity may increase the probability of learning process convergence to a target outcome. The neuron output spike distribution may be restricted by the intrinsic parameters to emulate a target response distribution which is to be obtained by synaptic connectivity plasticity. In one or more implementations, the target response distribution may comprise e.g., a sparse distribution and/or a Poisson distribution. The intrinsic plasticity may aid to set the response of the neuron in a particular configuration. Such configuration may act as teaching signal and/or exemplary signals for synaptic connectivity adaptation. Through this process, the intrinsic plasticity may be used in obtaining sparse representations. The sparse representations, may lead to, for example, formation of edges from visual images. The sparse representations may be used in maximizing information transmission and in learning independent component analysis with neurons, among possible applications.

In some implementations, the intrinsic plasticity may be implemented using performance function F, as described below. The score function g for an arbitrary intrinsic parameter $\theta$ of the neuron may be expressed as:

$$g_\vartheta \equiv \frac{\partial h(y \mid x)}{\partial \vartheta} \equiv \partial_\vartheta h(y \mid x, \vartheta), h(y \mid x, \vartheta) = -\ln(p(y \mid x, \vartheta)), \quad \text{(Eqn. 51)}$$

and may be utilized in order to determine changes for a particular parameter $\theta$ of individual spiking neuron (e.g., the neuron 430 in FIG. 4). By way of illustration, score functions of the stochastic neuron characterized by the exponential stochastic threshold of Eqn. 11 may be expressed in continuous-time domain as:

$$\partial_{\lambda_o} h_p(y \mid x) = -\frac{1}{\lambda_o}\left[\sum_{t_f} 1 - \int_0^T \lambda(u(\tau))d\tau\right] \quad \text{(Eqn. 52)}$$

$$\partial_K h_p(y \mid x) = -\left[\sum_{t_f}(u(t_f) - u_{th}) - \int_0^T \lambda(u(\tau))(u(\tau) - u_{th})d\tau\right] \quad \text{(Eqn. 53)}$$

$$\partial_{u_{th}} h_p(y \mid x) = -K\left[\sum_{t_f} 1 - \int_0^T \lambda(u(\tau))d\tau\right] \quad \text{(Eqn. 54)}$$

where $t_f$ are the times of neuron output spike generation and $$h_p(y/x) = -\ln p(y/x). \quad \text{(Eqn. 55)}$$

Similarly, in discrete time-domain, the score functions of the stochastic neuron characterized by the exponential stochastic threshold of Eqn. 11 may become:

$$\partial_{\lambda_o} h_p(y \mid x) = -\frac{\Delta\tau}{\lambda_o}\left[\sum_{t_f}\frac{[1-\Lambda(u(t_f))]}{\Lambda(u(t_f))}\lambda(u(t_f)) - \sum_{\tau=0}^T \lambda(u(\tau))\right] \quad \text{(Eqn. 56)}$$

$$\partial_K h_p(y \mid x) = \quad \text{(Eqn. 57)}$$
$$-\Delta\tau\left[\sum_{t_f}\frac{[1-\Lambda(u(t_f))]}{\Lambda(u(t_f))}(u(t_f) - u_{th}) - \sum_{\tau=0}^T \lambda(u(\tau))(u(\tau) - u_{th})\right]$$

$$\partial_{u_{th}} h_p(y \mid x) = Ks\Delta\tau\left[\sum_{t_f}\frac{[1-\Lambda(u(t_f))]}{\Lambda(u(t_f))}\lambda(u(t_f)) + \sum_{\tau=0}^T \lambda(u(\tau))\right] \quad \text{(Eqn. 58)}$$

where
$u_j(t^f) = \Sigma_j w_{ji}\alpha(t_j^f - t_i)$ for the spike response model,
$t_i$ are the times of the input spikes in to the neuron from i-th synapse,
$\alpha(\cdot)$ is the response of the neuron to the input spike, and
$w_{ji}$ are the synaptic weights.

In some implementations, the neuron response $\alpha(s)$, may be described using an exponential function as:

$$\alpha(s) = \frac{\alpha_o}{\tau_s} e^{-\left(\frac{s}{\tau_s}\right)}\Theta(s), \quad \text{(Eqn. 59)}$$

where:
$\alpha_o/\tau_s$ is the maximum response of the neuron to the input spike,
$\tau_s$ is the time constant of the exponential decay, and
$\Theta(s)$ is the Heaviside step function.

For a finite rise time $\tau_r$ and a transmission delay $\Delta$ the neuron response may be described as:

$$\alpha(s) = \frac{\alpha_o}{\tau_s - \tau_r}\left[e^{-\left(\frac{s-\Delta}{\tau_s}\right)} - e^{-\left(\frac{s-\Delta}{\tau_r}\right)}\right]\Theta(s - \Delta),\quad \text{(Eqn. 60)}$$

and in the limit $\tau_r \to \tau_s$, $$\alpha(s) = \frac{\alpha_o(s - \Delta)}{\tau_s^2}\left[e^{-\left(\frac{s-\Delta}{\tau_s}\right)}\right]\Theta(s - \Delta),\quad \text{(Eqn. 61)}$$

which is a common form for the alpha function.

In some implementations, the degree of stochasticity (i.e. the intrinsically non-deterministic behavior or the probabilistic response) of the neuron 430 may be modified during learning and/or during operation after learning. In some implementations, the stochasticity may be adjusted by changing one or more intrinsic plasticity parameters of the stochastic neuron model presented above: the stochasticity parameter κ of Eqn. 11 above. In some implementations, the stochasticity may be altogether removed after learning thereby obtaining a deterministic controller apparatus. In some implementations, the stochasticity removal may be achieved, for example, by setting the stochasticity parameter κ to a very small value, e.g., 0.01 and/or smaller. In one or more implementations, the stochasticity parameter κ may be regulated according to the performance function F, described for example, by Eqn. 13.

Figure 17:
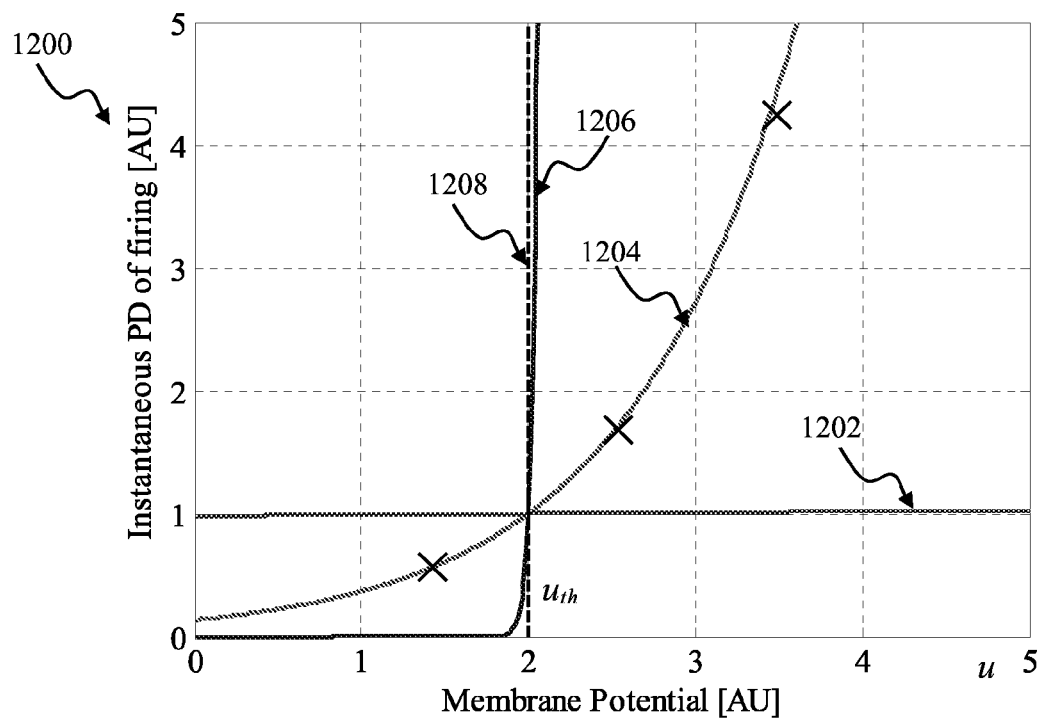
FIG. 17 is a plot illustrating effects of neuron stochasticity on a probability of neuron response generation, in accordance with some implementations.
Figure 17:
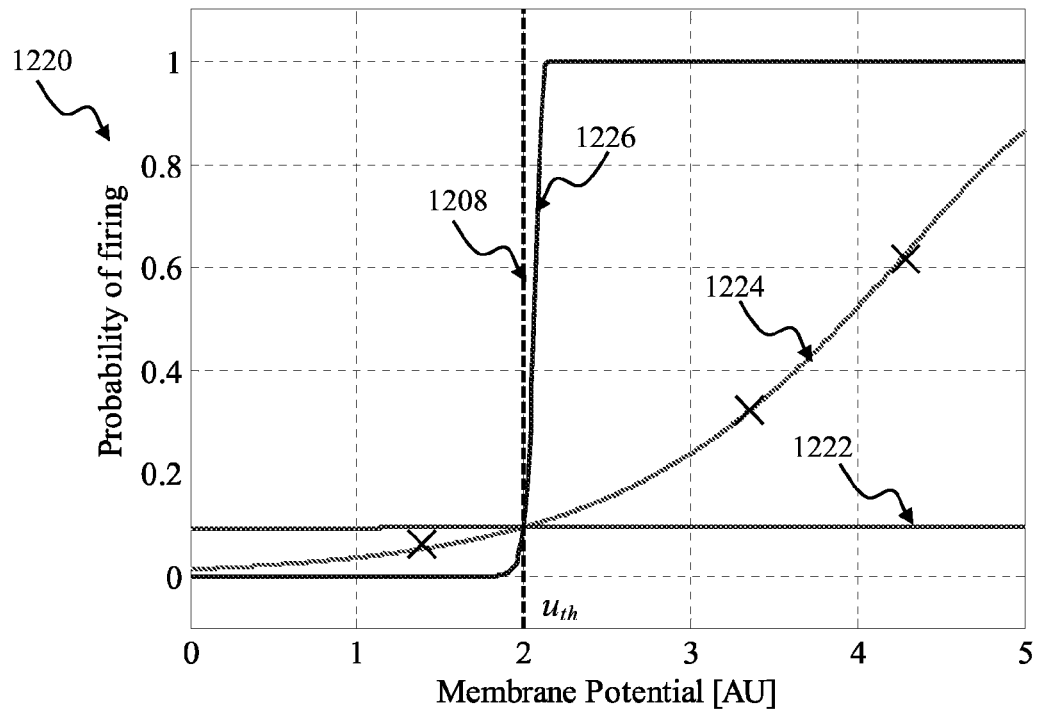

FIG. 17 illust2ates the effects of changes of the neuron stochasticity level on a probability of response generation by the neuron, in accordance with some implementations. The panel 1700 of FIG. 17 presents data detailing the instantaneous probability density (PD) of a response by a neuron as a function of neuron excitability (e.g., parameterized by the membrane potential u in FIG. 17). The panel 1720 of FIG. 17 presents data detailing the probability of the response as a function of excitability u. Different curves denoted (1702, 1722), (1704, 1724), and (1706, 1726) correspond to the following values of the stochasticity parameter κ, in, for example, Eqn. 22: 100, 10, 0.03 respectively. The deterministic threshold $u_{th}$ is denoted by the line 1708 in FIG. 17.

Highly stochastic neurons (as depicted by the curves 1702, 1222 in FIG. 12, corresponding to κ=100) may exhibit firing substantially independent on their excitability (membrane potential). Such neurons may be equally likely to respond to one or more stimuli.

Neurons with low stochasticity (as depicted by the curves 1206, 1226 in FIG. 12, corresponding to κ=0.03.) may exhibit firing, with substantially bi-modal behavior characterized by an area of near-zero probability of firing when $u<u_{th}$ and an area where the probability of firing is near unity for $u>u_{th}$. The two areas (e.g., p~0, and p~1) may be separated by a narrow transition zone, as shown in the panel 1220 FIG. 12. The neuron behavior, depicted by the curves 1206, 1226, may be characterized as (near)-deterministic as the neuron response state (i.e., firing and/or non-firing) may be predicted with a high degree of certainty based on the value of the neuron excitability (e.g., membrane potential in FIG. 12).

When the stochasticity parameter is in between the two regimes (as illustrated by the curves 1204, 1224 in FIG. 12, corresponding to κ=10), the firing rate of the neuron may be a function of the input stimulus (excitability). Varying the stochasticity parameter enables adaptive adjustment of the neuron response. In some implementations, adjusting the stochasticity parameter may enable control of exploration by the network. By way of illustration, during initial stages of learning, (e.g., when the current outcome may be far from the target outcome) the stochasticity parameter may be increased to allow for rapid exploration of various solutions in order to arrive at the target outcome. As the current outcome learns to approach the target (e.g., a robotic manipulator arm approaches the target) the stochasticity level may be reduced. In some implementations, reduced stochasticity may be further used for reducing computational load, power consumption (and or cost) associated with operating a robotic device after learning has commenced.

In some implementations, stochasticity adjustment may be used to control degree of exploration by the spiking network controller during learning.

Figure 12:
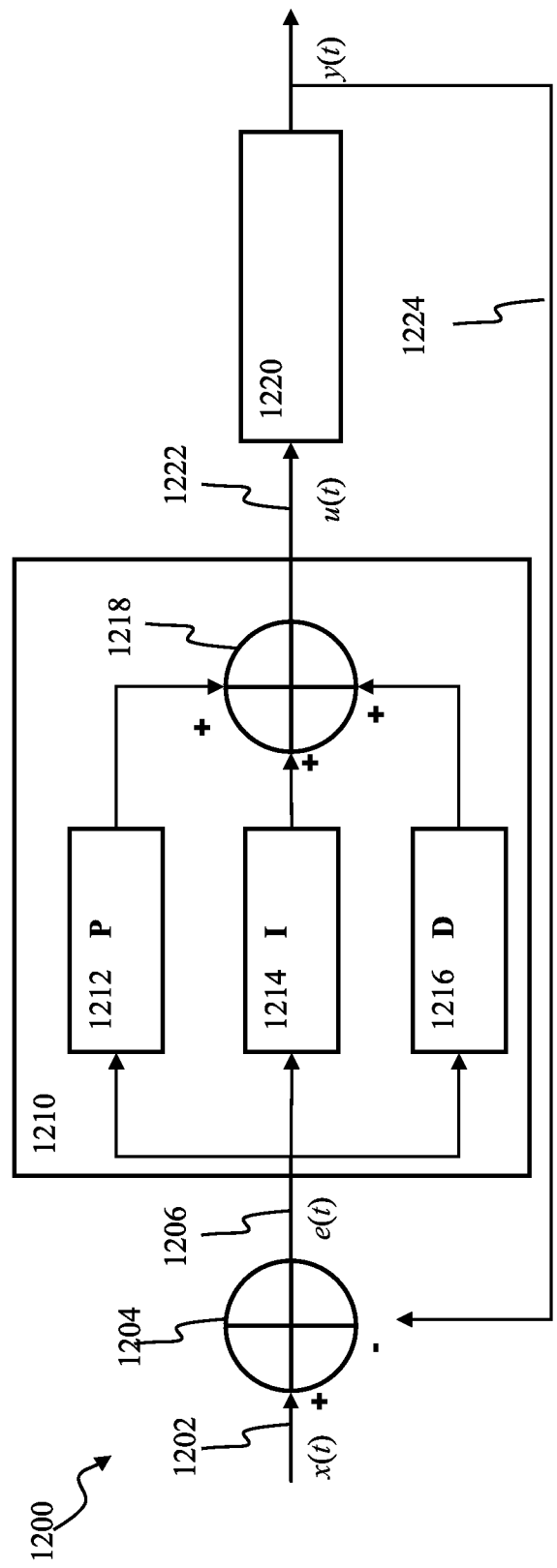
FIG. 12 is a block diagram illustrating proportional-integral-derivative controller useful with the kernel expansion encoding mechanism in a spiking network, in accordance with one or more implementations.

In some implementations, at initial stages of learning (e.g., the stages denoted 920, 922 in FIG. 9C) stochasticity of some or all neurons within the network may be set to a high level (by setting K to a large value, e.g., 100 in FIG. 12). Highly stochastic neurons may more likely respond to a wide range of inputs, as depicted by the curve 1222 in FIG. 12, thereby facilitating exploration of alternate routes towards the target outcome. When the target outcome is reached (e.g., the pendulum is stabilized as illustrated by the segment 924 in FIG. 9C) the stochasticity level may be reduced. In some implementations, when the target outcome is reached the stochasticity level may be reduced sufficiently in order to transition to deterministic neuron network.

In some implementations, the stochasticity may be gradually reduced as the network performance (e.g., indicated by the position error of the stage 922 in FIG. 9C) improves. In one implementation, the learning rate (e.g., as described by Eqn. 19) may be gradually reduced as well during learning as the network performance improves. When learning is complete, the weight adaptation (e.g., of Eqn. 19) may be turned off altogether during subsequent network operation. Upon completion of training, the network (e.g., the network of the controller 620 in FIG. 6A) may be operated in a deterministic mode (e.g., low stochasticity) without learning.

In one or more implementations, the network stochasticity level may be adjusted in accordance with network performance measure (e.g., the performance function Eqn. 13). In one implementation, the stochasticity may be set to an initial value (e.g., high, low, or moderate) at the beginning of learning. During network operation, when learning process performance improves, the stochasticity level may be decreased. When the performance does not improve (e.g., gets worse) and/or does not improve rapidly enough (e.g., the rate of change of performance is below a target level) the stochasticity may be increased to, inter alia, increase exploration.

It will be recognized by those skilled in the arts that stochasticity adjustments may be effectuated on all neurons of the network or portions of the network neurons. In some implementations, stochasticity adjustment parameter may be used to tune stochasticity of individual neurons, as may be required by the control application.

As seen from FIG. 17, high stochasticity levels may cause higher spike rates, particularly when neuron excitability is sub-threshold. Such extraneous spiking activity may cause excessive energy use by the network processing apparatus, cause additional processing load, and/or add unwanted noise to the control process during operation. While the adaptive stochasticity control may advantageously be utilized to increase learning speed of the network when required, subsequent lowering of the stochasticity may reduce energy use and/or spiking noise when, for example, the target performance is attained.

In some implementations, a robotic device may utilize additional processing resources (e.g., processing and/or memory cells 1140 of FIG. 11C and/or 1152 of FIG. 11D) in order to enable rapid exploration and learning using stochasticity level control described supra. Upon commencement of learning, the network (or a portion thereof) may be reconfigured to operate in a deterministic mode with or without weight adaptation as described above. Processing resources, which may become available due to network reconfiguration, may be retargeted at other applications and/or powered off to save energy. In one application, rapid learning described above may be implemented on a high-performance platform (for example at a manufacturing facility fabricating robots and/or controllers). During subsequent operation, the robotic controller may employ a lower-performance version of the controller hardware (e.g., comprising fewer processing and/or memory cells) so as to reduce controller cost, size, and/or energy use.

As used herein, the controller inputs 502, 504, the output 508 and the reinforcement signal 514 may comprise real-world signals, such as continuous analog and/or digitized signals (e.g., temperature, velocity, position, and/or other parameters) and/or discrete signals (image pixel arrays, servo motor position index, engine power states (e.g., high, medium, low), logic states (positive, negative reinforcement), and/or any other signal types that may describe real-world pant and/or environment.

As the controller comprises a network of spiking neurons communicating via spikes, the input signals need to be converted (encoded) into spikes and neuron output needs to be converted from spikes into real-world continuous signal. In one or more implementations, encoding of the input (e.g., the input 502, 506 in FIG. 5) may be achieved using Kernel Expansion (KE) methodology. This technique, also referred to, as the "kernel trick" in machine learning arts, is described in detail with respect to FIGS. 6A-7C below.

Figure 6A:
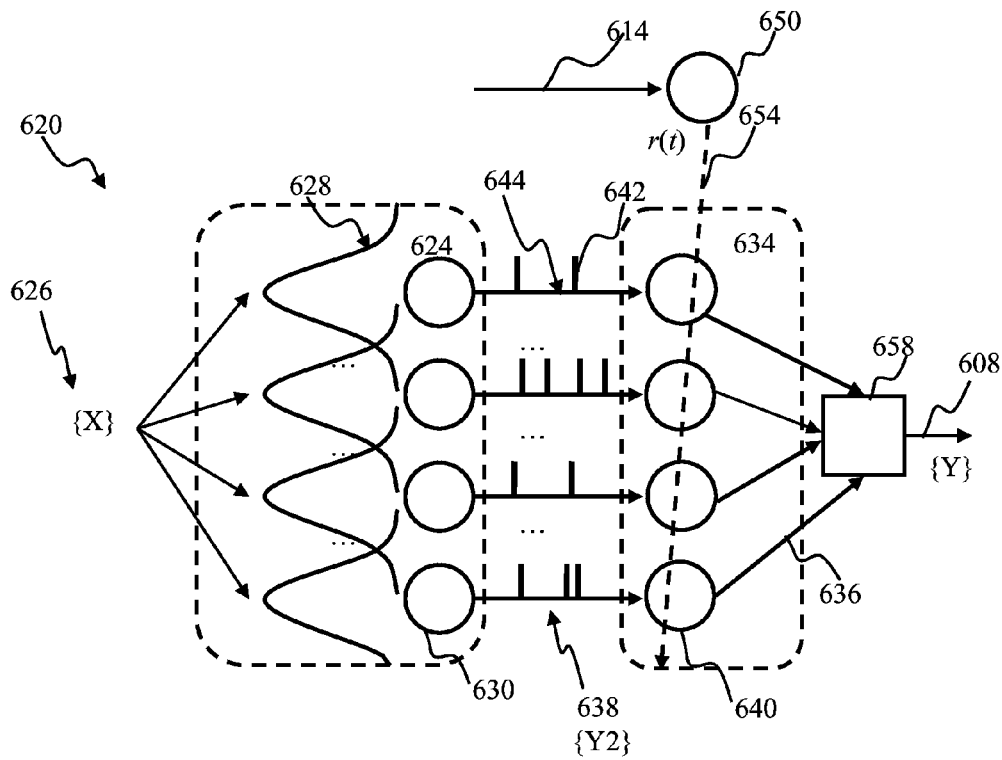
FIG. 6A is a block diagram illustrating spiking neuron network for use with the adaptive controller apparatus of FIG. 5, in accordance with some implementations.
Figure 6B:
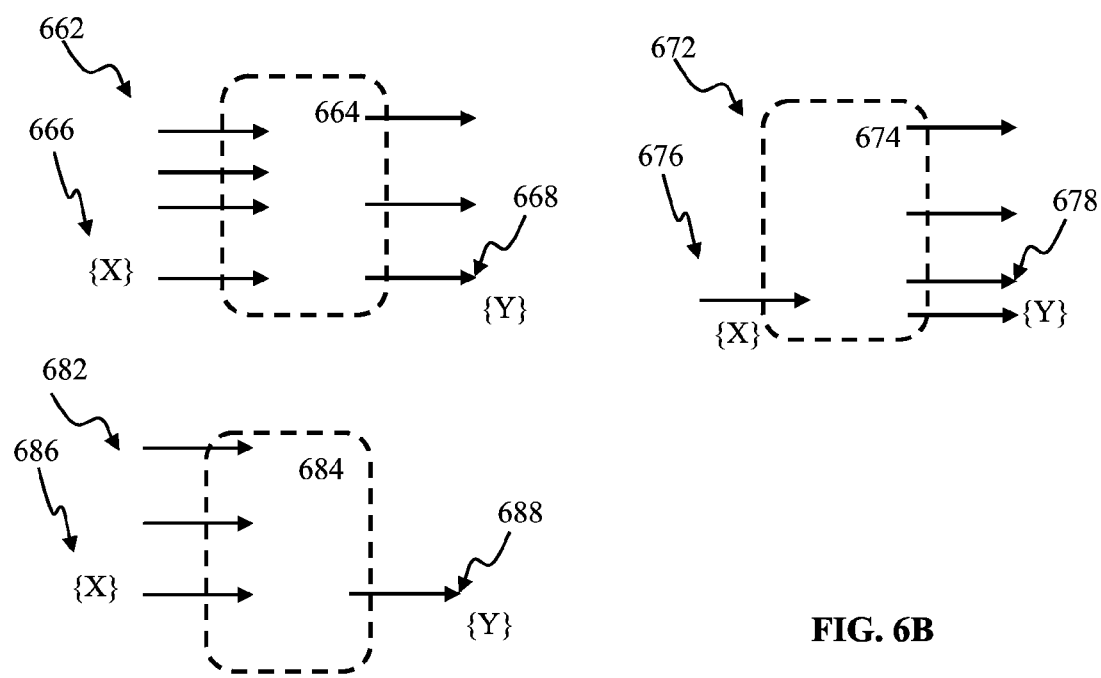
FIG. 6B is a block diagram illustrating input/output configurations for use with the neuron network of FIG. 6A, in accordance with one or more implementations.
Figure 7A:
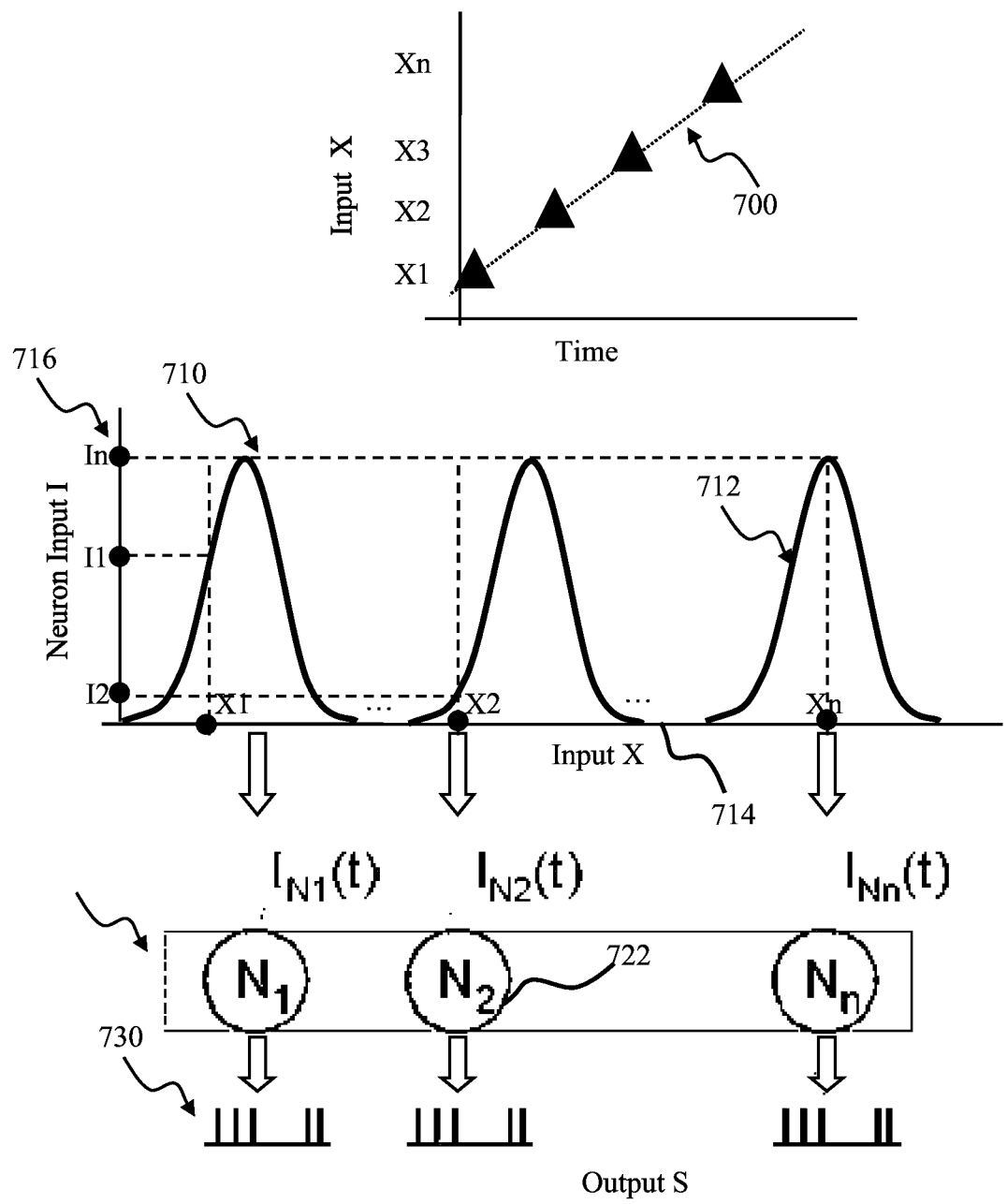
FIG. 7A is a graphical illustration depicting the "kernel expansion" input encoding methodology, according to some implementations.

FIG. 7A illustrates conversion of a non-spiking input {X} into spiking output S. The input 700 may comprise a time varying sample vector X={x1, x2, x3, . . . , xn}. The input signal may be coupled to encoding neuron layer 720 (e.g., the layer 624 of FIG. 6A) comprising neurons 722, shown in FIG. 7. Each neuron may be characterized by a respective receptive field 712, comprising a region in the input space X in which the presence of a stimulus may alter the response of the neuron. Accordingly, such neuron may selectively respond to input (in the signal space) that matches its receptive field, thereby enabling the transformation of the physical variable into a spike output.

In some implementations, the basis function may comprise operators with spatial and/or temporal components. The operator examples may include one or both of a linear operator (e.g., derivative, $2^{nd}$ derivative) and/or a nonlinear operator (e.g., a Fourier or a Laplace transform). In some implementations, the neuron (e.g., the neuron 630) comprising basis function with an operator may respond to inputs comprising a particular pattern (in time) in addition to the variability along the X-dimension (e.g., the dimension 714 in FIG. 7). For example, when the operator comprises a derivative operation, the activity pattern that may activate the neuron may comprise a change of input values in time or along the X-dimension.

In some implementations, the receptive fields of the encoder neurons (e.g., the neurons 722 in FIG. 7A) may be used to represent a layout of physical and/or virtual sensors in a physical and/or virtual substrate, for example, sensitivity of range sensors and or camera les aperture. In such implementations, the individual sensors may be insensitive to spatial variations of the physical signal, since the sensors may be localized in physical space and may not have access to this information. Such neurons will thus have to be sensitive by construction to the amplitude of the physical signal, as presented above, and/or in addition, may be sensitive to the time variations of the incoming physical or virtual signal.

In some implementations, such as for skin receptors, the encoder neurons may respond to the curvature of the skin deformation, which is a local reading of a spatial variation of the physical signal (e.g., skin deformation).

The panel 710 in FIG. 7 depicts exemplary response of the receptive fields 712 to input X 700. As shown in FIG. 7, the input values {x1, x2, . . . , xn} may cause input {I1, I2, . . . In] into neurons 720 (e.g., the input $I^{ext}$ of Eqn. 1). As illustrated in the implementation of FIG. 7, input signal 700 varying along the y-axis is mapped onto the horizontal axis of the basis function input space. The basis function input sensitivity may cause transformation of the input x-value into the y-value corresponding to the input current for the neuron process. The input current I of a neuron may be based on the value of that neuron basis function when the input x value falls within the neuron receptive field.

Spatially variable receptive field sensitivity effectuated by the neurons 720 (shown by the curves 712 in FIG. 7A) may enable the transformation of the input X into the neuron input current $I^{ext}$. The sensitivity of the neuron receptive fields 710 may form a set of basis functions configured to enable representation of the input as a superposition of a plurality of basis components 720. In some implementations, the basis components may comprise linear, nonlinear and/or a complex valued component combination.

Figure 7B:
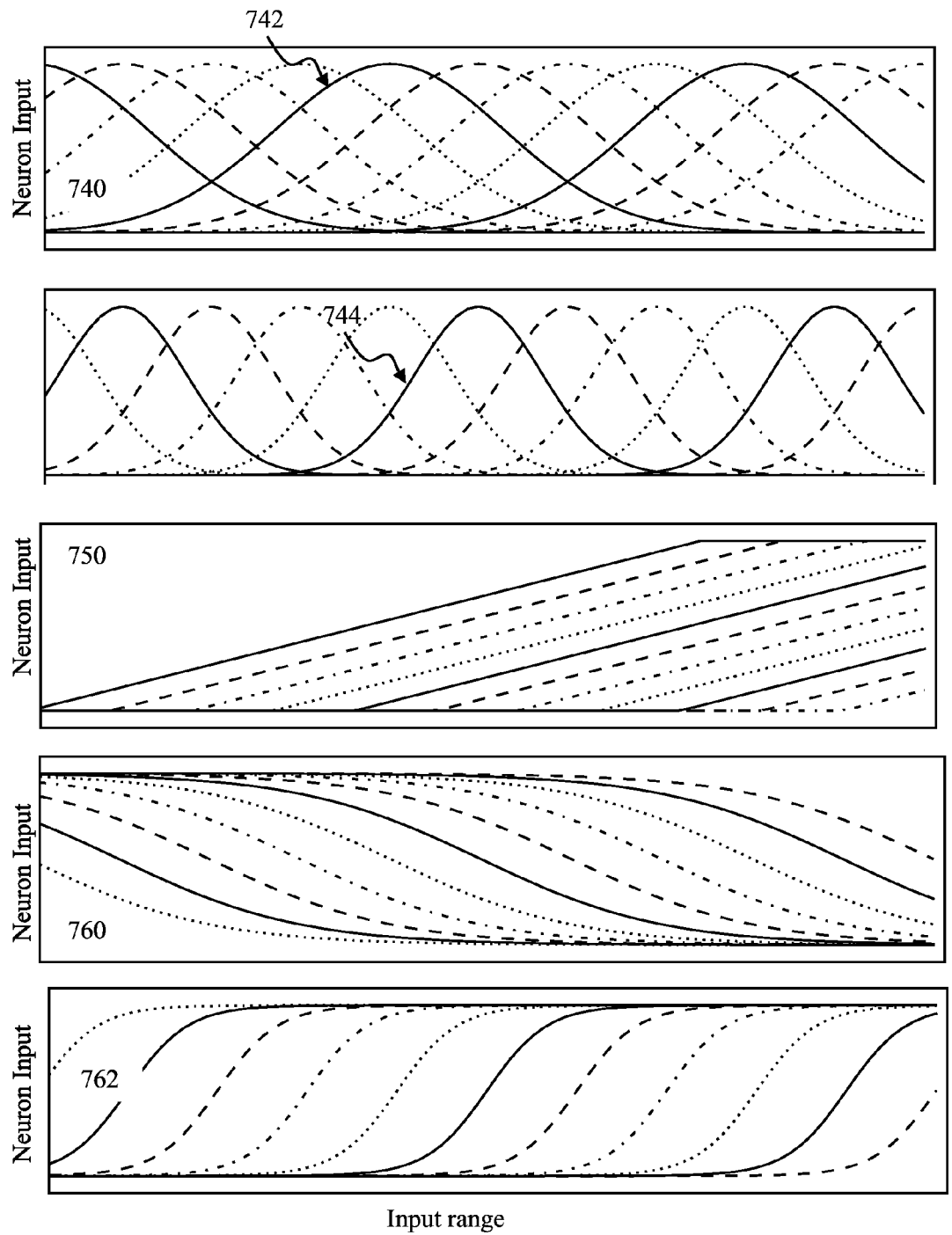
FIG. 7B is a plot presenting basis functions for use with the "kernel expansion" input encoding methodology of FIG. 7A, in accordance with some implementations.

FIG. 7B illustrates various exemplary realizations of basis component responses useful with the disclosure. The panels 740, 750 illustrate radial basis function (RBF) characterized by Gaussian and linear responses, respectively. The RBF shown in FIG. 7B are centered at equally spaced interval along the signal dimension (the horizontal dimension in FIG. 7B). In some implementations, basis function response may comprise responses of different spatial frequency (signal extent), as illustrated by the curves 742, 744 in FIG. 7B.

The panels 760, 762 illustrate sigmoid basis function responses. Further to the exemplary implementation illustrated in FIG. 7B, the basis function responses may comprise a combination, of different basis function types (e.g., linear, and/or Gaussian, and/or other). In some implementations, different basis function types (e.g., Gaussian, linear) may be used to convert input signals having different signal characteristics. By way of illustration, sigmoid basis functions may be used to convert classification input (e.g., comprising two or more states).

In some implementations, basis function response (e.g., such as the curves 710 shown in FIG. 7A) may comprise the same gains (maximum amplitude). In some implementations, basis function response may comprise responses of different (e.g., modulated) gains.

The neurons of the encoding layer 720 may be operable in accordance with a neuron response process (e.g., stochastic neuron process described supra). In some implementations, the neurons may generate one or more output spikes 730 in FIG. 7A in response to the input current stimulus 710.

In one or more implementations, the output of the neurons 720 may comprise output firing rate deterministically configured to be inversely proportional to the input $I_N$ of the respective basis component (e.g., the component 712 in FIG. 7A). In some implementations, the neuron output 730 may comprise firing rate of a Poisson process configured proportional to the input $I_N$ of the respective basis component. In one or more implementations, the neurons 720 may be operable in accordance with an integrate and fire (IF) and/or Izhikevich (IZ)

neuron model, described for example, in U.S. patent application Ser. No. 13/487,533, entitled "STOCHASTIC SPIKING NETWORK LEARNING APPARATUS AND METHODS", incorporated supra.

The radial basis function and the linear encodings are both examples of two specific classes: unimodal concave and monotonic encoding. In a unimodal concave encoding, the output may increase to reach a maximum and decreases to a minimum. In the monotonic encoding, the output may increase and/or decrease monotonically as a function of the input. In some implementations, a sigmoid basis function set may be used.

In one or more implementations, a unimodal convex encoding may be used. The unimodal convex encoding may be considered as the reverse of the concave encoding: the output decreases, reaching a minimum and increases to a maximum. One example of concave encoding may comprise an RBF (e.g., the curve 742 in FIG. 7B) turned upside-down. Encoding implementing the unimodal convex and the concave encoding may be useful in situation where high sensitivity of output to small changes in the input is required. By way of example, a neuron receiving both input types, convex and concave, will receive a total input change larger than if it received one type only.

Figure 7C:
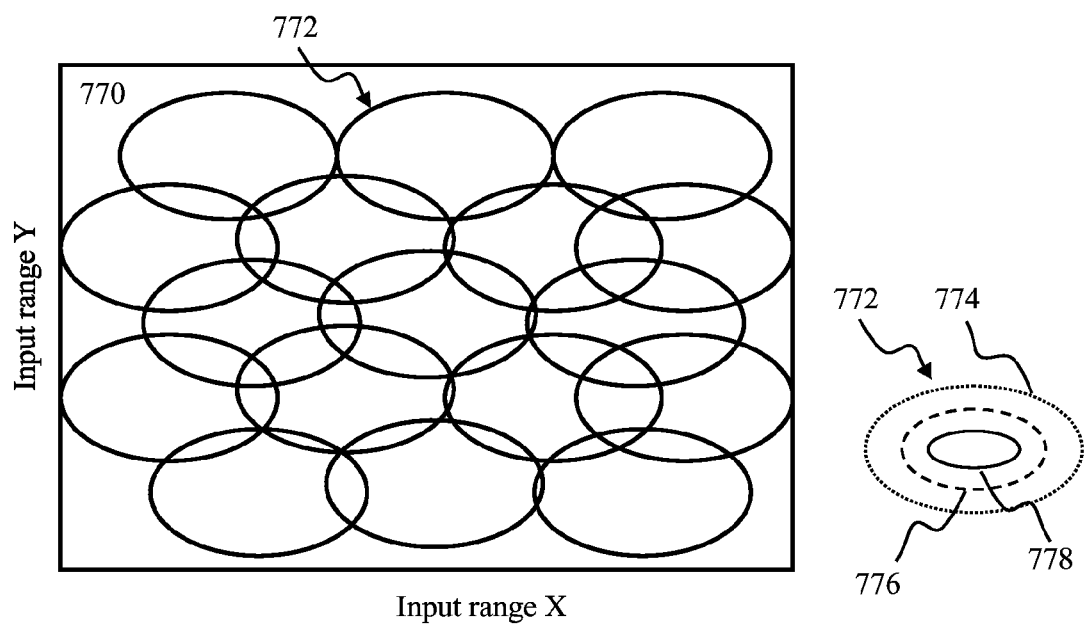
FIG. 7C is a graphical illustration depicting the two-dimensional basis functions for use with the "kernel expansion" input encoding methodology of FIG. 7A, according to some implementations.

FIG. 7C illustrates one exemplary realization of two-dimensional basis component responses useful with the disclosure. The panel 770 depicts a two-dimensional space (e.g., X-Y position) comprising several basis functions (receptive fields) 772. In some implementations, the sensitivity of the receptive fields 772 may be described using a two-dimensional (x-y) Gaussian dependence illustrated by the curves 774, 776, 778 in FIG. 7C. In some implementations, the basis functions 772 may comprise concave shape so that the gain is increasing from the curve 778 to the curve 774. In various implementations, the two-dimensional basis function set 770 may comprise an overlapping or a non-overlapping set of basis functions 772

One or more types of unimodal concave, unimodal convex, and/or monotonic increasing and decreasing functions may be used. The current disclosure is not limited to the examples of RBFs, sigmoid, and linear functions provided.

Some situations may benefit from functions others than unimodal concave and/or convex functions and monotonic functions, so that multimodal functions and combinations of multimodal and monotonic functions may be used, in addition to periodic functions and other types of functions.

In order to optimize neural representation of a (physical) variable, information maximization may be used. Encoding of non-spiking input into spiking output may comprise a sparse (e.g., as compact as possible) encoding which may provide an over-complete representation of the input range of the input. For example, for an input varying in time in a harmonic fashion, a Fourier basis provides a compact representation. For a decaying oscillatory input, a Laplace basis provides an appropriate representation. For an input with sudden increases and/or falls, a Gabor basis may be a good choice.

In selecting one particular representation, the representation may be required to be able to represent the global variations of the variable over a large range of normal and abnormal (or common and uncommon) sensory activities of the system. That is, in order to provide the system the ability to adapt, the sensory representation may be required to be general enough to encode all situations that may arise. This may require using functions for the transformation that are more local in space and time than if the focus was only on mapping the normal operations of the system. Hence, the more general type of functions, like unimodal and monotonic functions, may provide better categorization and learning over many different situations.

In some implementations, the adaptive controller 520 of FIG. 5 may be configured, for example, to stabilize an unmanned vehicle (a drone) to hover at a location and/or to control a drone to fly around a target location.

The controller 520 may be configured to receive sensory input x(t) 502 and a reference input (e.g., input 514 in FIG. 5). In some implementations, the reference signal may comprise the desired drone position and/or velocity of the drone, which may be used to form error signals to drive learning in the controller.

In some implementations, the reference signal may comprise an implicit condition, such a desired zero velocity, which may be implemented internally. The learning may then be driven by a reinforcement signal, formed by using sensory variables (502) and internal state variables utilized in reinforcement learning by the controller spiking network, as described in detail below. For example, a reinforcement signal may be constructed from the computation of optic flow from visual sensory inputs for a task requiring that the drone may not move.

The inputs 502 may comprise a noise component and a signal component relevant to drone operation. The control apparatus 520 operable in accordance with the reinforcement process of the disclosure, may advantageously be capable of automatically extracting and combines the relevant components of x(t) in order to produce the control output 508.

In some implementations, the controller 520 of FIG. 5 may comprise a spiking neuron network 622, shown in FIG. 6. The network 620 may comprise a plurality of spiking neurons 630, 640 configured such as the neuron 430 described with respect to FIG. 4 supra. In some implementations, the neurons 630 may be configured to operate in a deterministic mode, as described above.

The network 620 may be configured using a two-layer feed-forward topology. The two-layer feed-forward topology may comprise the input layer 624 (also referred to as the encoding layer and/or encoding block) and the output layer 634 (also referred to as the processing layer, and/or control layer), denoted by dashed rectangles 624, 634 in FIG. 6, respectively.

The input layer 624 may receive multidimensional inputs {X(t)}. In one or more implementations, the inputs 626 may comprise sensory signals from the drone (e.g., the plant) (e.g., the signal 502 in FIG. 5) and/or the reference signal (e.g., the signal 514 in FIG. 5). The sensory signals may provide data related to the drone estimated position, velocity, and/or other information associated with the drone. In some implementations, the input 626 may comprise drone motion components provided, for example, by an inertial sensor package, and comprising drone orientation (e.g., heading, pitch, roll, yaw, and/or other orientation information), velocity, acceleration, and/or other information associated with the drone. In one or more implementations, the input 626 may comprise visual input. The visual input may comprise, for example, optic flow. It will be appreciated by those skilled in the arts that various other sensor data may be included in the input 626, such as, proximity data, elevation, temperature, wind speed, drone weight, and/or other data that may be relevant to drone navigation. In one or more implementations, the input {X(t)} may comprise non-spiking signal, such as analog and/or digital data stream that may be represented using non-binary (e.g., floating-point and/or fixed point) data stream.

The network 622 may generate output 608 (e.g., motor control commands) configured to drive drone motor actuators. In one or more implementations, the non-spiking output 608 may be referred to as the 'analog' output.

The input layer 624 may encode the input 626 into spiking output {Y2} 638. In one or more implementations, the output 638 may comprise a plurality of spikes 642. The spikes 642 may be communicated to the output layer control layer 634 over one or more connections 644.

In some implementations, the input encoding by the encoding block 624 may be comprise non-spiking (e.g., analog)-to-spiking signal conversion using the KE technique, as denoted by the curves 628 in FIG. 6A and described in detail above with respect to FIG. 7A.

In one or more implementations, the encoding functionality of the input layer 624 may be implemented using a computer library implementing analog to binary encoding via the kernel expansion.

In some implementations, the kernel expansion technique of the encoder block 624 may be implemented using the spiking neurons 630. A set of neurons 630 may be used to form a respective set of receptive fields. The set of receptive fields may correspond to the basis functions of the KE. In some implementations, such as described with respect to FIGS. 8A-9 below, a set of 40 to 400 neurons may be used to characterize each analog variable X 626. The use of a number of receptive fields that is larger, compared to the number of the analog inputs {X}, may allow to implement mapping of observations from a general set S onto an inner product space V (equipped with its natural norm), without ever having to compute the mapping explicitly. A large number of basis functions may allow to obtain an over-complete representation of the input information which facilitates learning in the neural network. Projecting into high dimensions using a non-linear mapping may facilitate learning in the neural network.

Signal encoding comprising the kernel expansion methodology described above with respect to FIGS. 6A-7B may be utilized with a proportional integral-derivative (PID) controller. An exemplary PID controller 1210 is illustrated in FIG. 12, in accordance with one or more implementations. The control system 1200 may comprise a PID controller 1210 coupled to the plant 1220. The PID controller 1210 may generate a control signal u(t) 1220 based on the received sensory input x(t) and the plant output y(t). In one or more implementations, the PID controller 1210 may receive an error signal 1206 configured based on a difference between the received input 1202 and the plant output 1224. The controller 1210 may comprise one or more blocks including a proportional block P 1212, an integrator block 1214, a differentiator block D 1214, and/or other blocks. In some implementations, the output of the three blocks P, I, D may be combined by a summator 1218 to produce the control output 1222.

In one or more implementations, the PID controller output may be parameterized as:

$$u(t) = K_p e(t) + K_i \int_0^t e(\tau)\,d\tau + K_d \frac{d}{dt}e(t), \quad \text{(Eqn. 62)}$$

where:
$K_p$ is the proportional gain,
$K_i$ is the integral gain,
$K_d$ the derivative gain,
e is the error input signal,
t is time or instantaneous time (e.g., the present), and
$\tau$ is a variable of integration, which may take on values from time 0 to the present t.

In Eqn. 62, the proportional term (i.e., "$K_p e(t)$") may produce an output value proportional to the current error value e(t). The proportional response of the PID comptroller block 1212 may be adjusted by multiplying the error by the proportional gain $K_p$.

The contribution from the integral term of Eqn. 62 may be proportional to one or both of the magnitude of the error and the duration of the error. The integral in a PID controller integrator block 1214 may comprise the sum of the instantaneous error over time. The integral in a PID controller integrator block 1214 may give the accumulated offset that should have been corrected previously. The accumulated error may be multiplied by the integral gain K, and added to the controller output.

The derivative of the process error in Eqn. 62 may be calculated by determining the slope of the error over time and multiplying this rate of change by the derivative gain $K_d$. The magnitude of the contribution of the derivative portion (e.g., the block 1216 in FIG. 12) to the overall control output 1211 may be termed the derivative gain, $K_d$.

In one or more implementations, operation of the PID control process (e.g., the controller 1210 of FIG. 12) may be aided by the use of signal conversion using kernel expansion methodology described above with respect to FIGS. 6A-7B.

Figure 13A:
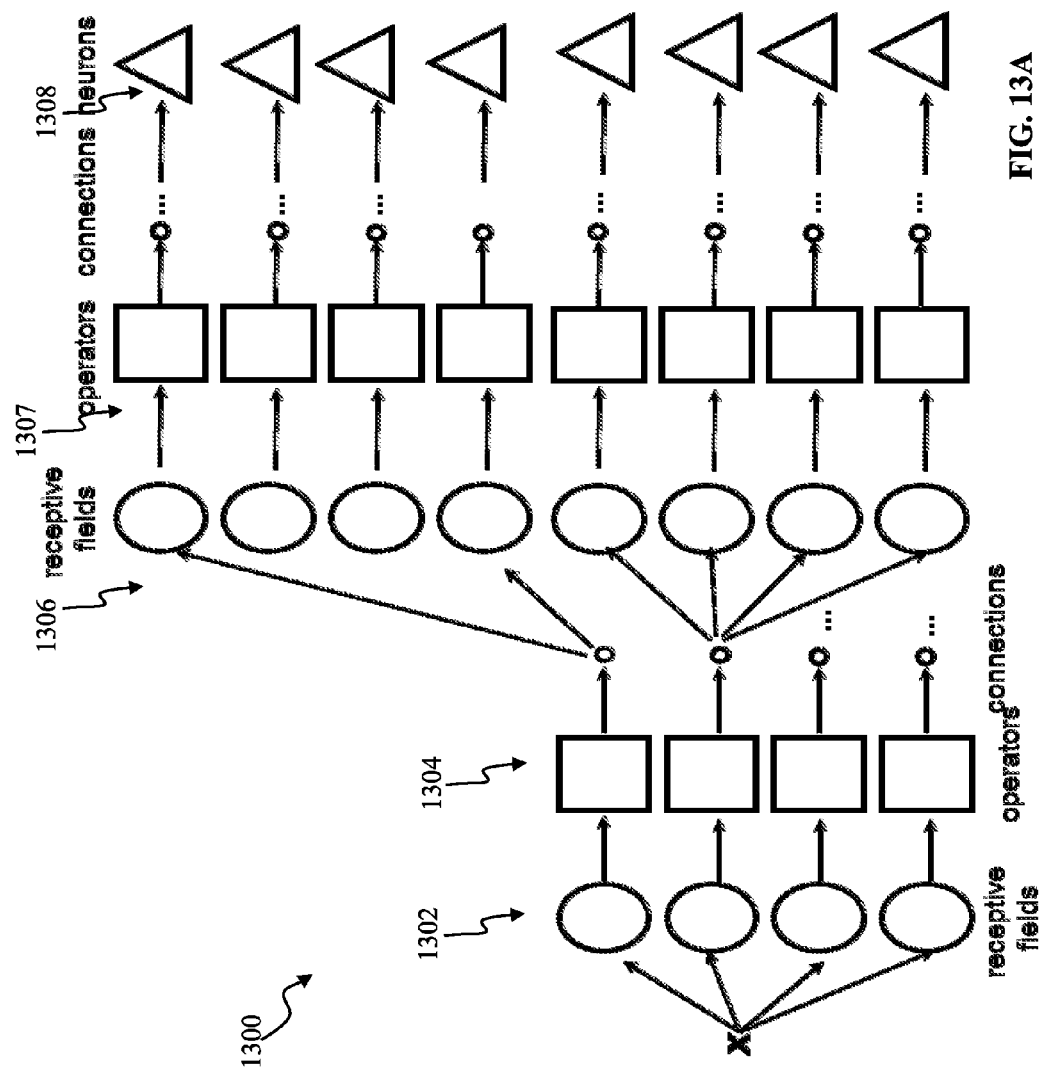
FIG. 13A is a block diagram illustrating kernel expansion encoding mechanism comprising a hierarchy of operators, in accordance with one or more implementations.

In one or more implementations, such as illustrated in FIG. 13A, a PID controller (e.g., the controller 1200 of FIG. 12) may comprise network 1300 configured to encode input signal X. The network 1300 may comprise a cascade of encoding layers. A first layer may comprise one or more operators 1304 characterized by respective receptive fields 1302. The input X may comprise analog (e.g., continuous) input. The analog input may be encoded by unitary receptive fields 1302. The scope of the respective operator 1304 may comprise the whole range of X values. A second layer of the encoding cascade of FIG. 13A may comprise one or more operators 1307 characterized by respective receptive fields 1306. The second layer may comprise one or more neurons 1308 configured to encode, for example, operator output input spiking signal as described above with respect to FIG. 7A. In some implementations, such as illustrated in FIG. 13B (described below), the one or more neurons 1308 may implement the respective operator.

Figure 13B:
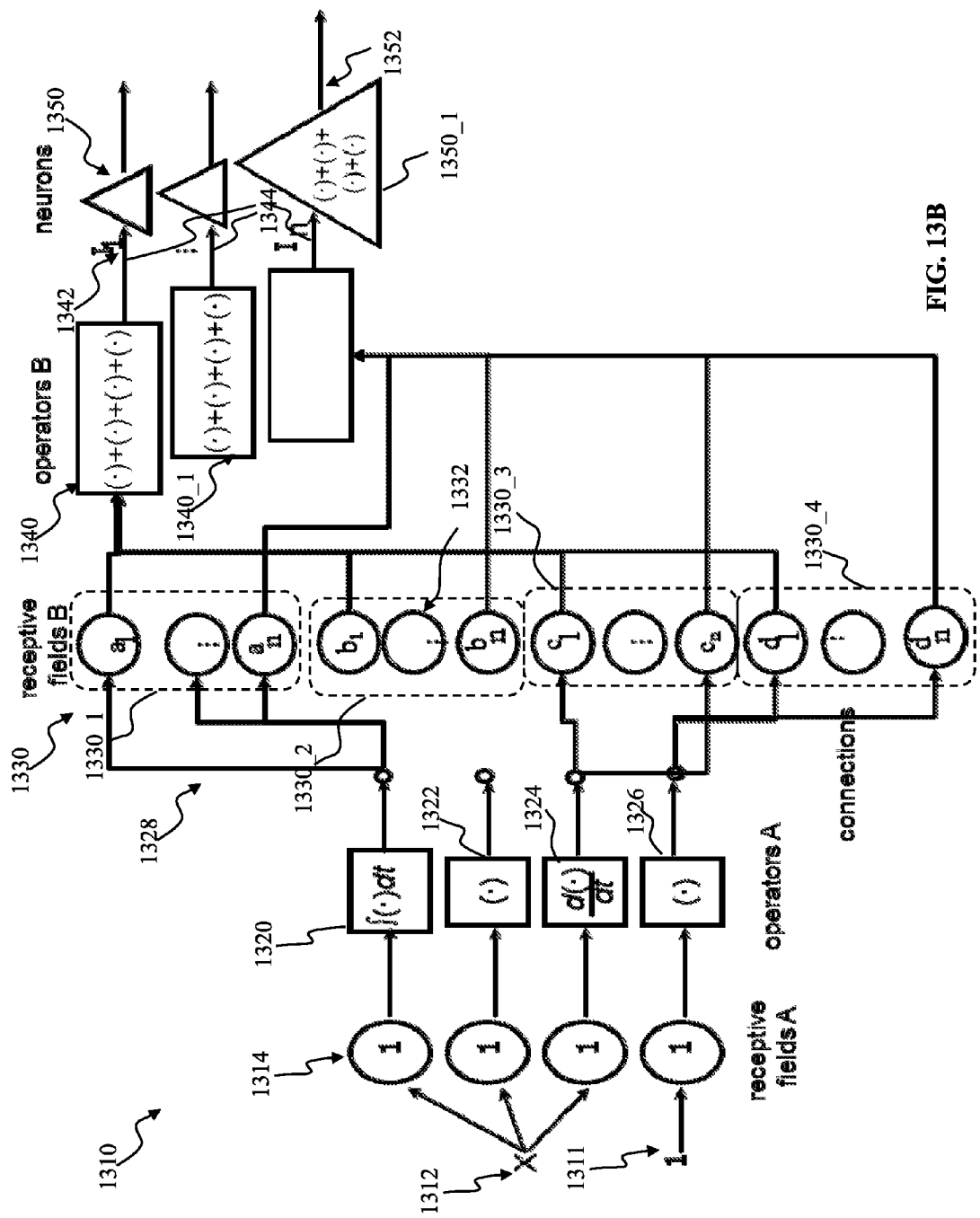
FIG. 13B is a block diagram illustrating proportional-integral-derivative controller comprising the kernel expansion encoding mechanism and the hierarchy of operators, in accordance with one or more implementations.

FIG. 13B illustrates the use of a cascaded encoder architecture comprising operators for PID controller implementation. The encoder network 1310 may correspond, for example, to the encoder block 624 of the controller 620 of FIG. 6A described above.

The input 1312 in FIG. 13B may comprise the error between a sensory feedback from the plant and a desired set point for the plant (e.g., the error 1206 in FIG. 12).

The operators of the encoder 1310 cascade A in FIG. 13B may comprise one or more of an identity (·) operator 1322, an integral operator 1320, a derivative operator 1324, and/or other operators. In FIG. 13B, the expression (·) may indicate where to insert the input to the operator. The network 1310 may receive a constant input 1311. The constant input 1311 may be fed into an identity operator 1326. The operators 1320, 1322, 1324, 1326 may be characterized by their respective receptive fields 1314. In the implementation illustrated in FIG. 13B, the individual receptive fields 1314 may be characterized by the same uniform ('pass through') response denoted by the symbol '1' in FIG. 1. As illustrated in the implementation of FIG. 13D, one or more receptive fields 1382, 1384 may be characterized by different responses from one another. In the implementation of FIG. 13D, the negative response of the receptive field 1382 may respond to input when X<0 (X_). The receptive field 1384 may respond to input when X≥0 ($X_+$). The receptive fields of different types may be coupled to separate banks of operators (e.g., PID operator banks 1386 in FIG. 13D). The input encoding configuration may enable the controller to generate one or both of the following PID implementations:

$$u_1(t)=a_1P(X_-)+b_1I(X_-)+c_1D(X)+d_1,$$

$$u_2(t)=a_2P(X_+)+b_2I(X_+)+c_2D(X_+)+d_2. \quad \text{(Eqn. 63)}$$

The outputs of the set of operators of the cascade A may be fed as inputs to a set of additive operators of the encoder cascade B. In some implementations, the coupling of the cascade A to the cascade B may be effectuated via the receptive fields 1330, comprising one or more receptive fields 1332. The receptive fields associated with the output of the same operator of the cascade A (e.g., the operator 1320) may be grouped into a receptive field bank, denoted by broken line curves labeled 1330_1, 1330_2, 1330_3, 1330_4) in FIG. 13B. In some implementations, such as illustrated in FIG. 13B, the receptive fields 1330 may be configured to multiply their inputs by one or more parameters value $a_i$, $b_i$, $c_i$, $d_i$, for i=1 to n. In some implementations, the values of the parameters $a_i$, $b_i$, $c_i$, $d_i$, for i=1 to n may be selected so that their distributions encompass the expected parameter range sufficient to control the plant (e.g., the plant 1220 in FIG. 12).

The operators 1340 of the cascade B may comprise additive operators configured, for example, to implement the summator 1218 of the PID controller 1210 of FIG. 12. The connections between the receptive fields 1330 and the operators 1340 may be configured to implement one or more PID controllers in parallel. In some implementations, the one or more PID controller may comprise different controller types, such as, for example, one or more variations of PI, PD, ID, P, I, and/or D. In some implementations, selection of one or more controller types may be effectuated, for example, by setting appropriate parameters $a_i$, $b_i$, $c_i$, $d_i$ to zero. By way of illustration, the PID controller associated with the operator 1340 may effectuate one PID realization based on the receptive field parameters $a_1$, $b_1$, $c_1$, $d_1$ while the operator 1340_1 may effectuate another PID realization based on the receptive field coefficients $a_2$, $b_2$, $c_2$, $d_2$ as follows:

$$u_1(t)=a_1P(X)+b_1I(X)+c_1D(X)+d_1,$$

$$u_2(t)=a_2P(X)+b_2I(X)+c_2D(X)+d_2. \quad \text{(Eqn. 64)}$$

In one or more implementations, the output components $u_1$, $u_2$ of Eqn. 64 may be combined in order to produce one or more additional components. The component combination may be effectuated using, for example, weights of connections 1344 of FIG. 13B as follows:

$$u_3(t)=w_1u_1(t)+w_2u_2(t). \quad \text{(Eqn. 65)}$$

In one or more implementations, the combination of Eqn. 65 may be utilized to provide additional values of the parameters $a_i$, $b_i$, $c_i$, $d_i$ without necessitating construction of additional receptive fields of the cascade B (e.g., the receptive fields 1330 in FIG. 13B).

In some implementations, the receptive field parameters $a_i$, $b_i$, $c_i$, $d_i$ may be used to establish initial values of the PID controller configuration. During learning, adaptation mechanism may be employed in order to adapt the parameters from the initial values.

The neurons 1350 may receive operator output 1342. In some implementations, such as shown in FIG. 13B, the output 1342 may comprise sum of inputs to the respective operators (e.g., the additive operator 1340).

The neurons 1350 may be operable in accordance with a learning process (e.g., reinforcement learning). During learning, the neurons 1350 may modify efficacy of the input connections (e.g., the connections 1344 in FIG. 13B). In some implementations, the efficacy may comprise connection weight. The input connection weight adjustments may effectuate PID controller 1210 functionality. That is, the weight modification may enable selecting one or more neuron(s) that may be receiving (as input) appropriate composition of P, I and D components (e.g., the components 1212, 1214, 1216 in FIG. 12) in order to optimize the performance function. In some implementations, the performance function may be related to the error signal e(t) (e.g., the signal 1206 in FIG. 12).

In one or more implementations, the operators 1340 of the controller 1310 may be utilized to implement, for example, a multi-PID controller comprising two or more PID blocks. Individual ones of the two or more PID blocks, may be configured based on two or more individual inputs Xi (e.g., the input 1312 in FIG. 13B), and/or feedback signals, which may be different error signals $e_i(t)$. The multi-PID learning controller may be able to implement an adaptive process comprising a combination of individual PID control processes. Individual PID controllers may be driven by a different feedback (error) signal. By way of illustration, the multi-PID controller may be utilized in controlling a robotic rover comprising a sensing apparatus such as a video camera, and/or an antenna. One of the PID blocks (e.g., based on the operator 1340_1) may be configured to implement control of the rover navigation, based on the rover position error e1. Another PID block (e.g., the block 1340) may be configured to implement control of the antenna/camera lens orientation, based on antenna error signal e2. By adjusting the weights of connections 1344, the neurons 1350 may adaptively modify the overall controller operation by, for example, assigning different weight to the output of the rover and/or camera PID controller. By way of illustration, when the rover is stationary, the rover navigation PID block output may be weighted lower than when the rover is in motion. The use of neuronal learning may enable dynamic adaptation of the PID control composition (e.g., the control signals 1352 in FIG. 13B) based on the sensory input 1312 without requiring operator intervention. In one or more implementations, the neuron outputs 1352 may be used to determine performance of the controller 1310. The performance may be based on a distance measure (e.g., of Eqn. 26) between controller present outcome and target outcome. The neurons 1350 of the controller 1310 may receive a reinforcement signal (e.g., the signal 614 of FIG. 6A) when the output 1352 causes the present outcome closer to the target outcome, as characterized by a lower value of the distance measure of Eqn. 26.

Figure 14:
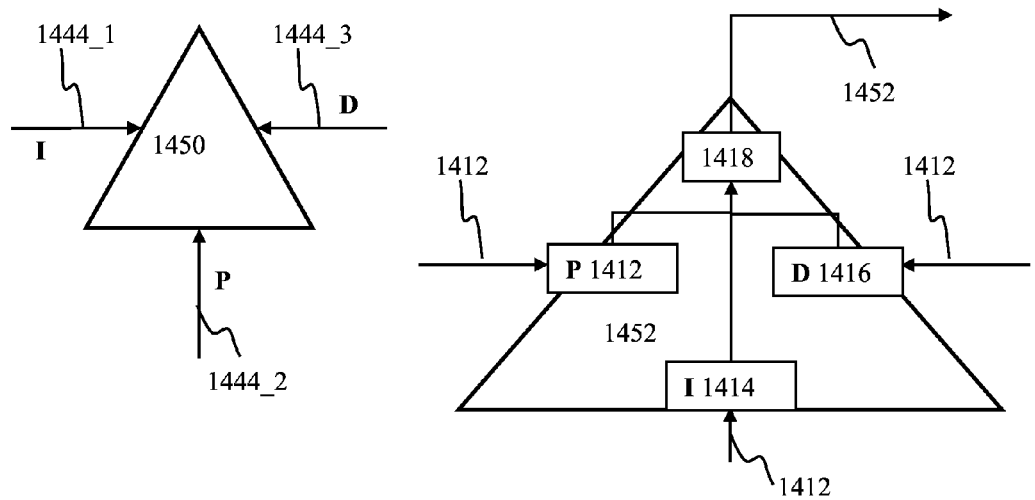
FIG. 14 is a block diagram illustrating spiking neuron implementation of the proportional-integral-derivative controller, in accordance with one or more implementations.

In one or more implementations, such as illustrated in FIG. 14 input connection weight adjustments may effectuate PID controller 1210 functionality. The neuron 1450 in FIG. 14 may receive one or more inputs 1444 from, for example, the one or more operators 1340 of FIG. 13B. By adapting weights of the connections 1444_1, 1444_2, 1444_3 in accordance, for example, with a reinforcement learning process, the neuron may effectuate the PID controller 1210 of FIG. 12. The P, I, D composition may be dynamically adjusted based on the sensory input (e.g., the input 1312 in FIG. 13B).

In some implementations, such as illustrated by the neuron 1452 in FIG. 14, the adjustment of the gain for P, I, D blocks 1412, 1414, 1416 may be incorporated into the neuron dynamic learning process. The gain adjustment may be, in some implementations, effectuating by adjusting weights of the dynamic learning process. In one or more implementations, the P, I, D blocks 1412, 1414, 1416 may correspond to the blocks 1212, 1214, 1216 of FIG. 12. In one or more implementations, the blocks 1412, 1414, 1416 may comprise one or more operators (e.g., the operators 1320, 1322, 1324 in FIG. 13B) as internal dynamics of the neuron. The blocks 1412, 1414, 1416 may receive the same input X 1412. In some implementations, the input 1412 may be modified (e.g., scaled) using weights of the neuron input connection. The outputs of the blocks 1412, 1414, 1416 may be dynamically combined by an additive operator 1418. The additive operator 1418 may be configured to implement, for example, weighting of Eqn. 62.

In some implementations, the neurons 1308, 1350 of encoders 1300, 1310, respectively, and/or neuron 1450 may be operated in accordance with a reinforcement learning process based on an external signal. In some implementations, the process may be used to adjust weights of connection 1344 in FIG. 13B. Connection 1344 weight adaptation may be utilized, in conjunction with one or more parameters $a_i$, $b_i$, $c_i$, $d_i$ of the receptive fields 1330, in order to select one or more operators 1340 that produce most optimal combination of P, I, D for the input 1312. In some implementations, the most optimal combination may be selected based on a maximized performance function (e.g., Eqn. 24). The learning approach shown in FIG. 13B may combine (i) the use of the parameter space $a_i$, $b_i$, $c_i$, $d_i$ in order to generate a variety of P,I,D combinations by the operators 1340 with (ii) selection of the most appropriate combination. Such approach may be advantageous when the range of the input signal 1312 may be known and the computational resources of the controller 1310 are sufficient in order to generate the parameter space $a_i$, $b_i$, $c_i$, $d_i$ with sufficient resolution. By way of illustration, when operating a PID controller on a rover configured to navigate within a room, the maximum position error may not exceed the room dimensions. Provided that (X+clb dX/dt) represents an estimate of the input X in c/b seconds with the goal of reducing previous errors within a time interval b/a seconds, a range of desirable values for the parameters $a_i$, $c_i$ may be obtained for a given range of values for b: $b_i$. The values for $d_i$ may be selected initially to be distributed around zero. The parameters $a_i$, $b_i$, $c_i$, $d_i$ may be selected so as to maximize the parameter space resolution for a given number of parameters n. In one or more implementations, the learning process may be utilized to adjust the parameters $a_i$, $b_i$, $c_i$, $d_i$.

In some implementations, the reinforcement learning process may be used to adjust weights of input connections 1444 in FIG. 14. The weight 1444 adjustment may enable the neuron to generate output based on most optimal combination of the P, I, D inputs. In some implementations, the most optimal combination may be selected based on a maximized performance function (e.g., Eqn. 24). In some implementations, learning PID controller may comprise a plurality of neurons 1450 operable in accordance with the reinforcement learning process. Such learning configuration may be augmented by competitive mechanism configured to facilitate generation of different outputs by different neurons. In some implementations, the competitive mechanism may comprise a selection layer. The selection layer may be implemented, for example, by the spiking network controller 634 of FIG. 6A.

In some implementations, the encoders 1300, 1310 may be coupled to a learning controller (e.g., the block 634 of FIG. 6A comprising a spiking neuron network) operated in accordance with a reinforcement learning process based on an external signal. The learning controller may be utilized to produce output configured to maximize performance (e.g., minimize the error 1206 in FIG. 12).

Figure 13C:
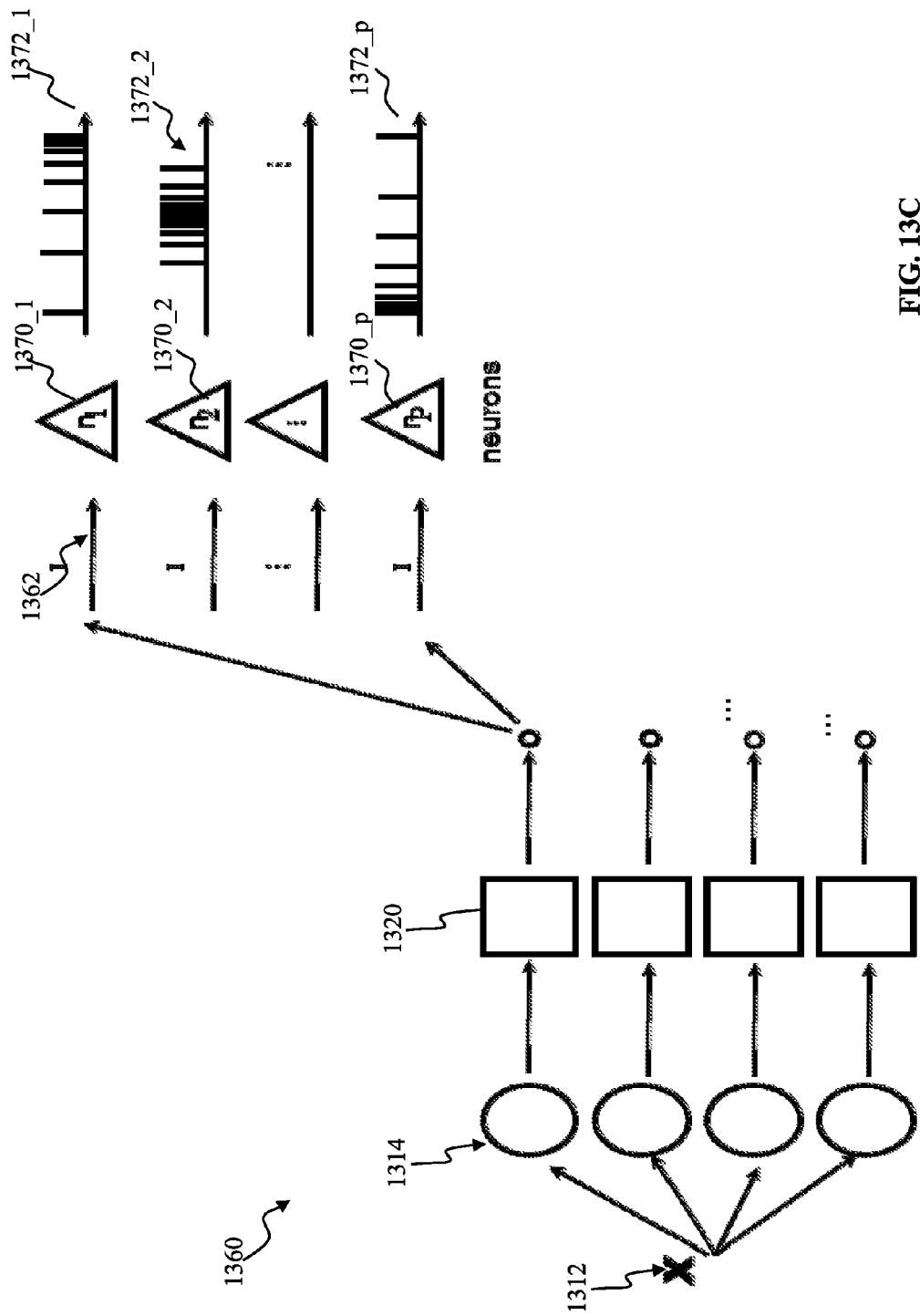
FIG. 13C is a block diagram illustrating kernel expansion encoding mechanism comprising neurons with different response dynamics, in accordance with one or more implementations.
Figure 13D:
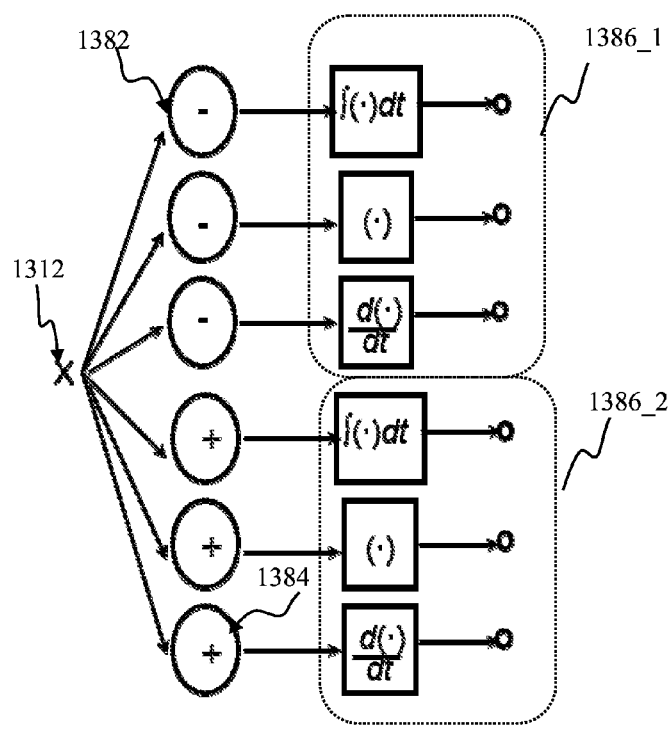
FIG. 13D is a block diagram illustrating proportional-integral-derivative controller comprising operators characterized by different receptive fields, in accordance with one or more implementations.

In one or more implementations, the neurons (e.g., the neurons 1350 of FIG. 13B) may comprise one or more dynamical response processes as illustrated in FIG. 13C. The controller 1360 may comprise one or more neurons 1370. Individual neurons 1370 may implement one or more dynamics processes configured to encode (the same) input 1362 into output 1372. The input 1362 may be based on one or more operators 1320 characterized by their receptive fields 1314.

In one or more implementations, some of the neuron 1370 processes may be stochastic while some may be deterministic. In one or more implementations, the neuron stochasticity may be adaptively controlled, as described, for example, in U.S. patent application Ser. No. 13/623,801, entitled "MODULATED STOCHASTICITY SPIKING NEURON NETWORK CONTROLLER APPARATUS AND METHODS", filed Sep. 20, 2012, supra.

The individual outputs 1372 may be characterized by one or more parameters that may differ between individual outputs. By way of illustration, the neuron 1370_2 may be operable in accordance with a stochastic process configured to generate output in accordance with a Poisson process, where the average firing rate may be determined by the input 1362. In some implementations, the neuron may be operable in accordance with a deterministic process configured to generate output in accordance with a firing rate. The firing rate may be configured proportional to the input 1312. In one or more implementations, the firing rate may be based on a band-pass filtering, differentiation, integration, and/or other transformations of the input signal. 1312. Individual neurons 1370 may be characterized by one or more adaptation time scales. The adaptation time-scales may be used to adjust neuron dynamics to changes in the input signal. In some implementations, the adaptation time scales may be used to determine the rate of connection weight modifications.

In one or more implementations, the PID may comprise input X modification by one or more operators on a selected and pre-processed part of the input X. The processing may comprise one or more layers operated as follows, in accordance with some implementations:

the input X may be processed by one or more receptive fields θ(X) (e.g., the RF 1302 of FIG. 13A) of first processing layer;

the receptive field output $\theta^l(X)$ may be modified by an operator $L^m(\theta^l(X))$ (e.g., the 1304 of FIG. 13A) of the first layer; and the operator output of the first processing layer may be modified by a second layer of receptive fields and/or operators $L^n(\theta^m(L^m(\theta^l(X))))$, (e.g., 1306,1307 of FIG. 13A).

One implementation of the above methodology is illustrated by the processing layers 1302, 1304 and/or 1306, 1307 in FIG. 13A. In one or more implementations (not shown), the processing metrology may comprise additional layers. In one or more implementations, subsequent processing layers (e.g., 1306, 1307 in FIG. 13A) may provide feedback information to previous processing layers (e.g., 1302, 1304 in FIG. 13A). The feedback 1306, 1307 may reenter as an extra dimension in the receptive fields 1302, such as the receptive field 772 in FIG. 7C, adding an extra dimension. The extra dimension may be used to, for example, divide the input space into two or more regions. Provided that the operator 1304 comprises a time derivative operation, the two-dimensional receptive fields 1302 may combine one or more regions of values of input X, with a particular region of values of the derivative of X in time. The recursive nature of the connectivity may provide dynamics, which may be useful for different purposes, from dynamic filtering, to memory storage of different time constants, passing by the resulting effects of different combination of operators.

Figure 15A:
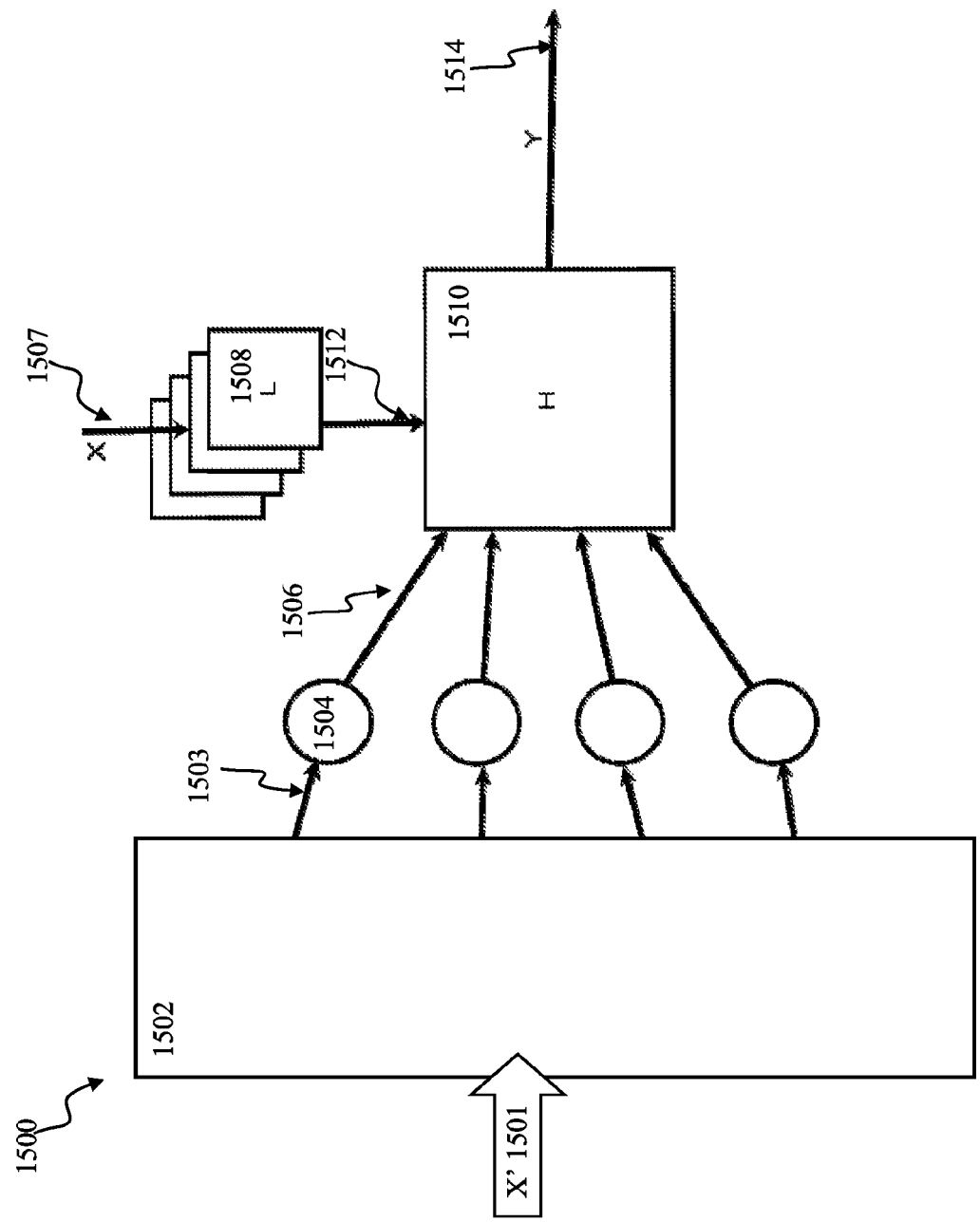
FIG. 15A is a block diagram illustrating a generalized analog adaptive controller implementation comprising analog operators, in accordance with one or more implementations.

In one or more implementations, in addition to the inputs 1501, the input 1507 in FIG. 15A may be passed through receptive fields or a hierarchy of receptive fields and/or operators. Individual operators 1508 L may act on a subset of the input X. The output 1512 of individual operators 1508 may comprise an analog value 1504 may be associated as input to 1510. In one or more implementations, such as the adaptive controller apparatus 1500 illustrated in FIG. 15A, the receptive field(s) may comprise one or more unity transformations. The unity RF may be used to produce an output by combining outputs of one or more operators $L_i(X)$ 1508 acting on the input X 1507. In one or more implementations, the input 1507 may comprise the error signal 1224 of FIG. 12.

The controller 1500 may comprise a learning spiking network block 1502 configured to provide controller parameters 1506 based on the sensory inputs signal 1501. In some implementations, the sensory input 1501 may comprise the error 1224, and/or other sensory signals associated with the plant (e.g., joints position of the pendulum 900 of FIG. 9, and/or drone position of FIG. 8A). In one or more implementations, the network 1502 may be configured similar to the learning block 634 of FIG. 6B described above.

Output 1503, $s = \{s_1, s_2, \ldots, s_j, \ldots, s_n\}$, of the network 1502 may comprise a spiking signal. Such a spiking signal may be converted into a continuous (e.g., analog) form by the converters 1504. Individual operators 1508 may be activated by the converted non-spiking responses $\rho_i(s,\zeta,t)$ 1506 of the network 1502.

In one implementation, the output 1514 of the controller 1500 may be determined by a combination block 1510 based on a combination of the analog form 1506 of the spiking output 1503 and the analog output of the operators 1508 in the form:

$$Y = H(\rho_i(s,\zeta,t), L_i(X)),\qquad\text{(Eqn. 66)}$$

where $\eta_i(s,\zeta,t)$ denotes spike-to-analog transformation. In one or more implementations, the combination operator H may be selected from a multiplication, an addition, and/or other operators. Such operators may be configured to manipulate analog parameters, such as, for example:

$$Y = \Sigma_i(\rho_i(s,\zeta,t), L_i(X)),\qquad\text{(Eqn. 67)}$$

$$Y = \Pi(\rho_i(s,\zeta,t), L_i(X)).\qquad\text{(Eqn. 68)}$$

Figure 15B:
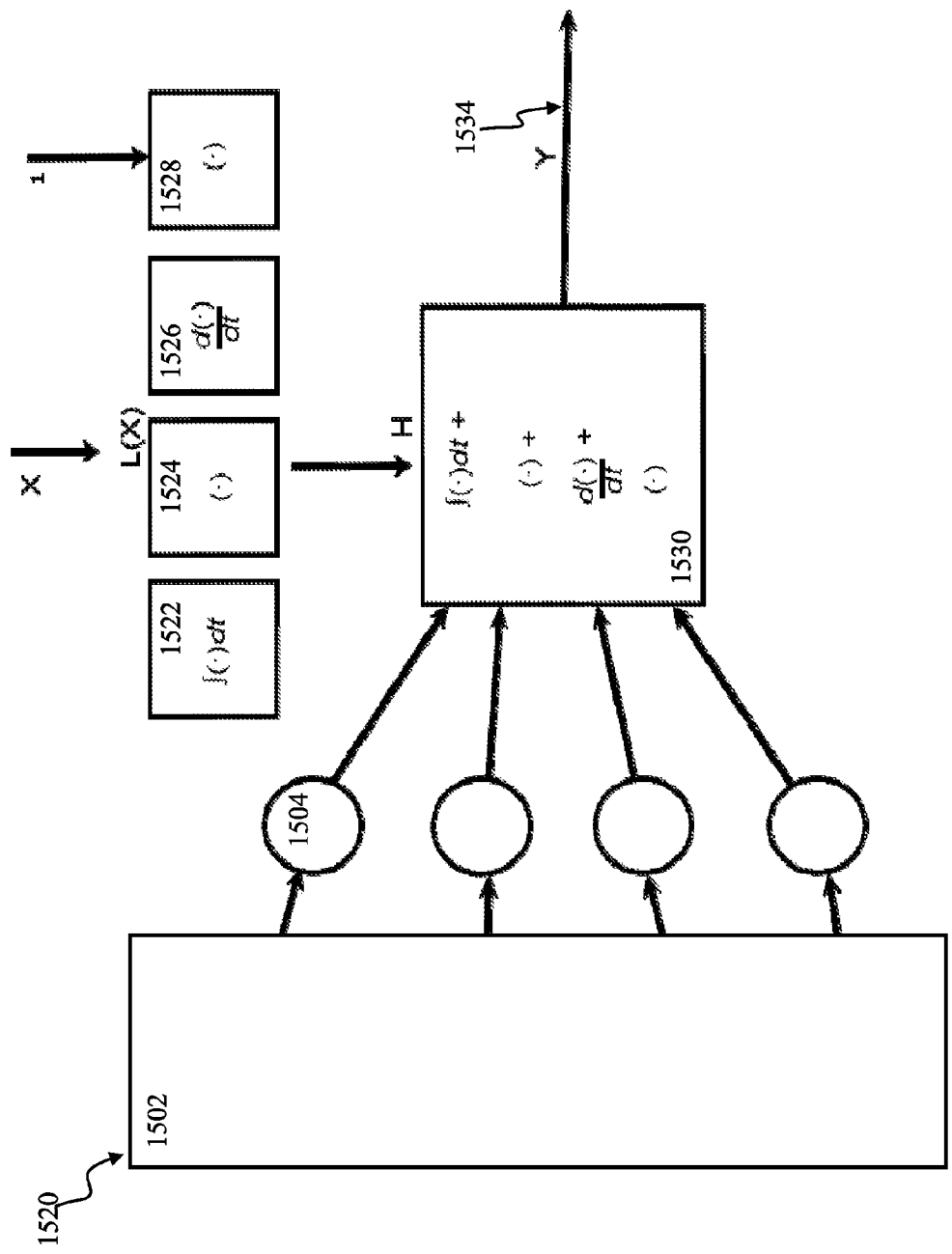
FIG. 15B is a block diagram illustrating analog proportional-integral-derivative controller implementation comprising analog operators, in accordance with one or more implementations.

In one or more implementations, such as the controller apparatus 1520 illustrated in FIG. 15B, the controller may adapt the operation of the learning network 1502 so as to optimize a performance function F. In some implementations, the controller 1520 may effectuate a PID controller using the P,I,D operators 1522, 1524, 1526, respectively, as follows:

$$\mathcal{L}_1(X) = \int_0^\tau X(\tau)d\tau,\ \mathcal{L}_2(X) = X,\ \mathcal{L}_3(X) = \frac{dX(\tau)}{d\tau}.\qquad\text{(Eqn. 69)}$$

The output 1534 of the controller 1520 may be determined by the block 1530 (e.g., the summator 1204 in FIG. 12) as:

$$Y = \Sigma_i(\rho_i(s,\zeta,t), L_i(X)).\qquad\text{(Eqn. 70)}$$

Figure 16:
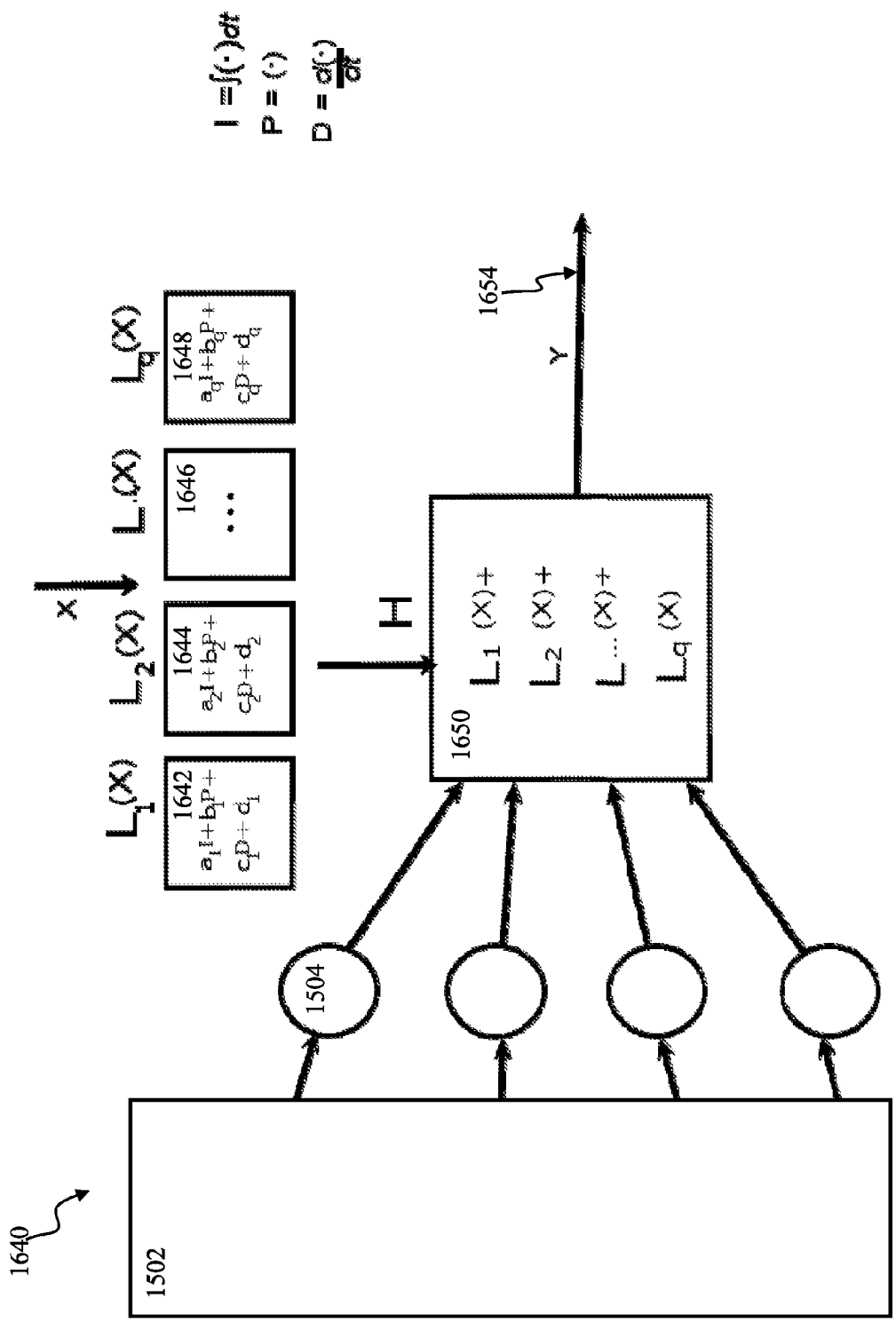
FIG. 16 is a block diagram illustrating analog proportional-integral-derivative controller implementation comprising banks of analog operators, in accordance with one or more implementations.

In one or more implementations, such as the adaptive controller apparatus 1540 illustrated in FIG. 16, the PID controller may be implemented by a diversity of operators 1642, 1644, 1646, 1648 weighted by parameters values $a_i, b_i, c_i, d_i$ as:

$$L_1(X) = a_1 P(X) + b_1 I(X) + c_1 D(X) + d_1,\qquad\text{(Eqn. 71)}$$

$$L_2(X) = a_2 P(X) + b_2 I(X) + c_2 D(X) + d_2,\ \text{and}\qquad\text{(Eqn. 72)}$$

$$L_q(X) = a_q P(X) + b_q I(X) + c_q D(X) + d_q.\qquad\text{(Eqn. 73)}$$

The output 1654 of the controller 1640 of FIG. 16 may be determined by the block 1650 (e.g., the summator 1204 in FIG. 12) as:

$$Y = \Sigma_q(\rho_i(s,\zeta,t)L_q(X)).\qquad\text{(Eqn. 74)}$$

Figure 8A:
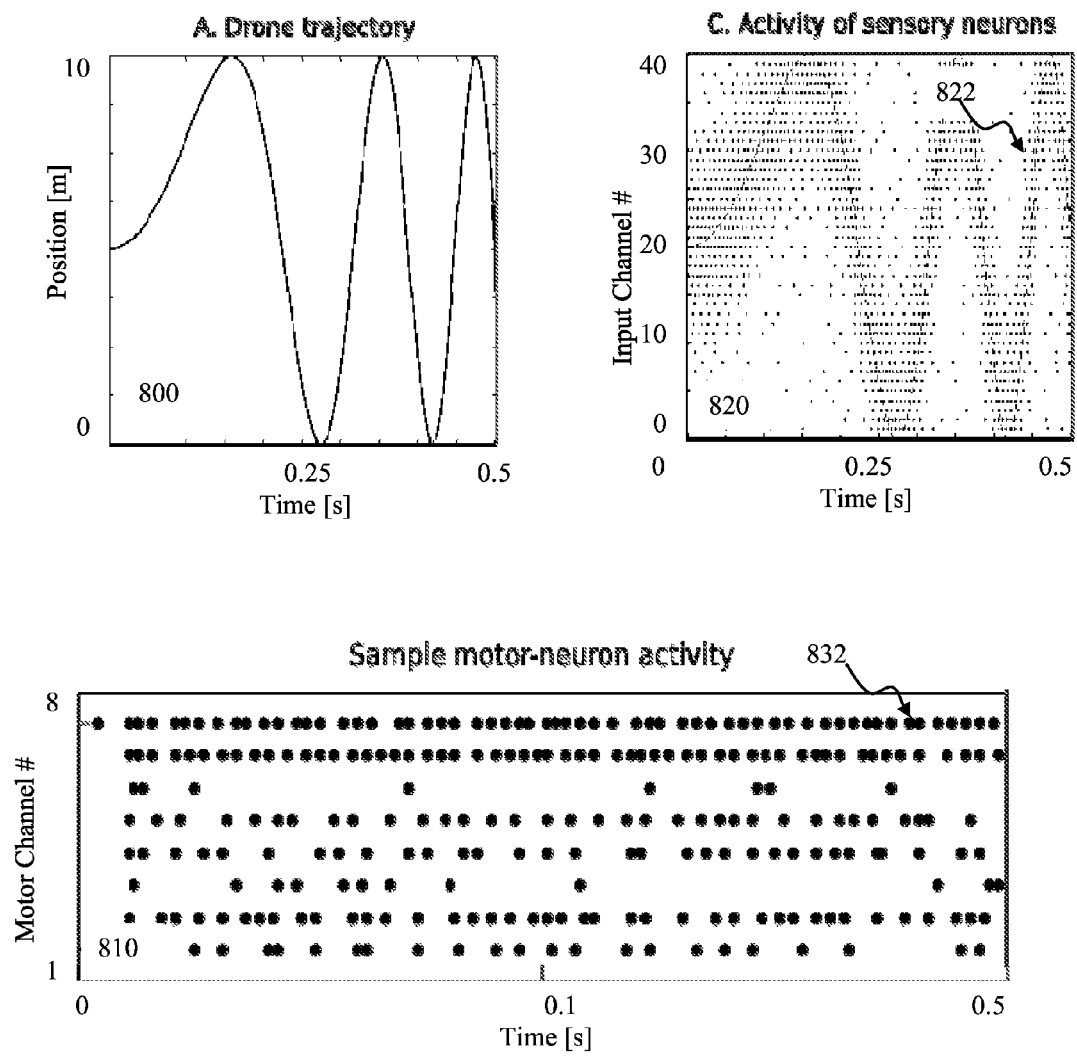
FIG. 8A is a plot illustrating simulation results of sensory encoding by an UAV controller, in accordance with some implementations.

FIG. 8A presents performance results, obtained during simulation and testing by the Assignee hereof, of exemplary computerized spiking network apparatus configured to implement generalized UAV controller 600 described above with respect to FIGS. 6-6A.

For the implementation illustrated in FIG. 8A, 40 overlapping equally spaced (in the input dimension 714 in FIG. 7) Radial Basis Functions were used to 'tile' the dimension of the respective input variable to be encoded. As described with respect to FIG. 7A above, RBF encoding may be used to transform real-value physical input (e.g., the input 626) variations along the x-axis (the axis 714 in FIG. 7A) into input currents (along the y-axis 716 in FIG. 7) for the population of neurons of the encoding layer (e.g., the neurons 630 in FIG. 6). The input currents reflect the value of that neuron radial basis function when the variable value falls within its receptive field.

The panel 800 in FIG. 8A illustrates one of the inputs 626 of FIG. 6A, comprising the drone trajectory (e.g., horizontal position as a function of time). Panel 810 in FIG. 8A present output of the receptive fields of the encoding layer (e.g., the layer 628 in FIG. 6A), with darker colors corresponding to larger values of the input into the encoder neurons (e.g., the neurons 630 in FIG. 6). Panel 820 depicts output activity (e.g., the spikes 642) of the encoder neurons (e.g., the neurons 630 in FIG. 6), while the curve 822 depicts the input 622 (the drone trajectory). As seen from the panel 820, encoder neurons 630 activity is well correlated with the input thereby confirming ability of the encoder block to successfully encode time-varying real-valued (e.g., non-spiking) input 626 into spikes 642 of the spiking output 638.

The number of neurons in the encoding layer 624 may determine, in some implementations, the maximum width of the individual RBF.

In some implementations, the spatial encoding of the input (e.g., the input 626 in FIG. 6A along the dimension 714 FIG. 7A) may be achieved using a combination of RBF, sigmoid basis functions (e.g., the curves 760, 762 in FIG. 7B) and linear basis functions (e.g., the curves 750 in FIG. 7B) with threshold, as described below.

In one or more implementations, the spatial encoding of the input (e.g., the input 626 in FIG. 6) may be achieved using different combination of different convex and/or concave functions tiling the dimension 714 (FIG. 7A). The radial basis functions, shown in FIG. 7B, are examples of concave functions (740, 742, 744).

Given one analog input x, the output of neurons different receptive field types of is presented in Table 1. The input x is scaled between zero and one. The range for the parameters k and $x_o$ for the sigmoid and RBF receptive field type may be adjusted depending on the number of neurons in the encoding layer 624, as shown in Table 2. For small number of neurons (1 to 24) only the linear and/or a combination of linear and RBF receptive field types was used in the simulations described blow with respect to FIGS. 8-9B. In the implementation shown in Table 1, since the receptive fields are spaced equally, the value of the step ("step for $x_0$"), as shown in Table 2. For each value of $x_0$, each value of k was iterated over to form the receptive fields of the neural population.

TABLE 1

| Receptive field type | Output |
| --- | --- |
| Linear basis function | $I = x$ |
| Sigmoid basis function | $I = 1/e^{-k(x-0.5)}$ |
| Radial basis function | $I = e^{-k(x-x_o)^2}$ |

TABLE 2

| Number of neurons | Sigmoid set of k value | Radial basis function (RBF) | |
| --- | --- | --- | --- |
| | | s step for $x_o$ | set of k values |
| 1 | — | — | — |
| 2 to 9 | — | — | — |
| 10 to 24 | — | 0.2 | 400 |
| 25 to 49 | 7, 30 | 0.2 | 30, 400 |
| 50 to 99 | 7, 15, 30 | 0.2 | 20, 50, 100, 500 |
| 100 to 199 | 7, 10, 15, 30 | 0.1 | 5, 15, 30, 100, 400 |
| 200 to 400 | 7, 10, 15, 30 | 0.05 | 4, 10, 20, 50, 100, 500 |

In some implementations, the output layer 636 may comprise a plurality of stochastic spiking neurons 640. The neurons 640 (also referred to as the motor neurons), in one or more implementations, may be operable similarly to the neuron 430 of FIG. 4. In some implementations, the neurons 640 may distinct comprise dynamic process, such as for example, stochastic process of Eqn. 9-Eqn. 42 described above. The neurons 640 may receive spiking input 638 and generate spiking output. The output 636 of the neurons 640 may be further processed by the processing block 658 to produce the network output 608. The processing block may include other spiking neurons or may include spiking-to-analog conversion or may, for example, specify the connectivity from neurons 640 to actuator(s). Some examples are provided below. The output 608 in one or more implementations may comprise non spiking output, such as motor control commands to, for example, drive drone actuators. In some implementations, the output 608 of the network may be adapted by a signal conditioning block (not show) in order to, for example, match the specific actuator requirements. Such output conditioning may comprise spike to current conversion, spike-to pulse-width-modulation conversion, and/or any other appropriate signal conditioning implementation.

In one or more implementations, such as described with respect to FIG. 8A, the layer 634 may comprise 8 motor neurons per actuator. Individual motor neurons may receive inputs from one or more neurons 630, thus from all receptive fields 628. The adaptive parameters of the connections 644 may comprise synaptic weights or synaptic strengths. In some implementations the connection parameters may be used in order to control output activity (e.g., the motor commands) of the neurons 640 of the output layer 634. These parameters may be subject to adaptation as described below. Sample activity of a set of selected motor neurons is shown in panel 830 of FIG. 8A. Individual rows in panel 830 may represent activity of a single neuron 640. Individual dots (e.g., 832) may indicate the occurrence of a spike at the time indicated on the time axis, in accordance with some implementations.

In some implementation, individual motor spikes (e.g., the spike 832 in FIG. 8A) may cause brief pulse of current that may be used to directly drive drone motors actuators. In the implementation described with respect to FIG. 8A, the neurons 640 may be divided into two groups: positive drive and negative drive. The output of the positive drive group may increase actuator drive. Conversely, the output of the negative drive group may decrease actuator drive. Individual groups may comprise 4 neurons 640.

The learning rules used were stochastic gradient descent methods to estimate weight changes that minimized an average cost received by the system. This optimization problem was solved using online partially observable Markov decision process. In the drone stabilization task the cost corresponded to the error between target and drone positions and/or velocities. The learning method may be configured according to Eqn. 51

The performance function (e.g., the cost) may be determined as:

$$c = \alpha d + (1-\alpha) v, \qquad \text{(Eqn. 75)}$$

where the proportionality factor $\alpha$ may be configured as a constant in the range [0,1], d may describe the distance to the target(s) and v may correspond to the speed of the drone, obtained, in on implementation, from optic flow. In one or more implementations, the parameter $\alpha$ may be used to configure controller performance function as follows: $\alpha=1$ may be used to configure the controller to minimize position error. Such configuration may be employed at the beginning of learning. When $\alpha \ll 1$, the controller may learn to maintain position and velocity of an UAV. Velocity stabilization may reduce plant movements at target position at later stages of learning. The distance may be computed as the sum of the distances computed, in individual images, from the center of the visual target to the center of the camera visual field from multiples cameras oriented in different directions.

Figure 8B:
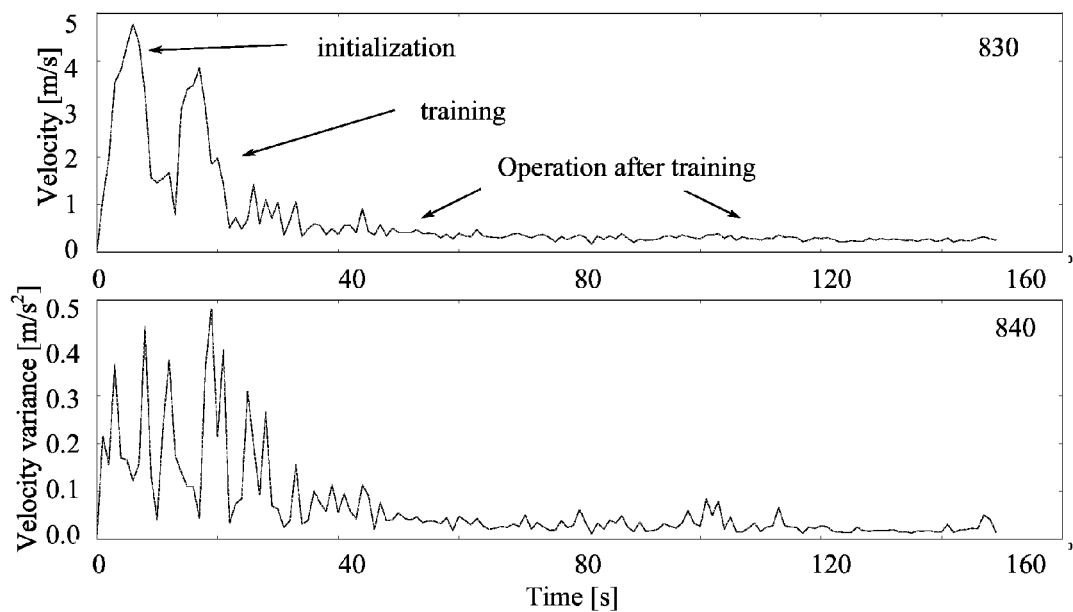
FIG. 8B is a plot illustrating simulation results of UAV controller operation, in accordance with some implementations.
Figure 8C:
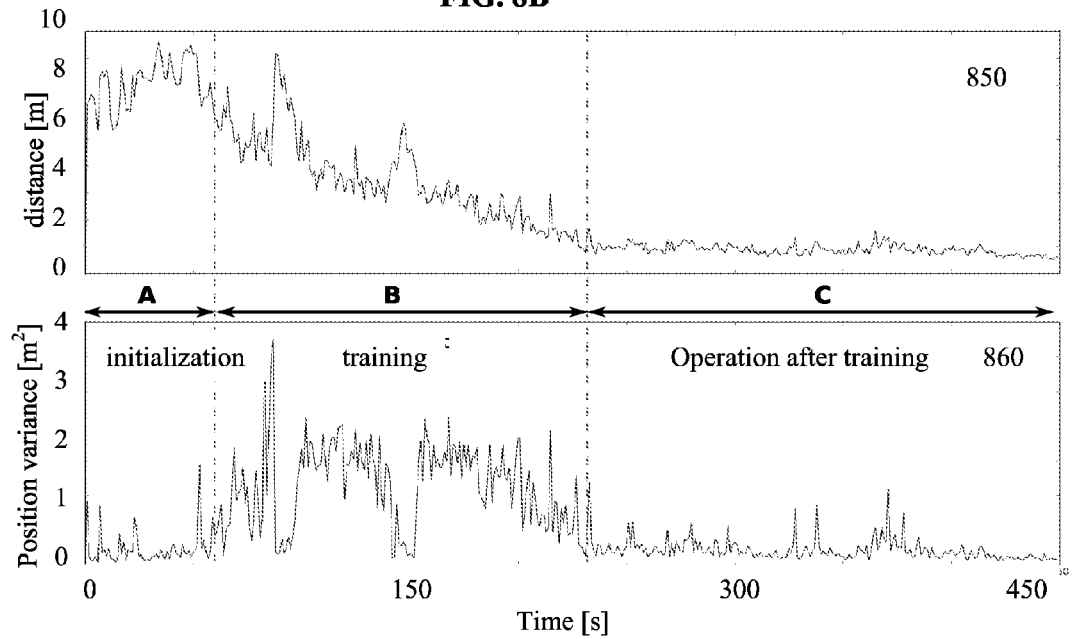
FIG. 8C is a plot illustrating simulation results of UAV controller performance, in accordance with some implementations.

Exemplary results of learning with improvement in performance are shown in FIG. 8B for velocity stabilization and in FIG. 8C for position stabilization both visually-guided.

In one or more implementations, the learning may be effectuated via a reinforcement indication (e.g., the reinforcement signal 614 in FIG. 6). In one or more implementations, the reinforcement indication may comprise an auditory indication such as, for example, a voice command, and/or a whistle. In some implementations, the reinforcement indication may comprise a pulsed signal, such as a proximity beacon marking operational boundary, and/or a clicker button push. As indicated above, the reinforcement indication may comprise a subset of the total sensory input x(t), which may form one or multiple reinforcement signals r(t), as described above.

In one or more implementation, the reinforcement signal may be configured based on a squared error:

$$r = \left(1 - \frac{a}{a_{max}}\right)^2, \qquad \text{(Eqn. 76)}$$

where a is the present outcome (e.g., a distance to the target position of the drone) and $a_{max}$ is maximum possible distance (e.g., the size of the test area). The reinforcement indication may be encoded from a real value (e.g., Eqn. 76) into a spike train to form spiking reinforcement signal 654 in FIG. 6, such as, for example described by Eqn. 9. The encoding may be effectuated by a conversion block 650. In some implementations, the conversion block 650 may comprise spiking neuron operable in accordance with a deterministic and/or stochastic process. In the deterministic implementation, the neuron output corresponding to positive reinforcement may be configured as follows. The inter-spike interval (ISI) of the positive spike train of Eqn. 9 may be defined as:

$$ISI^+ = \frac{1}{1-r}. \qquad \text{(Eqn. 77)}$$

Similarly, the ISI of the neuron output corresponding to negative reinforcement may be configured as follows.

$$ISI^- = \frac{1}{r}. \qquad \text{(Eqn. 78)}$$

It is noteworthy, that the ISI of Eqn. 77-Eqn. 78 is normalized in the range from 0 to 1, thereby comprising a relative measure and not an absolute time interval measure.

In some implementations, the positive reinforcement indication may be based, for example, on prior network behavior that caused a reduction in the squared error of Eqn. 76. In one or more implementations, the negative reinforcement indication may be based, for example, on prior network behavior that caused an increase in the squared error of Eqn. 76.

Correspondingly, the block 650 may evaluate at time interval since most recent reinforcement spike ($\Delta t^+$, $\Delta t^-$) at each time step associated with operation of the network 620. When ($\Delta t^+$, $\Delta t^-$) exceed ($ISI^+$, $ISI^-$), a positive and/or negative reinforcement spike may be generated, respectively, and the intervals ($\Delta t^+$, $\Delta t^-$) may be reset.

In stochastic implementations, the positive and the negative reinforcement spike trains may be described in terms of spike generation probability $p(t^+)$, $p(t^-)$ as $$p(t^+) \propto 1-r, p(t^-) \propto r. \qquad \text{(Eqn. 79)}$$

It will be appreciated by those skilled in the arts, that transformation of the reinforcement signal into 614 spiking signal 654 may be achieved by any other applicable analog-to-spike transformation.

FIGS. 8B-8C illustrate exemplary performance of the adaptive controller operation described above. The panels 850, 860 present the mean and variance of the distance of the drone to the target as a function of time during the following phases: (i) an initial learning stage, during which the drone may have to learn to perform a take-off in order to reach the desired position; (ii) training, where the drone controller continues to be provided with reinforcement signal while adjusting the learning parameters of the network to further refine the stabilization of the drone position; (iii) operation after learning where the drone may maintain its position without requiring farther reinforcement indication; and/or other phases.

The panels 830 and 840 may depict the mean and variance of the drone velocity as a function of time during the three phases of operation described above for velocity stabilization. Data presented in FIGS. 8B-8C confirm that the adaptive controller, configured in accordance with signal conversion and reinforcement learning methodology described herein is capable of learning control of drone without requiring detailed knowledge of the drone plant dynamics.

Figure 9A:
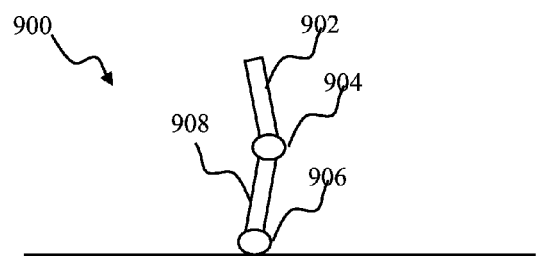
FIG. 9A is a graphical illustration depicting a double inverted pendulum used for evaluating performance of adaptive encoder and control methodology, in accordance with some implementations.

A robotic double inverted pendulum 900, shown in FIG. 9A, was stabilized in the upward unstable position using the methods described above. The pendulum comprises two motors, one at each joint 904, 906, equipped with position encoders. The position encoders may provide feedback signals to the spiking network controller in the form of rotation angle given in relative coordinates. The rotation angle from each motor was encoded by 200 sensory neurons, using Table 1 and 2 above. Individual motors 904, 906 may receive motor commands from separate neuron pools, comprising eight motor neurons. The reinforcement signal was the deviation of the pendulum arms 902, 908 from the upright position, encoded by an integrate-and-fire spiking neuron. The encoding neuron may receive an input proportional to the pendulum deviation from the vertical, which defined the task to learn for the controller.

Figure 9B:
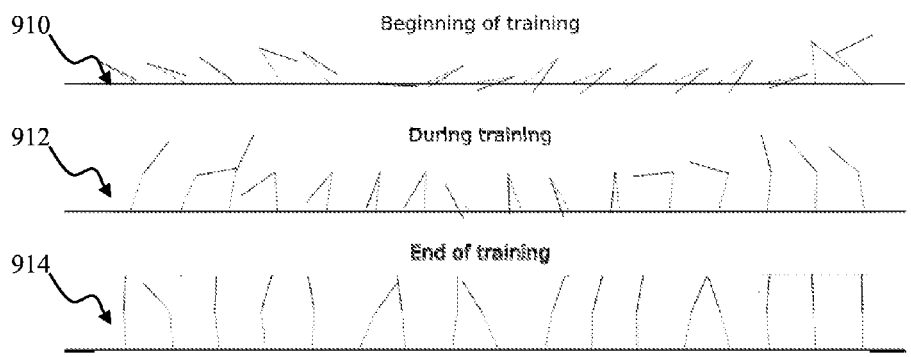
FIG. 9B is a plot illustrating simulation results of inverted pendulum position, in accordance with some implementations.

FIG. 9B presents data illustrating pendulum position during three phases of operation. Individual rows 910, 912, 914 in FIG. 9B illustrate a separate 100 ms interval, where the double inverted pendulum configuration is shown every six seconds interval.

Figure 9C:
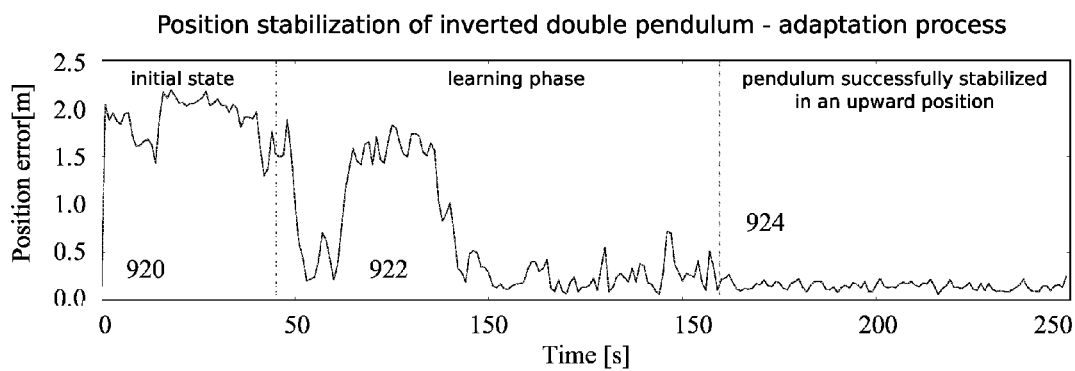
FIG. 9C is a plot illustrating simulation results of the inverted pendulum controller performance, in accordance with some implementations.

The pendulum controller performance (shown as the position error) is presented in FIG. 9C. The position error is shown as a function of time during the following phases of operation: (i) initialization, where the pendulum motors may be activated and controller network initial weights assigned; (ii) training, where the pendulum controller may be provided with reinforcement signal while adjusting learning parameters of the network in order to stabilize pendulum orientation; (iii) operation after learning where the controller may maintain pendulum position without requiring farther reinforcement indication; and/or other phases of operation.

Data presented in FIG. 9C illustrate that prior to learning, position error is fairly large; fluctuates and decreases during learning, with some phases having large and small changes in error as the system explores different regions of its dynamical space. Subsequent to learning, the controller is capable of maintaining pendulum in the upright position without being provided further reinforcement.

Figure 10A:
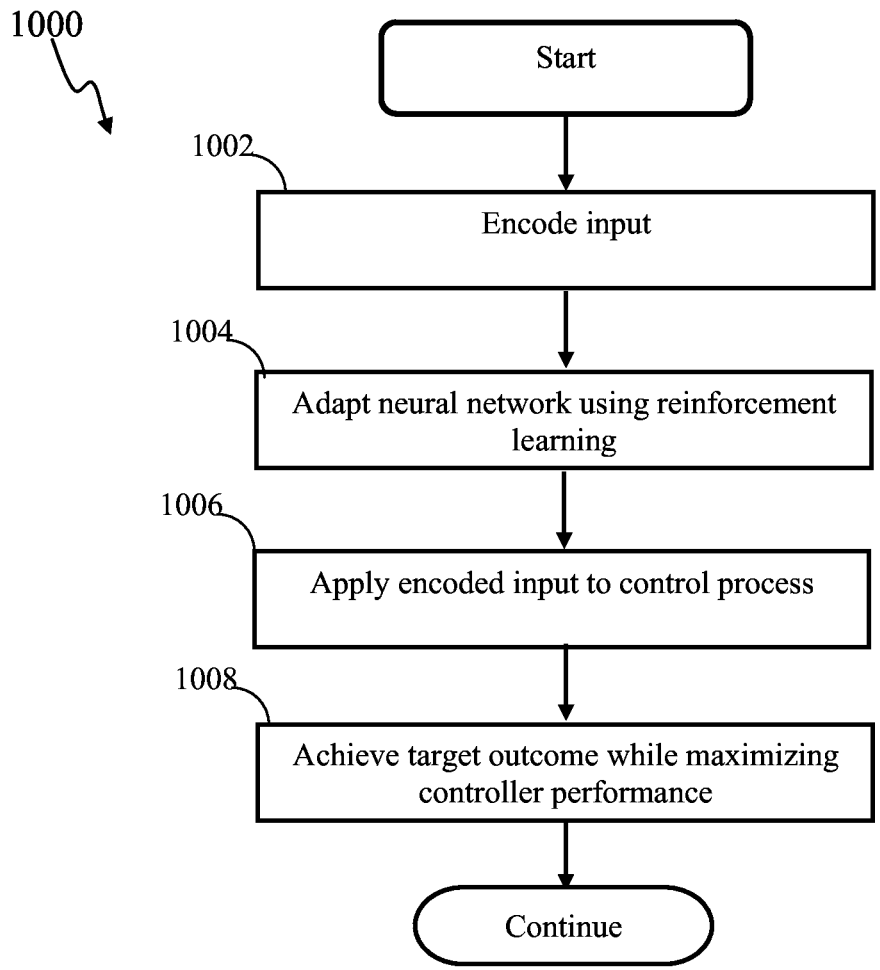
FIG. 10A is a logical flow diagram illustrating reinforcement learning, in accordance with some implementations.
Figure 10B:
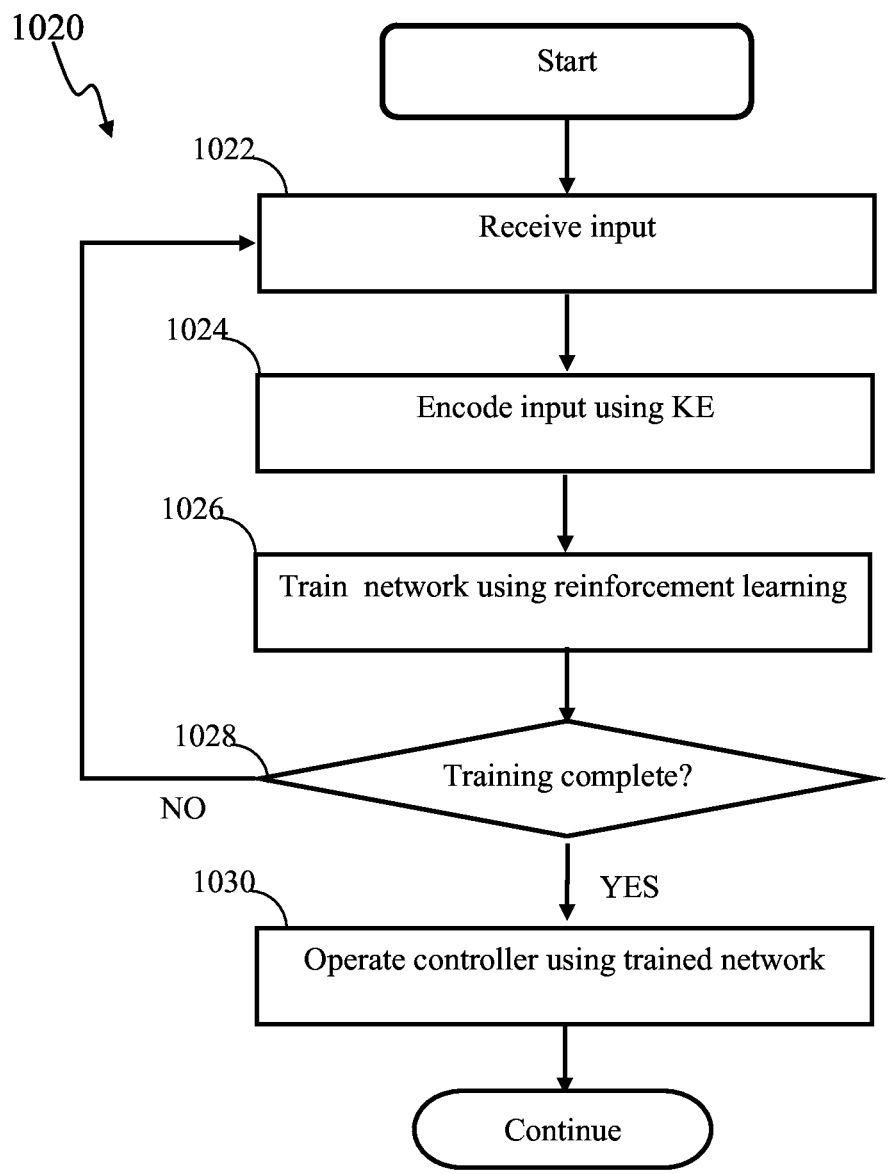
FIG. 10B is a logical flow diagram illustrating operation of a robotic controller comprising kernel expansion encoding, in accordance with one or more implementations.
Figure 10C:
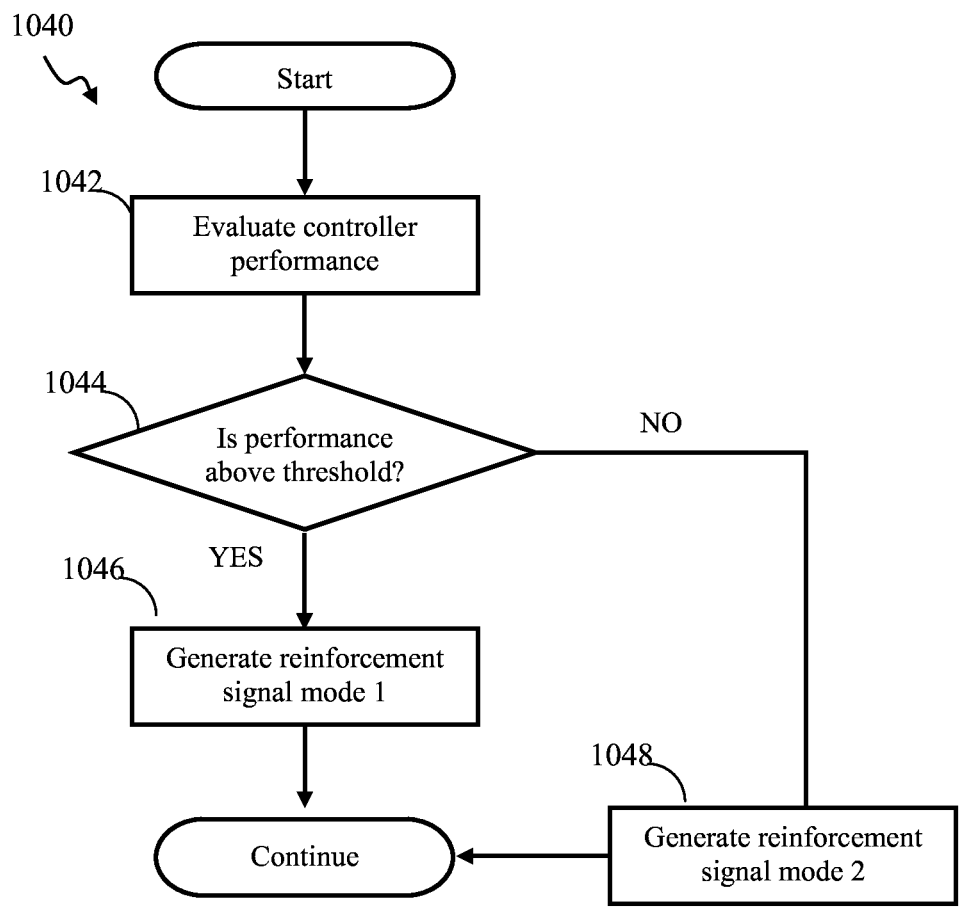
FIG. 10C is a logical flow diagram illustrating reinforcement signal generation for use with methods of FIGS. 10A-10B, in accordance with one or more implementations.

FIGS. 10A-10C illustrate methods of efficient connection updates for a neuron of a neural network in accordance with one or more implementations. The operations of methods 1000, 1020, 1040 presented below may be intended to be illustrative. In some implementations, methods 1000, 1020, 1040 may be accomplished with one or more additional operations not described, and/or without one or more of the operations discussed. Additionally, the order in which the operations of methods 1000, 1020, 1040 are illustrated in FIGS. 10A-10C and described below is not intended to be limiting.

In some embodiments, methods of FIGS. 10A-10C may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000, 1020, 1040 in response to instructions stored electronically on an electronic storage medium. The one or more processing devices may include one or more devices configured through hardware, firmware, and/or software to be specifically designed for execution of one or more of the operations of method 1000, 1020, 1040.

Referring now to FIG. 10A one exemplary implementation of the reinforcement learning method of the disclosure for use with, for example, the robotic system 500 of FIG. 5 is described in detail.

At step 1002 of method 1000 sensor input may be received. In some implementations, sensor input comprise a stream of raw sensor data, generated, for example, by the sensor block 516 in FIG. 5, (e.g., proximity, inertial, terrain imaging, and/or other raw sensor data) and/or preprocessed data (e.g., velocity, extracted from accelerometers, distance to obstacle, positions, and/or other preprocessed data). In some implementations, such as those involving object recognition, the signal x(t) may comprise an array of pixel values (e.g., RGB, CMYK, HSV, HSL, grayscale, and/or other pixel values) in the input image, or preprocessed data (e.g., levels of activations of Gabor filters for face recognition, contours, optic flow and/or other preprocessed data). In one or more implementations, the input signal may comprise desired motion trajectory, for example, in order to predict future state of the robot on the basis of current state and desired motion. In some implementations, the encoding may comprise KE analog-to spiking conversion effectuated by, for example, the conversion block 624 described with respect to FIG. 6A.

At step 1004, spiking neuron network of the controller may be adapted using reinforcement learning process. In one or more implementations, the adaptation may be based on a reference input (e.g., the signal 514 in FIG. 5) that may comprise reinforcement and/or a reward signal. In some implementations, the reinforcement signal may be provided by an operator via, for example, remote commands when the drone approaches the target and/or an area of danger (an obstacle) and/or by a programing the controller to perform certain safety checks (e.g., speed less than 5 m/s). In some implementations, the reinforcement signal may comprise a sensor input from the environment (e.g., a perimeter beacon alarm) and/or robot sensor (e.g., a proximity alarm). In one or more implementations, the adaptation may comprise adjustment of connection weights between the encoder block and the controller block (e.g., the connections 644 in FIG. 6A). Accordingly, connection adaptation may 'select' relevant input component from the input data encoded at step 1002.

At step 1006, the selected (via adaptation) input components may be applied to the control process in order to a target outcome. A target outcome may include the robotic apparatus reaching a target destination.

At step 1008, the target outcome may be achieved. The target outcome may be characterized by the controller maximizing the performance function of the control process (e.g., determined using Eqn. 13, Eqn. 15).

FIG. 10B illustrates some implementations of a controller operation method comprising reinforcement learning and KE encoding.

At step 1022, of method 1020 input may be received. In one or more implementations, the input may comprise sensory input described with respect to step 1002 of method 1000.

At step 1024, the input may be encoded using kernel expansion basis function methodology. In some implementations, the KE encoding may be effectuated using methodology described with respect to FIG. 7A. In one or more implementations, the basis function set may comprise one or more linear, radial, sigmoid, and/or a combination thereof. In some implementations, the KE basis function may comprise one or more operators. In some implementations, the KE basis functions may comprise two or more dimensions, such as the two-dimensional basis functions illustrated in FIG. 7C.

At step 1026, spiking neuron network of the controller (e.g., the controller 620 of FIG. 6) may be trained using reinforcement learning. In some implementations, the training may be based on a reinforcement signal (described with respect to FIG. 10C, below) provided to the controller.

When training is complete, as determined at step 1028, the method may proceed to step 1030. Subsequently, the controller may be operated using trained network without receiving reinforcement signal.

Various implementations of the decision-making process of step 1028 are anticipated comprising, for example, a time-constraint base (e.g., train network for a period of time); performance based (e.g., train the network until an error measure (e.g., an absolute error and/or an error rate/derivative drops below a threshold; and/or an energy constraint (e.g., train network until a certain amount of energy (kWh) is consumed by the controller. It will be appreciated by those skilled in the arts that may other decision making approaches may be equally compatible and useful with the disclosure (e.g., a combination of time and error constraints, and/or other metrics).

FIG. 10C illustrates some implementations of a reinforcement indication generation for use with, for example, controller 520 of FIG. 5.

At step 1042 of the method 1040, performance of the adaptive controller (or the adaptive network) is evaluated using any of a number of applicable methodologies. In some implementations, the performance evaluation may comprise interpolating performance measure history, as described in detail in co-owned U.S. patent application Ser. No. 13/238, 932 filed Sep. 21, 2011, and entitled "ADAPTIVE CRITIC APPARATUS AND METHODS", U.S. patent application Ser. No. 13/313,826, filed Dec. 7, 2011, incorporated by reference supra. In one or more implementations, the performance evaluation may comprise the use of averaged error of a stochastic neural network, as described in detail in co-owned U.S. patent application Ser. No. 13/487,499, entitled "STOCHASTIC APPARATUS AND METHODS FOR IMPLEMENTING GENERALIZED LEARNING RULES", incorporated supra. In some implementations the performance evaluation may be based on evaluating performance function of Eqn. 13.

At step 1044, the performance measure is compared to a criterion (e.g., a threshold describing a minimum acceptable level of controller performance). In some implementations, the threshold may correspond to the maximum deviation of the control trajectory, as expressed for example by the maximum position error of a robotic manipulator, or by the deviation from a desired template in recognition tasks.

In some implementations, steps 1042, 1044 of the method 1040 may be performed by a trainer external to the controller apparatus (e.g., an operator providing reinforcement signal during recognition/classification tasks).

If the performance is above the threshold, a mode 1 reinforcement signal may be generated at step 1046. If the performance is below the threshold, a mode 2 reinforcement signal may be generated at step 1048. In some implementations, the mode 1, 2 signals may correspond to the positive and negative reinforcement, respectively. In some implementations, the mode 1 signal may not be generated, and only mode 2 signal (e.g., negative reinforcement) may be generated. In some implementations, the mode 2 signal may not be generated, and only mode 1 signal (e.g., positive reinforcement) may be generated.

Various exemplary spiking network apparatus comprising one or more of the methods set forth herein (e.g., using the reinforcement learning and KE encoding mechanisms explained above) are now described with respect to FIGS. 11A-11D.

Figure 11A:
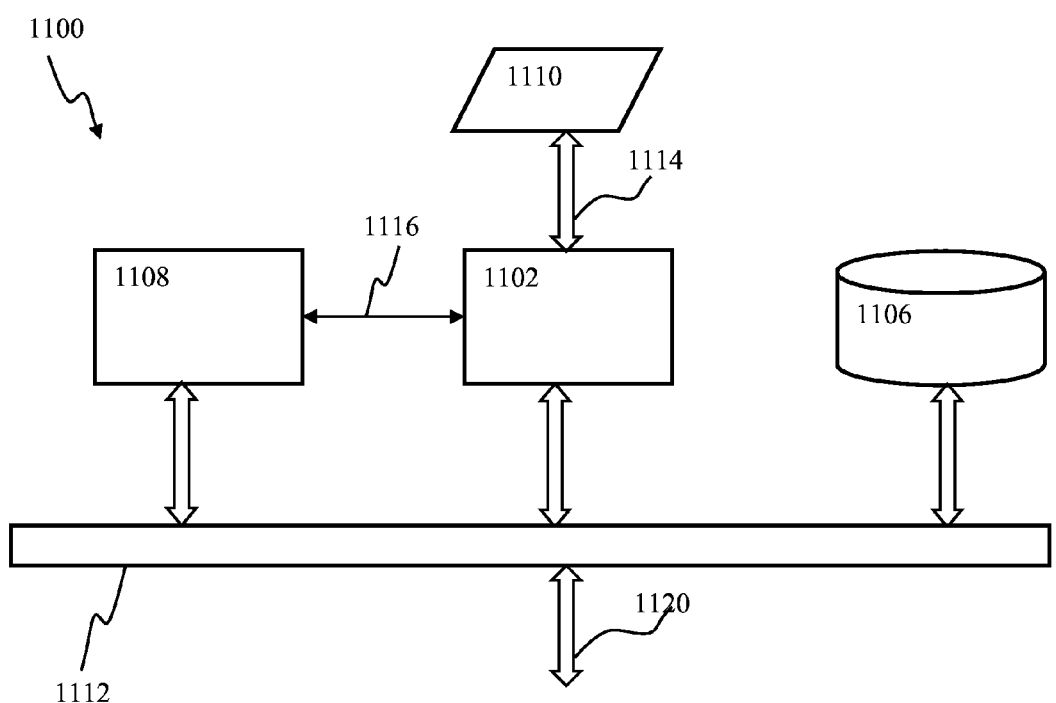
FIG. 11A is a block diagram illustrating computerized system useful for efficient connection plasticity update mechanism in a spiking network, in accordance with one or more implementations.

One particular implementation of the computerized neuromorphic processing system, for operating a computerized spiking network (and implementing the exemplary KE encoding methodology described supra), is illustrated in FIG. 11A. The computerized system 1100 of FIG. 11A may comprise an input interface 1110, such as for example an image sensor, a computerized spiking retina, an audio array, a touch-sensitive input device, and/or other input interface. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 526 in FIG. 5), and to facilitate KE encoding through learning.

In some implementations, the memory 1108 may be coupled to the processor 1102 via a direct connection (memory bus) 1116. The memory 1108 may also be coupled to the processor 1102 via a high-speed processor bus 1112).

The system 1100 may comprise a nonvolatile storage device 1106. The nonvolatile storage device 1106 may comprise, inter alia, computer readable instructions configured to implement various aspects of spiking neuronal network operation. The various aspects of spiking neuronal network operation may include one or more of sensory input encoding, connection plasticity, operation model of neurons, and/or other aspects of spiking neuronal network operation. In one or more implementations, the nonvolatile storage 1106 may be used to store state information of the neurons and connections when, for example, saving/loading network state snapshot, or implementing context switching. In some implementations, the context switching may comprise, for example, saving current network configuration for later use, and/or loading of a previously stored network configuration. In one or more implementations, the network configuration may comprise, inter alia, connection weights and update rules, neuronal states and learning rules, and or other data.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

In some implementations, the input/output interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to embodiments of the invention including, for example, an LCD/LED monitor, touch-screen input and display device, speech input device, stylus, light pen, trackball, and/or other user I/O interfaces Referring now to FIG. 11B, some implementations of neuromorphic computerized system configured to implement efficient connection plasticity update mechanism in a spiking network is described in detail. The neuromorphic processing system 1130 of FIG. 11B may comprises a plurality of processing blocks (micro-blocks) 1140 where individual micro cores may comprise a computing logic core 1132 and a memory block 1134. The logic core 1132 may be configured to implement various aspects of neuronal node operation, such as the node model, and synaptic update and/or other tasks relevant to network operation. The memory block may be configured to store, inter alia, neuronal state variables and connection parameters (e.g., weights, delays, I/O mapping) of connections 1138.

Figure 11B:
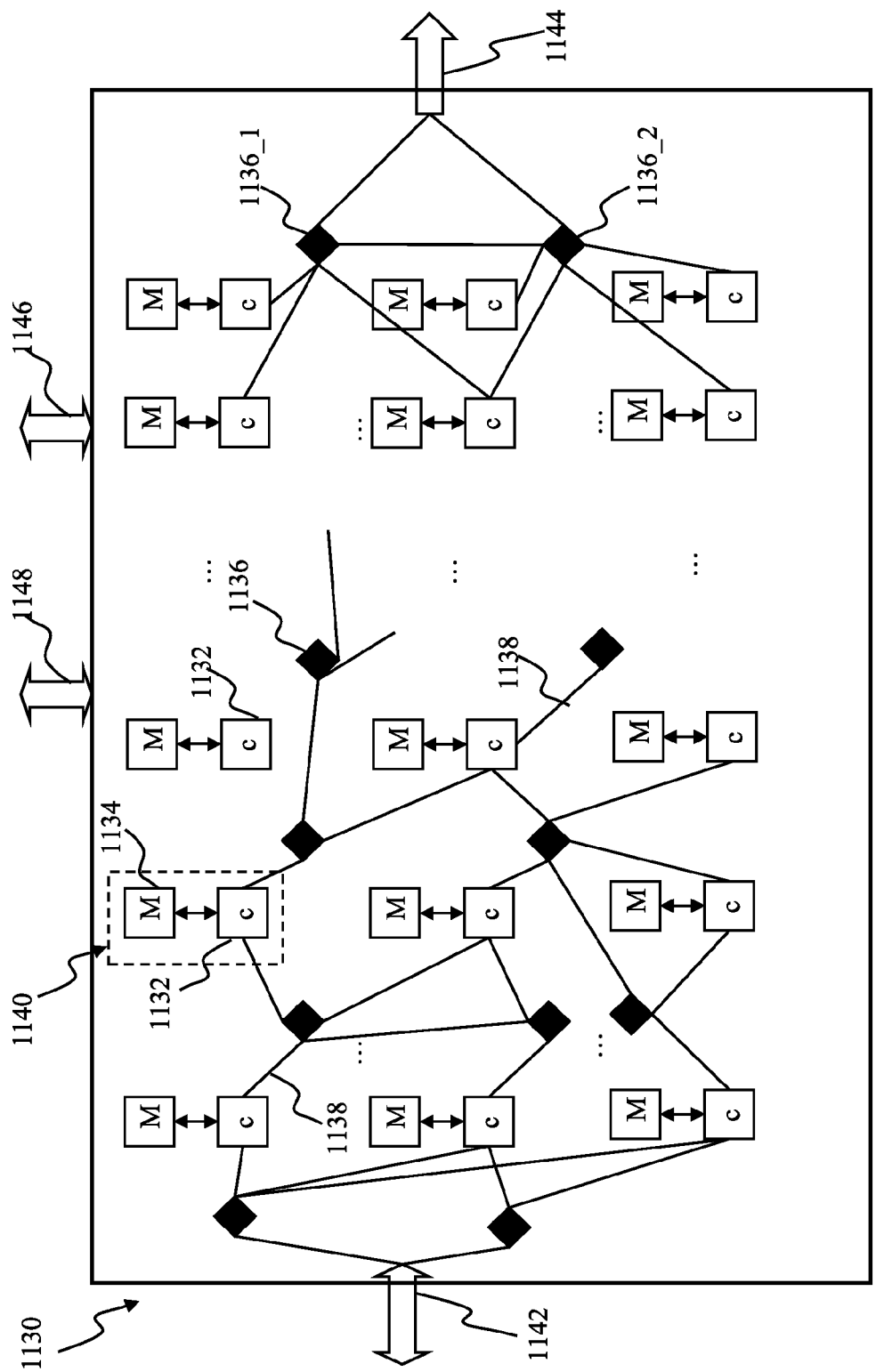
FIG. 11B is a block diagram illustrating a neuromorphic computerized system useful with efficient connection plasticity update mechanism in a spiking network, in accordance with one or more implementations.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all-to-all, and/or other mapping) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. In some implementations, the output may comprise an indication of recognized object or a feature, or a motor command to zoom/pan the image array.

The apparatus 1130, in one or more implementations, may interface to external fast response memory (e.g., RAM) via high bandwidth memory interface 1148, thereby enabling storage of intermediate network operational parameters (e.g., spike timing, and/or other parameters.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11C:
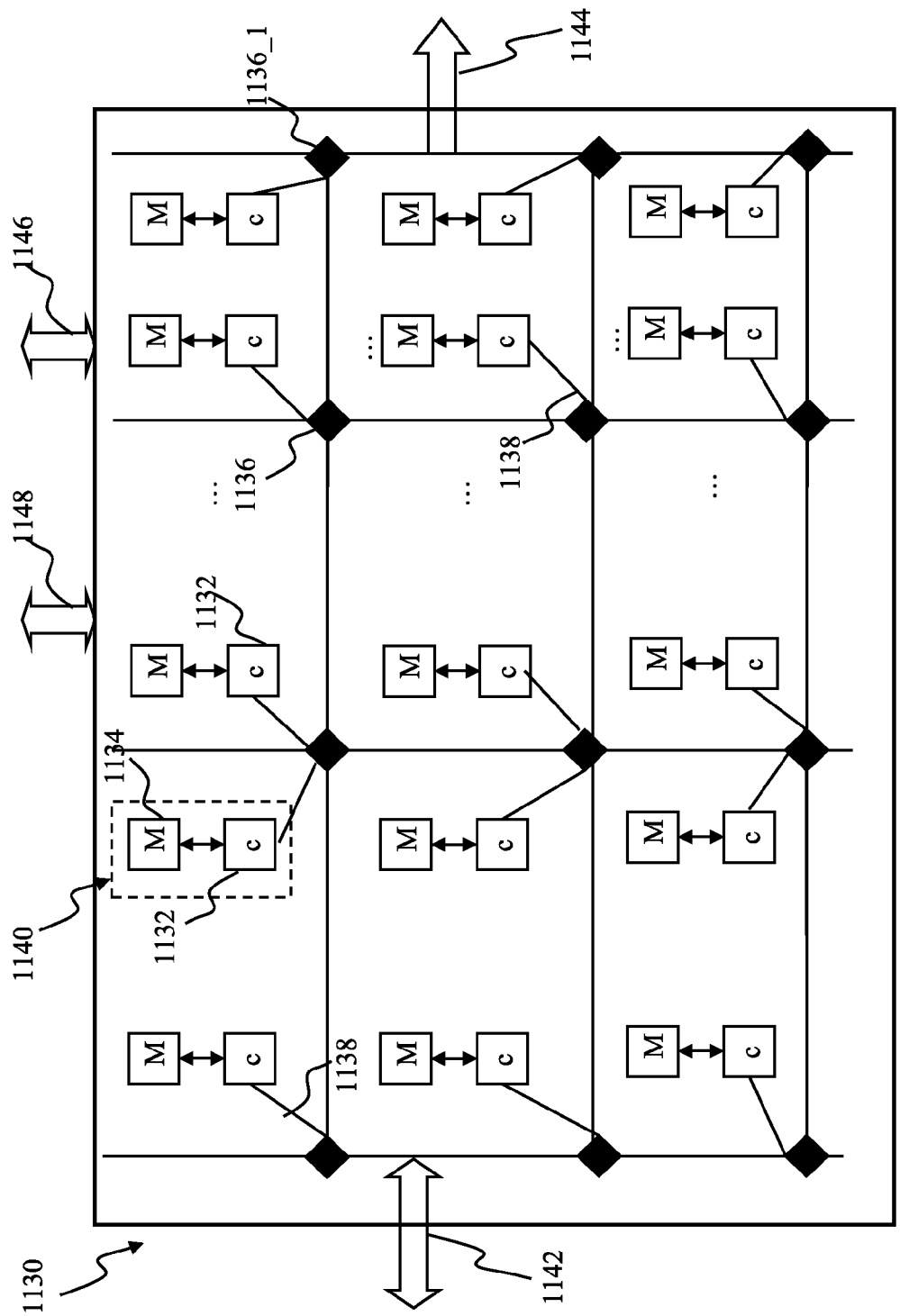
FIG. 11C is a block diagram illustrating a hierarchical neuromorphic computerized system architecture useful with efficient connection plasticity update mechanism in a spiking network, in accordance with one or more implementations.

FIG. 11C, illustrates one or more implementations of shared bus neuromorphic computerized system comprising micro-blocks, described with respect to FIG. 11B, supra., architecture coupled to a shared 1140. The apparatus 1145 of FIG. 11C utilized one o (or more) shared bus 1146 in order to interconnect micro-blocks 1140 with one another.

Figure 11D:
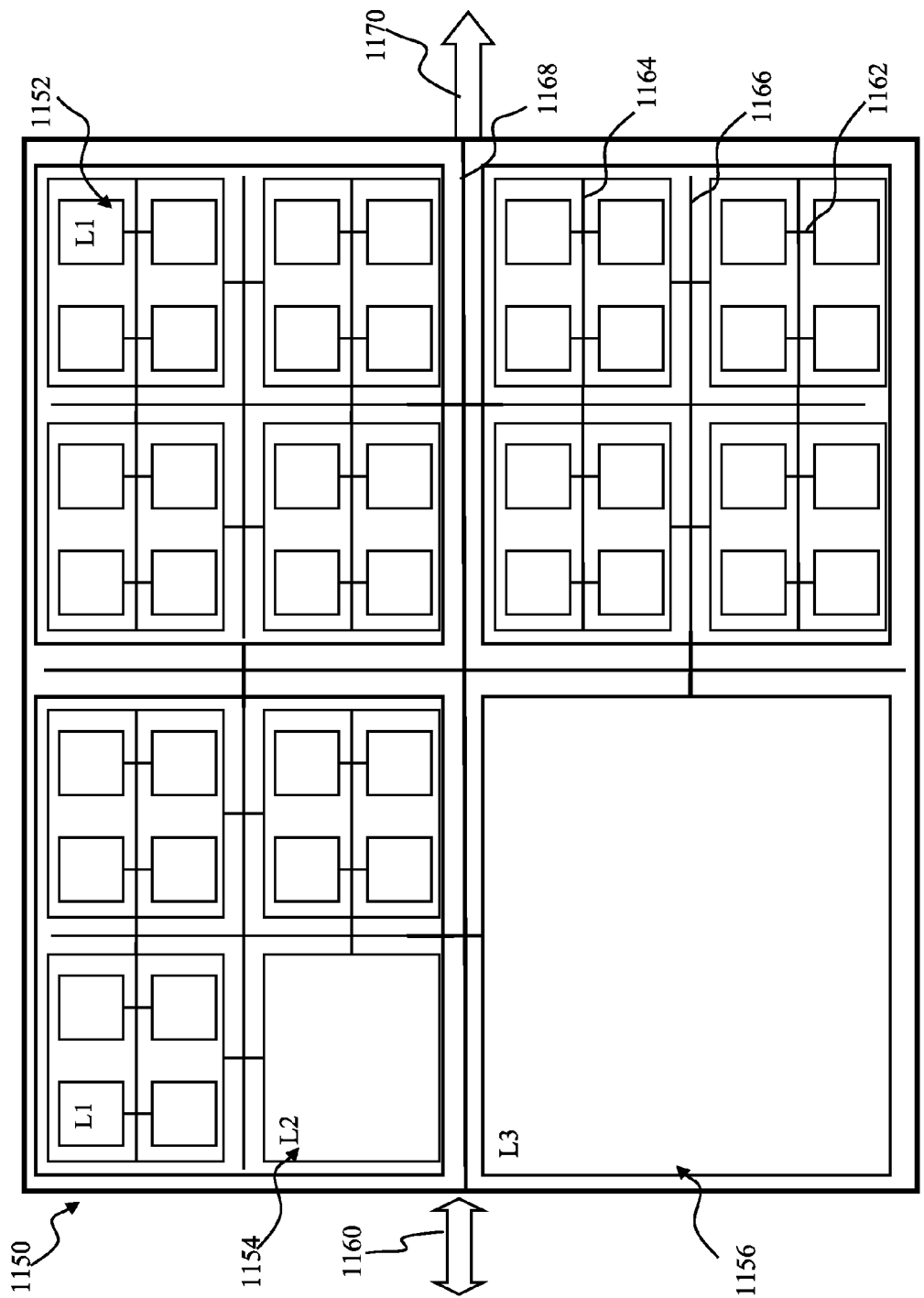
FIG. 11D is a block diagram illustrating cell-type neuromorphic computerized system architecture useful with efficient connection plasticity update mechanism in a spiking network, in accordance with one or more implementations.

FIG. 11D, illustrates some implementations of cell-based neuromorphic computerized system architecture configured to implement efficient connection plasticity update mechanism in a spiking network is described in detail. The neuromorphic system 1150 of FIG. 11D may comprise a hierarchy of processing blocks (cells block). In some implementations, the lowest level L1 cell 1152 of the apparatus 1150 may comprise logic and memory and may be configured similar to the micro block 1140 of the apparatus shown in FIG. 11B. A number of cell blocks may be arranges in a cluster and communicate with one another a local interconnects 1162, 1164. Individual ones of such clusters may form higher level cell, e.g., cell L2, denoted as 1154 in FIG. 11d. Similarly several L2 clusters may communicate with one another via a second level interconnect 1166 and form a super-cluster L3, denoted as 1156 in FIG. 11D. The super-clusters 1154 may communicate via a third level interconnect 1168 and may form a next level cluster, and so on. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal. In one or more implementations, the feedback may comprise an indication of recognized object or a feature, or a motor command, e.g., to zoom/pan the image array.

The neuromorphic apparatus 1150 may provide output via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing, number of spikes, and/or other parameters.). In one or more implementations, the apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task may be saved for future use and flushed, and previously stored network configuration may be loaded in its place.

Existing control systems may need to treat sensory inputs (e.g., the inputs 502, 504 in FIG. 5) differently depending on their origin, type, dynamic range, noise signature, and/or other characteristics. In contrast, a reinforcement learning controller (e.g., the controller 634 of FIG. 6A described herein) may process an array of spike inputs, where spikes are interchangeable digital signals that are all alike, and thus are not labeled, will be robust to many changes, including inadvertently mixing the sensory input types to the controller, particularly before training. The learning controller may also learn to combine signals of different types, and different modalities, in order to reach a better performance function.

The advantage of the method described herein is to combine the advantage of sensory and state encoding in high dimension by a multitude of linear and nonlinear kernel functions and operators with a reinforcement learning controller, which can efficiently learn to make use of all the distributed and parallel input signals to construct a controller realizing an optimization of a performance function.

In one or more implementations, the learning spiking network apparatus of the disclosure may be implemented as a software library configured to be executed by a computerized neural network apparatus (e.g., containing a digital processor). In some implementations, the learning apparatus may comprise a specialized hardware module (e.g., an embedded processor or controller). In some implementations, the spiking network apparatus may be implemented in a specialized or general purpose integrated circuit (e.g., ASIC, FPGA, and/or PLD). Myriad other implementations may exist that will be recognized by those of ordinary skill given the present disclosure.

Advantageously, the reinforcement learning according to the present disclosure can be used to simplify and improve control tasks for a wide assortment of control applications including, without limitation, industrial control, adaptive signal processing, navigation, and robotics. Exemplary implementations of the present disclosure may be useful in a variety of devices including without limitation prosthetic devices (such as artificial limbs), industrial control, autonomous and robotic apparatus, HVAC, and other electromechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure can advantageously be used in other applications of adaptive signal processing systems (comprising for example, artificial neural networks) including, for example, one or more or machine vision, pattern detection and pattern recognition, object classification, signal filtering, data segmentation, data compression, data mining, optimization and scheduling, complex mapping, and/or other adaptive signal processing systems.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A proportional-integral-derivative controller apparatus, the apparatus comprising:
    one or more processors configured to execute computer program modules, the computer program modules being executable to effectuate an encoder block comprising an expansion kernel, the expansion kernel comprising:
        a plurality of spiking neurons, individual ones of the plurality of spiking neurons being associated with a plurality of receptive fields, the encoder block being configured to encode an input into a spiking output using the expansion kernel;
    wherein the plurality of receptive fields comprises:
        an integrating operator associated with an integrating gain, the integrating operator being configured to produce a first output based on a time integral of the input;
        a differentiating operator associated with a differentiating gain, the differentiating operator being configured to produce a second output based on a time derivative of the input; and
        a proportional operator associated with a proportional gain, the proportional operator being configured to produce a third output, the third output being proportional to the input; and
    wherein the spiking output comprises a weighted sum of the first output, the second output, and the third output.

2. The apparatus of claim 1, wherein:
    individual ones of the plurality of receptive fields are characterized by an input range associated with the input signal; and
    individual ones of the plurality of spiking neurons are configured to generate one or more spikes based on a portion of the input signal having values that match corresponding ones of the plurality of receptive fields.

3. The apparatus of claim 1, wherein the computer program modules are executable to effectuate a spiking neuron network configured to (1) receive the spiking output from the plurality of spiking neurons via one or more connections and (2) generate an output using a reinforcement learning process based on an external signal.

4. The apparatus of claim 1, wherein:
individual ones of the plurality of spiking neurons are configured to generate a portion of the spiking output using a reinforcement learning process based on an external signal; and
the reinforcement learning process is configured to attain a target output.

5. The apparatus of claim 4, wherein the reinforcement learning process is characterized by a plasticity mechanism modulated by the external signal.

6. The apparatus of claim 4, wherein:
the learning process is characterized by a current output; and
the input signal is configured based on a difference between the target output and the current output.

7. The apparatus of claim 4, wherein:
the input signal comprises a continuous signal; and
the expansion kernel comprises continuous-to-spiking expansion kernel.

8. The apparatus of claim 1, wherein at least one of the plurality of receptive fields is characterized by a band pass filter response configured to provide a signal into a respective neuron of the plurality of neurons, the signal being based on a portion of the input signal occurring within a band pass range of the band pass filter.

9. The apparatus of claim 1, wherein:
a first portion of the neurons is configured to generate one or more integral outputs based on an integral of the input signal, individual ones of the one or more integral outputs being characterized by a first integral gain of a plurality of integral gains;
a second portion of the neurons is configured to generate one or more derivative outputs based on a derivative of the input signal, individual ones of the one or more derivative outputs being characterized by a first derivative gain of a plurality of derivative gains;
a third portion of the neurons is configured to generate one or more proportional outputs that are proportional to the input signal, individual ones of the one or more proportional outputs being characterized by a first proportional gain of a plurality of proportional gains; and
the plurality of proportional gains, the plurality of integral gains, and the plurality of derivative gains cooperate to effectuate a plurality of proportional-integral-derivative controllers, individual ones of the plurality of proportional-integral-derivative controllers being configured to generate controller output based on the input.

10. The apparatus of claim 9, wherein one or more of the first integral gain, the first derivative gain, or proportional gain are configured based on the input signal having values that match corresponding ones of the plurality of receptive fields.

11. A non-transitory computer-readable storage medium having instructions embodied thereon, the instructions being executable by one or more processors to perform a method of encoding a continuous input into a spike output, the method comprising:
generating a plurality of controller blocks, individual ones of the plurality of controller blocks being characterized by a respective set of gains;
coupling an output of individual ones of the plurality of controller blocks with one or more spiking neurons via a plurality of connections; and
operating the one or more spiking neurons using a reinforcement learning process configured to adjust efficacy of a portion of individual ones of the plurality of connections so as to improve a performance measure of the learning process;
wherein the performance measure is based on a distance between a current spike output and a target spike output so that improving the performance measure reduces the distance.

12. The computer-readable storage medium of claim 11, wherein
individual ones of the respective sets of gains comprise a proportional gain, an integral gain, and a derivative gain; and
the output of individual ones of the plurality of controller blocks is based on a combination of:
the input weighted by the proportional gain;
a derivative of the input weighted by the derivative gain; and
a time integral of the input weighted by the integral gain.

13. The computer-readable storage medium of claim 11, wherein adjusting the efficacy includes selecting a portion of the plurality of controller blocks capable of generating the target outcome.

14. A hierarchical computerized system configured to encode a continuous input signal into a spike timing output, the system comprising:
one or more processors configured to execute computer program modules, the computer program modules being executable to effectuate:
a first continuous expansion kernel block comprising a first plurality of basis components, individual ones of the first plurality of basis components being characterized by a first sensitivity range and configured to generate a first output signal based on a portion of the continuous input signal occurring within the first sensitivity range;
a first transformation block comprising a first plurality of operators configured to generate a second output based on the first output; and
a encoder block comprising a spiking neuron network configured to generate a spiking signal based on the second output.

15. The system of claim 14, wherein the computer program modules are further executable to effectuate:
a second continuous expansion kernel block comprising a second plurality of basis components, individual ones of the second plurality of basis components being characterized by a second sensitivity range and configured to generate a third output signal based on a portion of the second output signal occurring within the second sensitivity range; and
a second transformation block comprising a second plurality of operators configured to generate a fourth output based on the third output;
wherein:
the first transformation block and the second continuous expansion kernel block share a common interface configured to communicate the second output from the first transformation block to the second continuous expansion kernel block;
the encoder block is configured to interface to the second transformation block and to receive the fourth output; and
the first output comprises a continuous signal and the second output comprises a continuous signal.

16. The system of claim 15, wherein:

the fourth output comprises a continuous signal;

one or more neurons of the spiking neuron network are configured to receive the fourth output from individual ones of the second plurality of operators via one or more connections;

the spiking neuron network is further configured to generate the spiking signal using a reinforcement learning process and based on an external signal;

individual ones of the one or more connections are characterized by a connection efficacy; and the spiking neuron network is configured in accordance with a plasticity mechanism configured to adjust the connection efficacy in accordance with the external signal.

17. The system of claim 16, wherein:

the adjustment comprises one or both of connection potentiation or connection depression;

the connection potentiation comprises substantially increasing the connection efficacy; and the connection depression comprises substantially reducing the connection efficacy.

18. The system of claim 17, wherein:

increasing the connection efficacy is characterized by a first time-dependent function having a time window associated therewith;

the one or more spikes are characterized by a pre-synaptic time;

the external signal comprises a reinforcement signal comprising one or more spikes characterized by a reinforcement spike time;

the time window is selected based on one or both of the pre-synaptic time or the reinforcement spike time; and integration of the time-dependent function over the time window generates a positive value.

19. The system of claim 16, wherein:

the reinforcement learning process is configured to produce a target outcome; and the external signal comprises a reinforcement indication configured based on whether a current outcome associated with the control signal is within a predetermined range from the target outcome.

20. The system of claim 16, wherein:

the reinforcement learning process is characterized by a performance measure;

a current value of the performance measure is based on the adjustment of the connection efficacy being capable of causing a transition of the process from a prior state to a current state;

the reinforcement is positive when the current state is closer to the target outcome than the prior state; and the reinforcement is negative when the current state is farther away from the desired outcome than the prior state.

21. The system of claim 14, wherein the continuous input includes one or more of an analog signal, a polyadic signal with arity greater than 2, an n-bit long discrete signal with n-bits greater than 2, or a real-valued signal.

* * * * *